United States Patent
Kudo et al.

(10) Patent No.: US 10,477,407 B2
(45) Date of Patent: Nov. 12, 2019

(54) WIRELESS COMMUNICATION SYSTEM, WIRELESS COMMUNICATION METHOD, COOPERATION CONTROL APPARATUS, TERMINAL APPARATUS, AND LICENSED BAND BASE STATION APPARATUS

(71) Applicant: NIPPON TELEGRAPH AND TELEPHONE CORPORATION, Tokyo (JP)

(72) Inventors: Riichi Kudo, Yokosuka (JP); Hirantha Sithira Abeysekera, Yokosuka (JP); Yasushi Takatori, Yokosuka (JP); Takeo Ichikawa, Yokosuka (JP); Yusuke Asai, Yokosuka (JP); Masato Mizoguchi, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 15/329,188

(22) PCT Filed: Aug. 20, 2015

(86) PCT No.: PCT/JP2015/073381
§ 371 (c)(1),
(2) Date: Jan. 25, 2017

(87) PCT Pub. No.: WO2016/027855
PCT Pub. Date: Feb. 25, 2016

(65) Prior Publication Data
US 2017/0215083 A1 Jul. 27, 2017

(30) Foreign Application Priority Data
Aug. 21, 2014 (JP) ................... 2014-168760

(51) Int. Cl.
*H04W 16/14* (2009.01)
*H04W 76/10* (2018.01)
(Continued)

(52) U.S. Cl.
CPC .......... *H04W 16/14* (2013.01); *H04W 72/08* (2013.01); *H04W 76/10* (2018.02); *H04W 88/06* (2013.01); *H04W 88/08* (2013.01); *H04W 88/14* (2013.01)

(58) Field of Classification Search
CPC . H04L 5/0053; H04L 1/1812; H04L 27/0006; H04L 5/0042; H04L 5/006;
(Continued)

(56) References Cited

U.S. PATENT DOCUMENTS

2012/0099664 A1  4/2012 Cheong et al.
2013/0294356 A1* 11/2013 Bala ................. H04W 16/14
                                                    370/329
(Continued)

FOREIGN PATENT DOCUMENTS

CN    103314610 A   9/2013
EP    2429250 A1   3/2012
(Continued)

OTHER PUBLICATIONS

Extended European Search Report including the supplementary European search report and the European search opinion for parallel application EP 15833321.1, EPO, Munich, dated Feb. 16, 2018.
(Continued)

*Primary Examiner* — George Eng
*Assistant Examiner* — Umair Ahsan
(74) *Attorney, Agent, or Firm* — Harness, Dickey & Pierce, P.L.C.

(57) ABSTRACT

A wireless communication system includes a plurality of terminal apparatuses that perform communication using a
(Continued)

first frequency band in which communication based on a random access scheme is performed and a second frequency band which is different from the first frequency band, a first base station apparatus that performs communication using the first frequency band, a second base station apparatus that performs communication using the second frequency band, and a cooperation control apparatus that selects a terminal apparatus that transmits user data via the first base station apparatus from among the plurality of terminal apparatuses based on information acquired by the first base station apparatus and the second base station apparatus. The cooperation control apparatus selects which of the first base station apparatus and the selected terminal apparatus acquires access right for transmission of the user data via the first base station apparatus, and notifies the selected terminal apparatus and the first base station apparatus of the selection result.

12 Claims, 20 Drawing Sheets

(51) Int. Cl.
*H04W 72/08* (2009.01)
*H04W 88/06* (2009.01)
*H04W 88/08* (2009.01)
*H04W 88/14* (2009.01)

(58) Field of Classification Search
CPC ..... H04W 16/14; H04W 88/06; H04W 36/14; H04W 72/0406; H04W 72/0413; H04W 72/0453; H04W 72/08; H04W 72/1215; H04W 92/20
See application file for complete search history.

(56) References Cited

U.S. PATENT DOCUMENTS

| | | | |
|---|---|---|---|
| 2014/0254524 A1* | 9/2014 | Cheng | H04L 5/0005 370/329 |
| 2015/0131536 A1* | 5/2015 | Kaur | H04L 5/001 370/329 |
| 2015/0223075 A1 | 8/2015 | Bashar et al. | |
| 2016/0014610 A1 | 1/2016 | Wong et al. | |
| 2016/0095110 A1 | 3/2016 | Li et al. | |
| 2017/0118765 A1* | 4/2017 | Kalhan | H04W 76/14 |
| 2017/0208627 A1* | 7/2017 | You | H04W 74/0816 |
| 2017/0339699 A1* | 11/2017 | Bhorkar | H04W 72/0453 |
| 2018/0041998 A1* | 2/2018 | Freda | H04W 72/042 |

FOREIGN PATENT DOCUMENTS

| | | |
|---|---|---|
| JP | 2014-99743 A | 5/2014 |
| KR | 10-2013-0133204 A | 12/2013 |
| KR | 10-2014-0017517 A | 2/2014 |
| WO | WO-2011/121373 A1 | 10/2011 |
| WO | WO-2012/078565 A1 | 6/2012 |
| WO | WO-2012074343 A2 | 6/2012 |
| WO | WO-2014/112563 A1 | 7/2014 |

OTHER PUBLICATIONS

3GPP TS 36.300 V10.6.0 (Dec. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
Samsung, Load balancing between 3GPP and WLAN[online], 3GPP TSG-RAN WG2#81bis R2-131181, Internet<URL:http://www.3gpp.org/ftp/tsg_ran/WG2_RL2/TSGR2_81bis/Docs/R2-131181.zip>, Apr. 5, 2013, 1-4 pages.
International Search Report for PCT/JP2015/073381, ISA/JP, dated Nov. 10, 2015.
3GPP TR 36.889 V0.3.1. (Feb. 2015) Technical Report, 3rd Generation Partnership Project; Technical Specification Group Radio Access Network; Study on Licensed-Assisted Access to Unlicensed Spectrum; (Release 13).
3GPP TSG RAN WG1 Meeting #78bis, Ljubljana, Slovenia, Oct. 6-10, 2014, R1-144042.
3GPP TSG-RAN WG1 Meeting #80, Athens, Greece, Feb. 9-13, 2015, R1-150420.
IEEE Std 802.11ac (TM)-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Dec. 2013.
International Search Report for PCT/JP2016/055210, ISA/JP, Tokyo, dated May 17, 2016, with English translation.
Japanese Office Action (Notification of Reasons for Refusal) in corresponding Japanese application JP 2015-034351, JPO, dated Apr. 4, 2018, with English translation thereof.
Korean Office Action in parallel application KR 10-2017-7023419, KIPO, dated Jan. 24, 2018, with English (machine) translation thereof.
Riichi Kudo et al., "Performance evaluation of unlicensed band access for future radio access mobile optical network", IEICE Technical Report, vol. 114, No. 295, Nov. 5, 2013 (Nov. 5, 2014), pp. 61 to 66.
RP-140057, "On the primacy of licensed spectrum in relation to the proposal of using LTE for a license-assisted access to unlicensed spectrum," 3GPP TSG-RAN #63, Mar. 2014.
Written Opinion of the ISA for PCT/JP2016/055210, ISA/JP, Tokyo, dated May 17, 2016.
International Preliminary Report on Patentability for PCT/JP2016/055210, dated Aug. 29, 2017 with English translation thereof.
Korean Office Action for Parallel Application KR 10-2017-7003324, KIPO, dated Jun. 15, 2017.
Extended European Search Report for counterpart application EP 16755468.2, EPO, Munich, dated Sep. 25, 2018.
Riichi Kudo et al: "Channel Access Acquisition Mechanism Coupled with Cellular Network for Unlicensed Spectrum", 2015 IEEE 81st Vehicular Technology Conference (VTC Spring), Jan. 1, 2015 (Jan. 1, 2015), pp. 1-5, XP055365785, DOI: 10.1109/VTCSpring.2015.7145734.
3GPP TR 36.889 V0.3.1. (Feb. 2015) Technical Report, 3rd Generation Partnership Project; Technical Specification Group Radio Access Network; Study on Licensed-Assisted Access to Unlicensed Spectrum; (Release 13), 2015.
3GPP TSG RAN WG1 #78bis R1-4402 LG Electronics "Candidate solutions for LAA operation" (Year: 2014).
Chinese Office Action regarding CNSN 201580043172X, filed Jun. 17, 2019.
U.S. Final Office Action regarding U.S. Appl. No. 15/551,430, dated Sep. 6, 2019.

* cited by examiner

FIG. 20
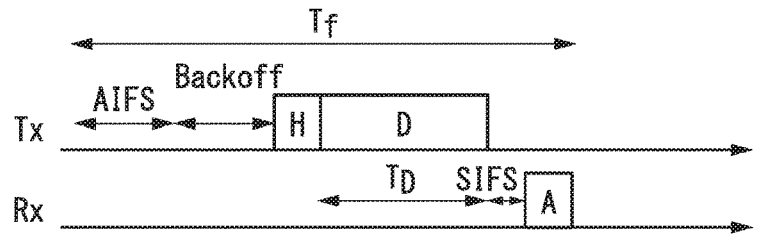
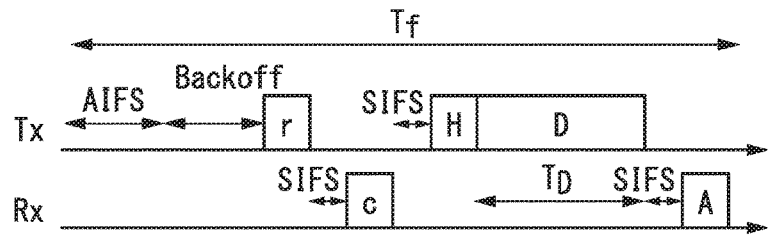
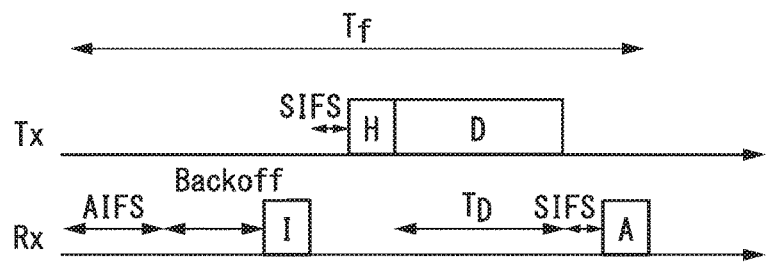

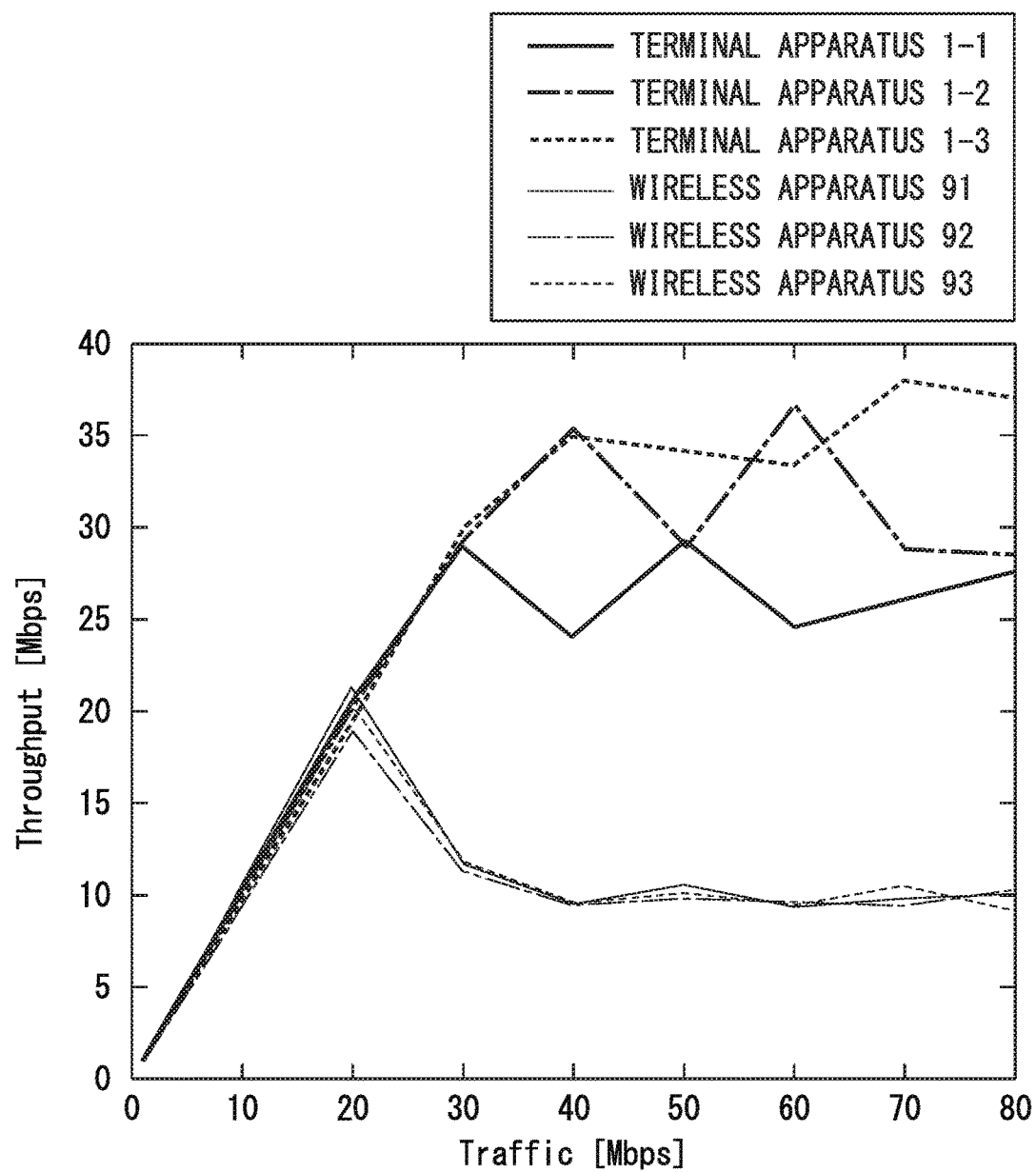

WIRELESS COMMUNICATION SYSTEM, WIRELESS COMMUNICATION METHOD, COOPERATION CONTROL APPARATUS, TERMINAL APPARATUS, AND LICENSED BAND BASE STATION APPARATUS

CROSS-REFERENCE TO RELATED APPLICATIONS

This application is a 371 U.S. National Stage of International Application No. PCT/JP2015/073381, filed Aug. 20, 2015, which claims the benefit of and priority to Japanese Patent Application No. 2014168760, filed Aug. 21, 2014. The disclosures of the above applications are incorporated herein by reference.

TECHNICAL FIELD

The present invention relates to a wireless communication system, a wireless communication method, a cooperation control apparatus, a terminal apparatus, and a licensed band base station apparatus.

Priority is claimed on Japanese Patent Application No. 2014-168760, filed Aug. 21, 2014, the content of which is incorporated herein by reference.

BACKGROUND ART

Various wireless communication systems in accordance with a Third Generation Partnership Project (3GPP) (registered trademark, the same hereinafter) standard are known.

In wireless communication systems in accordance with a Long Term Evolution (LTE) (registered trademark, the same hereinafter) standard defined by the 3GPP, a logical communication path (a user plane path) which is used in transmission of user data is established between a packet gateway (PDN gateway) and a user apparatus via a serving gateway and an evolved Node B (eNB), which is a cellular base station. Accordingly, the user apparatus can perform communication with an external network (such as the Internet) using the established user plane path.

A frequency band which is used in a wireless communication system in accordance with the LTE standard requires a license for transmission of radio signals. Hereinafter, a frequency band requiring a license for transmission of radio signals is referred to as a licensed band.

Wireless communication systems in accordance with a standard other than the LTE standard include a wireless communication system which performs wireless communication based on a random access scheme in a frequency band requiring no license for transmission of radio signals. Hereinafter, a frequency band requiring no license for transmission of radio signals is referred to as a shared frequency band.

Since a plurality of wireless communication systems and a plurality of wireless terminals of a plurality of owners are mixed in a shared frequency band, wireless communication in the shared frequency band may be more unstable in terms of communication quality than wireless communication in a licensed band. However, wireless communication systems in shared frequency bands, such as a wireless LAN system defined by IEEE 802.11, are improved in terms of throughput every year, and are spreading as one of major wireless accesses. In particular, the spread of smartphones remarkably increases opportunities to use wireless LAN systems. Moreover, in a shared frequency band, a license is not required for transmission of radio signals, and thus various wireless terminals have spread.

Shared frequency bands, which are frequency bands available to wireless LAN systems, are assigned to 2.4 GHz, 5 GHz, and 60 GHz. In 2.4 GHz and 5 GHz, which are microwave bands, a bandwidth which can be used by wireless LAN systems in Japan is about 500 MHz. A comparable bandwidth or more is also assigned in countries other than Japan as a band available to wireless LAN systems.

In order to cope with a rapid increase in traffic in a licensed band, it is very important to increase communication capacity of a wireless communication system by using the shared frequency bands. A base station apparatus that performs wireless communication in a shared frequency band is expected to cope with a broad coverage or a high throughput by performing advanced processing, such as a directional antenna, massive MIMO, OFDMA, and analog beam forming. Moreover, improvement in throughput of uplinks and downlinks by multi-user MIMO has also been studied.

PRIOR ART DOCUMENTS

Non-Patent Documents

Non Patent Document 1: 3GPP TS 36.300 V10. 6.0 (2011-12), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)

Non Patent Document 2: IEEE Std 802.11ac(TM)-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, December 2013

SUMMARY OF INVENTION

Problems to be Solved by the Invention

However, there is a problem in that if other wireless apparatuses performing wireless communication based on a random access scheme in a shared frequency band are near a base station apparatus or a wireless terminal using the same shared frequency band and traffic of the other wireless apparatuses tightens radio resources, a remarkable decrease in throughput of wireless communication in the shared frequency band is caused and efficient utilization of multi-user concurrent communication is difficult due to a hidden terminal problem (a problem that data concurrently transmitted from terminals outside of a coverage of signals to other terminals collides).

In consideration of the above-mentioned circumstances, an object of the present invention is to provide a wireless communication system, a wireless communication method, a cooperation control apparatus, a cooperation control apparatus, a terminal apparatus, and a licensed band base station apparatus that improve utilization efficiency of wireless communication in a shared frequency band.

Means for Solving the Problems

In consideration of the above-mentioned problem, the present invention provides a wireless communication system including:

a plurality of terminal apparatuses that perform wireless communication using a first frequency band in which wireless communication based on a random access scheme is performed and a second frequency band which is different from the first frequency band;

a first base station apparatus that performs wireless communication with the terminal apparatuses using the first frequency band;

a second base station apparatus that performs wireless communication with the terminal apparatuses using the second frequency band; and a cooperation control apparatus that selects a terminal apparatus that transmits user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses and selects which of the first base station apparatus and the selected terminal apparatus acquires access right for transmission of the user data, wherein the cooperation control apparatus determines a communication condition in the first frequency band including at least designation of an access right acquiring apparatus from information input from one or both of the first base station apparatus and the second base station apparatus, generates a UC communication initiation signal for notifying one or both of the first base station apparatus and the second base station apparatus of the communication condition, and outputs the UC communication initiation signal to the first base station apparatus and the second base station apparatus, the first base station apparatus waits until the user data or a UC transmission request signal is received without performing transmission to the selected terminal apparatus if the selected terminal apparatus is designated as the access right acquiring apparatus, and performs transmission of the user data to the selected terminal apparatus or transmission of the UC transmission request signal for causing the selected terminal apparatus to perform transmission using the first frequency band to the selected terminal apparatus based on information provided by the UC communication initiation signal if the selected terminal apparatus is not designated as the access right acquiring apparatus, the second base station apparatus collects information on user data waiting for transmission in the selected terminal apparatus and transmits the UC communication initiation signal to the selected terminal apparatus, and the selected terminal apparatus, based on the UC communication initiation signal received from the second base station apparatus, transmits the user data or the UC transmission request signal for causing the first base station apparatus to perform transmission to the first base station apparatus if the selected terminal apparatus is designated as the access right acquiring apparatus, and waits until the user data or the UC transmission request signal is received without performing transmission to the first base station if the selected terminal apparatus is not designated as the access right acquiring apparatus.

In a typical example, the terminal apparatus generates a UC communication request signal for requesting the cooperation control apparatus to perform transmission of the user data which is performed with the access right acquiring apparatus designated to the first base station and transmit the generated UC communication request signal to the second base station apparatus, the second base station apparatus outputs the UC transmission request signal received from the terminal apparatus to the cooperation control apparatus, and the cooperation control apparatus determines whether to permit a request by the UC communication request signal based on a signal received using the first frequency band by another terminal apparatus already wirelessly communicating with the first base station apparatus using the first frequency band when the UC communication request signal is received from the second base station apparatus.

In another typical example, the first base station apparatus generates an LC assist request signal for requesting that communication with a specific terminal apparatus that is performing communication using the first frequency band be changed to communication which is performed with the access right acquiring apparatus designated and outputs the generated LC assist request signal to the cooperation control apparatus, and when the LC assist request signal is received from the first base station apparatus, the cooperation control apparatus determines whether to permit the communication which is performed between the specific terminal apparatus and the first base station apparatus with the access right acquiring apparatus designated, and determines that one of the specific terminal apparatus and the first base station apparatus is the access right acquiring apparatus if it is determined to permit the communication.

In a suitable example, the cooperation control apparatus causes terminal apparatuses that are incapable of detecting signals mutually not to perform wireless communication when the first base station apparatus and the plurality of terminal apparatuses perform the wireless communication using the first frequency band.

In another suitable example, the terminal apparatus transmits communication report information indicating one or both of success or failure of the wireless communication and communication quality thereof to the cooperation control apparatus via the second base station apparatus when the wireless communication with the first base station apparatus using the first frequency band ends, and the cooperation control apparatus stores the communication report information received from the terminal apparatus in association with the access right acquiring apparatus in the wireless communication.

In another representative example, when transmission from the terminal apparatus to the first base station apparatus is performed using the first base station apparatus as the access right acquiring apparatus or when transmission from the first base station apparatus to the terminal apparatus is performed using the terminal apparatus as the access right acquiring apparatus, the cooperation control apparatus calculates, based on the first communication quality and user data to be transmitted from the first base station apparatus or user data to be transmitted from the terminal apparatus, information on a frame length which is required for transmission of the user data, includes information on the calculated frame length in the UC communication initiation signal, and transmits the UC communication initiation signal to the first base station apparatus or the terminal apparatus, and when the UC communication initiation signal is received, the first base station apparatus or the terminal apparatus transmits a transmission request signal including information for inhibiting transmission using the first frequency band for a time corresponding to the frame length to a communication partner and acquires access right in the first frequency band.

In another suitable example, when transmission from the terminal apparatus to the first base station apparatus is performed using the first base station apparatus as the access right acquiring apparatus or when transmission from the first base station apparatus to the terminal apparatus is performed using the terminal apparatus as the access right acquiring apparatus, the cooperation control apparatus determines an ending condition of the communication in which the access right acquiring apparatus is designated based on user data to be transmitted from the first base station apparatus or user data to be transmitted from the terminal apparatus, includes the determined ending condition in the UC communication initiation signal, and transmits the UC communication initiation signal to the first base station apparatus or the terminal apparatus, and the first base station apparatus or the terminal apparatus continues to perform communication in which only the designated access right acquiring apparatus has the access right until the ending condition indicated by the UC communication initiation signal is satisfied.

In another suitable example, the cooperation control apparatus includes information for designating multi-user concurrent transmission from the first base station apparatus to the plurality of terminal apparatuses or multi-user concurrent transmission from the plurality of terminal apparatuses to the first base station apparatus in the UC communication initiation signal.

The present invention also provides a wireless communication method in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, a second base station apparatus that performs wireless communication with the terminal apparatuses using the second frequency band, and a cooperation control apparatus that selects a terminal apparatus that transmits user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses, the wireless communication method including:

a first step of causing the cooperation control apparatus to select which of the first base station apparatus and the selected terminal apparatus acquires access right for transmission of the user data;

a second step of causing the cooperation control apparatus to generate a UC communication initiation signal indicating a determined access right acquiring apparatus and to output the generated UC communication initiation signal to the first base station apparatus and the second base station apparatus; and a third step of causing the second base station apparatus to transmit the UC communication initiation signal input from the cooperation control apparatus to the terminal apparatus; and a fourth step of causing the first base station apparatus or the terminal apparatus notified as the access right acquiring apparatus to acquire access right in the first frequency band and to transmit the user data via the first base station apparatus using the first frequency band when the UC communication initiation signal is received from the cooperation control apparatus.

The present invention also provides a cooperation control apparatus in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, a second base station apparatus that performs wireless communication with the terminal apparatuses using the second frequency band, and the cooperation control apparatus that controls transmission of user data of the terminal apparatuses, the cooperation control apparatus including:

a path evaluating unit that selects a terminal apparatus that transmits the user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses, selects which of the first base station apparatus and the selected terminal apparatus acquires access right for transmission of the user data, and outputs a communication condition in the first frequency band including at least designation of an access right acquiring apparatus to the first base station apparatus and the second base station apparatus.

The present invention also provides a terminal apparatus selected in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, a second base station apparatus that performs wireless communication with the terminal apparatuses using the second frequency band, and a cooperation control apparatus that selects the terminal apparatus that transmits user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses, the terminal apparatus including:

a receiving unit that receives a UC communication initiation signal including designation of an access right acquiring apparatus which is determined by the cooperation control apparatus from the second base station apparatus; and a transmitting unit that transmits the user data or a UC transmission request signal for causing the first base station apparatus to perform transmission to the first base station apparatus if the terminal apparatus is designated as the access right acquiring apparatus by the UC communication initiation signal.

The present invention also provides a licensed band base station apparatus in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, and a cooperation control apparatus that controls transmission of user data of the terminal apparatuses, the licensed band base station apparatus including:

a communication unit that performs wireless communication with the terminal apparatuses using the second frequency band;

a collection unit that collects information on the terminal apparatuses via the communication unit; and a generation unit that generates a UC communication initiation signal indicating a communication condition in the first frequency band including at least designation of an access right acquiring apparatus, wherein in a case of transmission of the user data in a downlink to the terminal apparatuses, when information on a terminal apparatus selected to transmit the user data via the first base station apparatus from among the plurality of terminal apparatuses is received from the cooperation control apparatus, the information on the selected terminal apparatus is collected by the collection unit and the UC communication initiation signal is generated by the generation unit based on the collected information, in a case of transmission of the user data in uplinks from the terminal apparatuses, when the information on the terminal apparatuses collected by the collection unit is provided to the cooperation control apparatus and information on a terminal apparatus selected to transmit the user data via the first base station apparatus from among the plurality of terminal apparatuses is received from the cooperation control apparatus, the UC communication initiation signal is generated by the generation unit based on the received information, and the generated UC communication initiation signal is transmitted to the selected terminal apparatus via the communication unit.

Advantageous Effects of the Invention

According to the present invention, the cooperation control apparatus selects a terminal apparatus which performs wireless communication using a shared frequency band, which is the first frequency band, and controls acquisition of access right in the shared frequency band using communication in the second frequency band different from the shared frequency band, and thus it is possible to prevent a decrease in throughput in the shared frequency band due to a hidden terminal problem, to increase the number of access right acquiring apparatuses, and to efficiently perform multi-user concurrent transmission. Accordingly, it is possible to improve utilization efficiency of wireless communication in the shared frequency band.

BRIEF DESCRIPTION OF DRAWINGS

FIG. 20 is a diagram illustrating three MAC sequences to be simulated.

FIG. 24 is a graph illustrating a simulation result of an operation in the wireless communication system of the first and second embodiments in the model illustrated in FIG. 22.

MODES FOR CARRYING OUT THE INVENTION

Hereinafter, a wireless communication system, a wireless communication method, a cooperation control apparatus, a terminal apparatus, and a licensed band base station apparatus in accordance with embodiments of the present invention will be described with reference to the drawings.

The wireless communication system in the embodiments improves communication quality by controlling wireless communication in a first frequency band which is a frequency band requiring no license, such as one in a wireless LAN system, using wireless communication in a second frequency band other than the first frequency band.

In this case, it is preferable that the wireless communication in the second frequency band can be established as wireless communication in which unexpected interception of a wireless communication link, a remarkable variation in throughput, and the like are not likely to occur. To this end, a frequency band in which wireless communication using a scheme other than the random access scheme is performed can be suitably used as the second frequency band. For example, a licensed band, which is a frequency band requiring a license, such as LTE, may be used as the second frequency band.

In the following description, it is assumed that the first frequency band is a shared frequency band and the second frequency band is a licensed band.

That is, the wireless communication system in the embodiments improves utilization efficiency of the shared frequency band (the first frequency band) by controlling a wireless apparatus which acquires access right in wireless communication in the shared frequency band using a signal which is transmitted and received in the licensed band (the second frequency band). By controlling a terminal apparatus which acquires access right in this way, it is possible to cause a receiving-side apparatus to acquire access right and perform transmission to a communication partner, and to cause a terminal apparatus having acquired access right and the other terminal apparatuses to concurrently transmit signals.

Hereinafter, a first embodiment in which communication quality is improved by causing a terminal apparatus to acquire access right and a second embodiment in which communication quality is improved by causing a base station apparatus, which wirelessly communicates with a terminal apparatus, to acquire access right will be described.

First Embodiment

Figure 1:
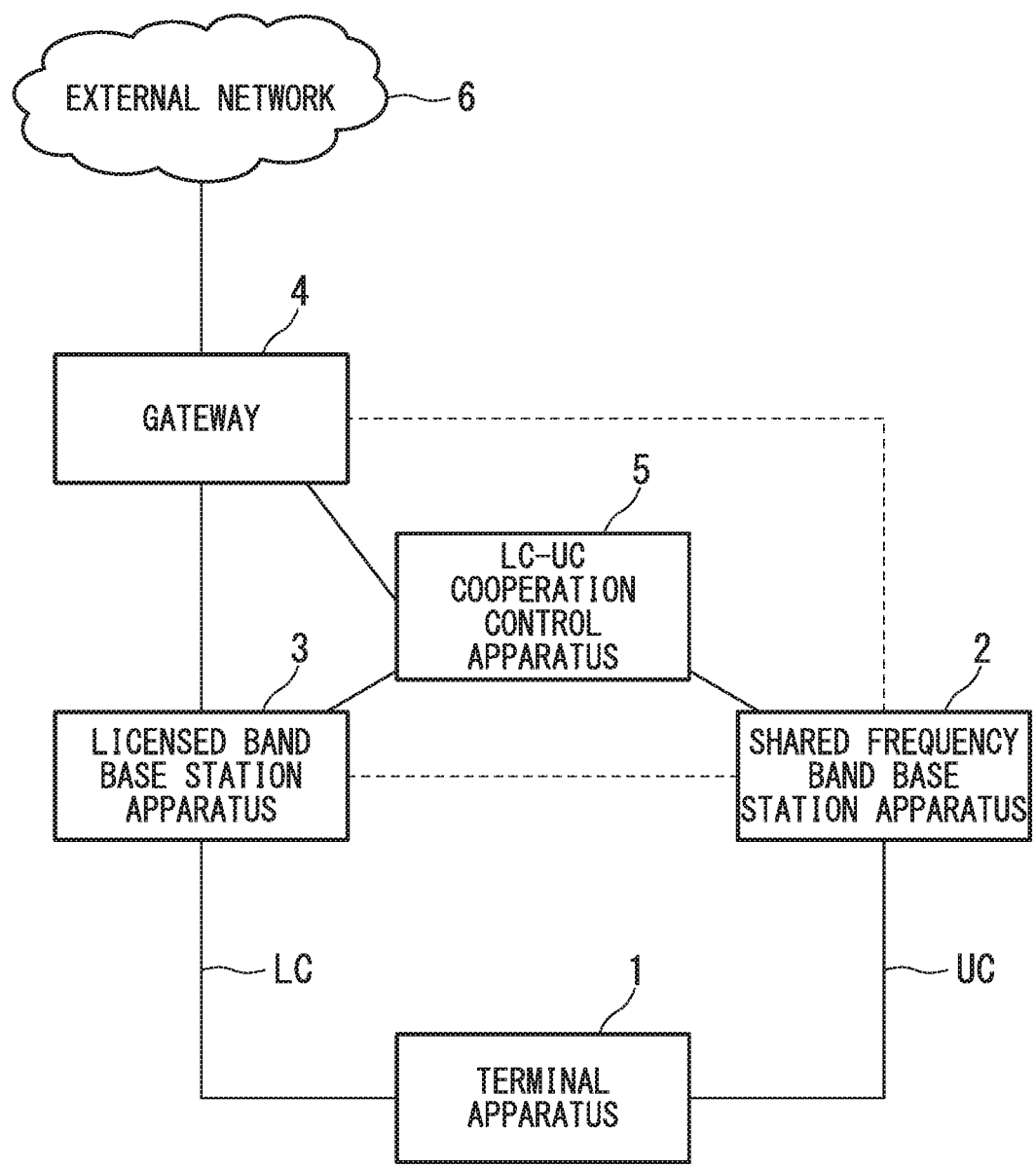
FIG. 1 is a block diagram illustrating an example of a configuration of a wireless communication system in a first embodiment.

FIG. 1 is a block diagram illustrating an example of a configuration of a wireless communication system in the first embodiment.

The wireless communication system includes a plurality of terminal apparatuses 1, a shared frequency band base station apparatus 2, a licensed band base station apparatus 3, a gateway 4, and an LC-UC cooperation control apparatus 5.

The shared frequency band base station apparatus 2, the licensed band base station apparatus 3, the gateway 4, and the LC-UC cooperation control apparatus 5 are connected to each other so as to be able to communicate with each other. Moreover, the gateway 4 is connected to an external network 6, such as the Internet, so as to be able to communicate with each other. Signals which the apparatuses included in the wireless communication system transmit and receive to and from the external network 6 passes through the gateway 4.

The elements provided in the wireless communication system wirelessly communicate with each other in accordance with Long Term Evolution/System Architecture Evolution (LTE/SAE) or the like, which is defined in the 3GPP standard.

According to terms in the 3GPP standard, a terminal apparatus 1 is replaced with user equipment (UE) and the licensed band base station apparatus 3 is replaced with an evolved node B (eNB). Moreover, the gateway 4 has a function as a packet gateway or a serving gateway and functions as a connection point with the external network 6.

Another wireless access technique can be applied to wireless access between the licensed band base station apparatus 3 and the terminal apparatuses 1 in the wireless communication system, by performing necessary modification in design.

The shared frequency band base station apparatus 2 and the terminal apparatuses 1 perform wireless communication which is determined by the standard IEEE 802.11 for a wireless LAN system, the standard IEEE 802.15 for a wireless Personal Area Network (PAN) system, or the standard LTE-Licensed Assisted Access (LAA) utilizing a shared frequency band, which is defined in the 3GPP standard.

The terminal apparatuses 1 can wirelessly communicate with both the licensed band base station apparatus 3 and the shared frequency band base station apparatus 2. The wireless communication scheme between the terminal apparatuses 1 and the base station apparatuses is not limited to the above-mentioned example and is arbitrary.

For example, any of Complementary Code Keying (CCK), Single Carrier (SC) transmission such as Single-Carrier Frequency Division Multiple Access (SC-FDMA), Orthogonal Frequency Division Multiplexing (OFDM), and Orthogonal Frequency Division Multiple Access (OFDMA) may be used.

Moreover, a scheme used in uplinks and a scheme used in downlinks may be the same or may be different from each other. Here, a downlink is transmission of a user data signal from the shared frequency band base station apparatus 2 or the licensed band base station apparatus 3 to a terminal apparatus 1. On the other hand, an uplink is transmission of a user data signal from a terminal apparatus 1 to the shared frequency band base station apparatus 2 or the licensed band base station apparatus 3.

Nodes which are elements of the wireless communication system have unique identification information. For example, an IP address of a node, a tunnel endpoint identifier, or a network address is used as the identification information.

Moreover, the identification information of the licensed band base station apparatus 3 and the shared frequency band base station apparatus 2 may include a physical cell ID for identifying a communication cell which is formed by each of the base station apparatuses.

The IP address is an address value for uniquely identifying a node in the wireless communication system.

The tunnel endpoint identifier (TEID) is an identifier for identifying an endpoint of a bearer (GPRS Tunneling Protocol (GTP) tunnel) logically connecting nodes.

The network address is an address value for identifying a subnet to which a node belongs when the wireless communication system is divided into a plurality of subnets.

A node in the wireless communication system can identify other nodes based on the identification information of the other nodes and can transmit and receive signals to and from the identified other nodes.

A terminal apparatus 1 can wirelessly communicate with the shared frequency band base station apparatus 2 via an unlicensed channel (UC) which is a frequency channel in a shared frequency band.

Moreover, the terminal apparatus 1 can wirelessly communicate with the licensed band base station apparatus 3 via a licensed channel (LC) which is a frequency channel in a licensed band.

The licensed band base station apparatus 3 can transmit and receive a control signal and a user data signal to and from the gateway 4.

The shared frequency band base station apparatus 2 can receive signals transmitted to the terminal apparatuses 1 from the licensed band base station apparatus 3 or the gateway 4. The shared frequency band base station apparatus 2 can transmit signals received from the terminal apparatuses 1 to the licensed band base station apparatus 3 or the gateway 4.

The shared frequency band base station apparatus 2 may be connected to one or both of the licensed band base station apparatus 3 and the gateway 4. Accordingly, in FIG. 1, a line connecting the shared frequency band base station apparatus 2 and the licensed band base station apparatus 3 and a line connecting the shared frequency band base station apparatus 2 and the gateway 4 are drawn with dotted lines.

The LC-UC cooperation control apparatus 5 selects whether to use one or both of UC and LC when transmitting user data signals to be transmitted to the terminal apparatuses 1 and user data signals received from the terminal apparatuses 1, determines paths via which the user data signals are transmitted, and determines whether to perform control of an apparatus acquiring access right (hereinafter referred to as an access right acquiring apparatus) in accordance with the present invention.

Moreover, if there are a plurality of licensed band base station apparatuses 3 and a plurality of shared frequency band base station apparatuses 2, the LC-UC cooperation control apparatus 5 may determine which of links from the base station apparatus is to be used for transmitting the user data signals.

Hereinafter, the configurations of the terminal apparatus 1, the shared frequency band base station apparatus 2, and the licensed band base station apparatus 3 in the wireless communication system of the first embodiment will be described.

Figure 2:
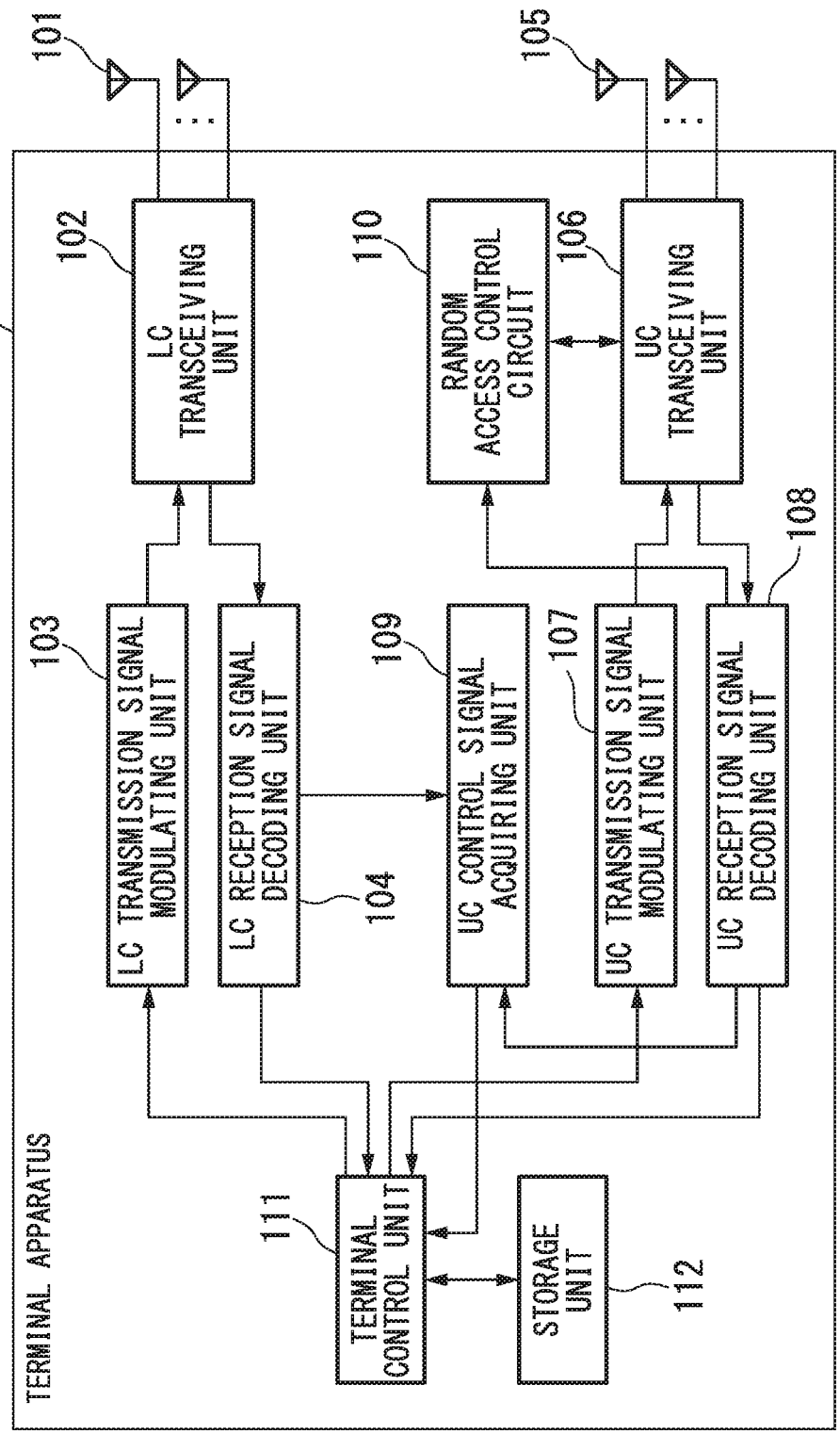
FIG. 2 is a block diagram illustrating a configuration of a terminal apparatus 1 in the first embodiment.

FIG. 2 is a block diagram illustrating the configuration of a terminal apparatus 1 in the first embodiment.

As illustrated in the drawing, the terminal apparatus 1 includes licensed channel (LC) antennas 101, an LC transceiving unit 102, an LC transmission signal modulating unit 103, an LC reception signal decoding unit 104, unlicensed channel (UC) antennas 105, a UC transceiving unit 106, a UC transmission signal modulating unit 107, a UC reception signal decoding unit 108, a UC control signal acquiring unit 109, a random access control circuit 110, a terminal control unit 111, and a storage unit 112.

It is to be noted that the terminal apparatus 1 may include antennas which are used in common for LC and UC instead of the individual antennas for LC and UC. Moreover, the LC transceiving unit 102 and the UC transceiving unit 106 may be configured so that some or all circuits thereof are used in common.

The terminal apparatus 1 transmits identification information of the terminal apparatus 1 to the licensed band base station apparatus 3 and causes the licensed band base station apparatus 3 to store the identification information. In this process, the terminal control unit 111 generates a signal including the identification information of the terminal apparatus 1 and outputs the generated signal to the LC transmission signal modulating unit 103. The LC transmission signal modulating unit 103 modulates the signal input from the terminal control unit 111 and outputs the modulated signal to the LC transceiving unit 102. The LC transceiving unit 102 performs conversion into an analog signal (A/D conversion) and up-conversion on the signal input from the LC transmission signal modulating unit 103, amplifies the resultant signal, and transmits the amplified signal through the LC antennas 101.

When the signal including the identification information is received from the terminal apparatus 1, the licensed band base station apparatus 3 stores the identification information and transmits a registration completion signal including information indicating that storage of the identification information is completed and identification information of the licensed band base station apparatus 3 to the terminal apparatus 1.

In the terminal apparatus 1, when the registration completion signal is received via the LC antennas 101, the LC transceiving unit 102 performs down-conversion and conversion into a digital signal (A/D conversion) on the received signal. The LC transceiving unit 102 outputs the signal acquired through the down-conversion and the A/D conversion to the LC reception signal decoding unit 104.

The LC reception signal decoding unit 104 demodulates the signal input from the LC transceiving unit 102. The LC reception signal decoding unit 104 outputs information acquired by the demodulation to the terminal control unit 111 and the UC control signal acquiring unit 109.

The terminal control unit 111 detects the identification information of the licensed band base station apparatus 3 from the information input from the LC reception signal decoding unit 104. The terminal control unit 111 stores the detected identification information of the licensed band base station apparatus 3 in the storage unit 112.

In this way, by mutually communicating the identification information between the terminal apparatus 1 and the licensed band base station apparatus 3, connection targets are stored in these apparatus and an LC link is established.

When the LC link is established, in the terminal apparatus 1, the UC transceiving unit 106 receives a control signal transmitted from a shared frequency band base station apparatus 2 located in the vicinity thereof via the UC antennas 105. The UC transceiving unit 106 performs down-conversion and conversion into a digital signal (A/D conversion) on the received signal. The UC transceiving unit 106 outputs the signal acquired through the down-conversion and the A/D conversion to the UC reception signal decoding unit 108.

The UC reception signal decoding unit 108 demodulates the signal input from the UC transceiving unit 106. The UC reception signal decoding unit 108 outputs the identification information of the shared frequency band base station apparatus 2 acquired by the demodulation to the terminal control unit 111.

The terminal control unit 111 stores the identification information of the shared frequency band base station apparatus 2 input from the UC reception signal decoding unit 108 in the storage unit 112.

The terminal control unit 111 may associate each piece of identification information of the shared frequency band base station apparatus 2 to be stored in the storage unit 112 with parameters relating to communication quality when the identification information is acquired and store each piece of identification information and the parameters in the storage unit 112. The terminal control unit 111 can acquire the parameters relating to the communication quality from the UC transceiving unit 106 or the UC reception signal decoding unit 108. The parameters relating to the communication quality include a reception level, a temporal variation of a channel, an error rate, a spatial correlation of a channel, and the like.

Moreover, the terminal apparatus 1 may acquire and store identification information of another terminal apparatus 1 located in the vicinity thereof in the same way as the identification information of the shared frequency band base station apparatus 2. In this case, for example, the terminal apparatus 1 can acquire the identification information of the other terminal apparatus 1 located in the vicinity thereof from header information included in a signal transmitted from the other terminal apparatus 1 via UC or LC.

Furthermore, the terminal apparatus 1 may acquire the identification information of the shared frequency band base station apparatus 2 or the licensed band base station apparatus 3 which is included as a destination in a signal that is transmitted from the other terminal apparatus 1 located in the vicinity thereof and is received via UC or LC, and store the acquired identification information in association with the identification information of the other terminal apparatus 1.

The terminal apparatus 1 transmits the stored identification information of the shared frequency band base station apparatus 2 and the other terminal apparatus 1 to the licensed band base station apparatus 3, or transmits whether identification information of a pre-designated shared frequency band base station apparatus 2 is detected to the licensed band base station apparatus 3.

Here, the pre-designated shared frequency band base station apparatus 2 is a shared frequency band base station apparatus 2 which is identified by a service set identifier (SSID) used by an operator with which a user of the terminal apparatus 1 makes a contract or a shared frequency band base station apparatus 2 present in a communication cell of the licensed band base station apparatus 3 which is notified when the LC link to the licensed band base station apparatus 3 is established. Moreover, the pre-designated shared frequency band base station apparatus 2 can perform wireless communication with the terminal apparatus 1 using a shared frequency band in which a cooperating operation in accordance with the present invention can be performed.

Moreover, the operations of the elements of the terminal apparatus 1 when information on the identification information of the communication apparatuses that use the above-described shared frequency band is transmitted to the licensed band base station apparatus 3 are performed in the same way as the operations when the identification information of the terminal apparatus 1 is transmitted to the licensed band base station apparatus 3.

The licensed band base station apparatus 3 may transmit a UC information request signal to the terminal apparatus 1 via LC. The UC information request signal is a signal for requesting notification of one or both of information on the identification information of the shared frequency band base station apparatus 2 and the other terminal apparatus 1 stored in the terminal apparatus 1 and surrounding UC radio environment information measured by the terminal apparatus.

The terminal apparatus 1 receiving the UC information request signal may generate information to be transmitted to the licensed band base station apparatus 3 from UC information including the stored identification information of the shared frequency band base station apparatus 2 and the other terminal apparatus 1 and link use information. The link use information includes information on use of wireless communication in UC measured by the terminal apparatus 1, such as the number of occurrences of wireless communications in UC, a UC utilization rate, and a reception level.

The terminal apparatus 1 may be controlled to power on circuits relating to communication that use UC in the terminal apparatus by receiving the UC information request signal.

If the LC-UC cooperation control apparatus 5 determines that the terminal apparatus 1 performs wireless communication in one or both of a downlink and an uplink with the shared frequency band base station apparatus 2 and the shared frequency band base station apparatus 2 is in a standby state, the terminal apparatus 1 receives a UC communication initiation signal (UC Transmission Request for Uplink/for Downlink) from the licensed band base station apparatus 3 via LC.

In the terminal apparatus 1, the LC transceiving unit 102 receives the UC communication initiation signal from the licensed band base station apparatus 3 via the LC antennas 101, the UC communication initiation signal is decoded through the down-conversion and the A/D conversion in the LC transceiving unit 102 and the decoding in the LC reception signal decoding unit 104. The LC reception signal decoding unit 104 outputs the UC communication initiation signal to the UC control signal acquiring unit 109. By instructing (from the LC-UC cooperation control apparatus 5) the terminal apparatus 1 to acquire access right using the UC communication initiation signal, it is possible to improve the throughput in comparison with communication using conventional random access. In the present first embodiment, the following four scenarios are considered as patterns of access right acquisition control.

[Scenario 1]

A plurality of terminal apparatuses 1 each acquiring access right and performing uplink single-user transmission in UC are selected so as not to satisfy a hidden terminal condition, whereby packet collision is avoided.

[Scenario 2]

A plurality of terminal apparatuses 1 acquiring access right and performing uplink multi-user concurrent transmission in UC are selected, and the plurality of terminal apparatuses 1 are made to acquire access right (a transmission opportunity) by transmission of an uplink transmission request signal, and multi-user uplink transmission using UC is performed by the plurality of terminal apparatuses 1, whereby exchange of a control signal for the multi-user uplink transmission is omitted and UC is efficiently used.

[Scenario 3]

A terminal apparatus 1 acquiring access right and performing downlink single-user reception in UC is selected, the terminal apparatus 1 is made to acquire access right (a reception opportunity) by transmission of a downlink transmission request signal, and the shared frequency band base station apparatus 2 is made to transmit user data, whereby a transmission signal of a wireless apparatus which is in a hidden terminal state from the shared frequency band base station apparatus 2 is prevented from causing packet collision in the terminal apparatus 1.

[Scenario 4]

A plurality of terminal apparatuses 1 acquiring access right and performing downlink multi-user concurrent reception in UC are selected, the plurality of terminal apparatuses 1 are made to acquire access right (a reception opportunity) by transmission of a downlink transmission request signal, and the shared frequency band base station apparatus 2 is made to transmit user data, whereby a transmission signal of a wireless apparatus which is in a hidden terminal state from the shared frequency band base station apparatus 2 is prevented from causing packet collision in the terminal apparatus 1, exchange of a control signal for multi-user downlink transmission using UC is omitted, and UC is efficiently used.

The above-mentioned UC communication initiation signal can designate one of Scenarios 1 to 4 and can include UC use designation information indicating one of the identification information of the terminal apparatus 1 and the shared frequency band base station apparatus 2 performing wireless communication using UC, an access method, an access timing, an access time band, the number of communication bits, and an ending condition for ending use of UC.

Moreover, the UC communication initiation signal may include information on a frame length of user data to be transmitted in the UC communication in which an apparatus acquiring the access right is designated. The frame length is calculated based on the number of bits of user data per frame, channel information between the shared frequency band base station apparatus 2 and a terminal apparatus 1, and a modulation code scheme (MCS) index, such as a modulation scheme, a coding rate, and a spatial multiplexing order.

The UC control signal acquiring unit 109 outputs a UC communication control signal to the terminal control unit 111.

Here, as a method for realizing multi-user concurrent transmission in uplinks, there are three possible methods, including a method for dividing links in a frequency domain in UC by OFDMA and allocating the divided links to the terminal apparatuses 1, a method for allocating different codes for links to the terminal apparatuses 1 by a code division multiplexing technique, and a method for detecting signals from the terminal apparatuses 1 which are concurrently transmitted at the same frequency by spatial signal processing using a spatial multiplexing technique.

When the links are divided in the frequency domain, the LC-UC cooperation control apparatus 5 and the licensed band base station apparatus 3 can notify the terminal apparatuses 1 of frequency channels used by the terminal apparatuses 1 using the UC communication initiation signal.

Moreover, when the link are divided by the code division multiplexing technique, the LC-UC cooperation control apparatus 5 and the licensed band base station apparatus 3 can notify the terminal apparatuses 1 of the codes allocated to the terminal apparatuses 1 using the UC communication initiation signal.

Moreover, when the links are multiplexed by the spatial (division) multiplexing technique, the LC-UC cooperation control apparatus 5 and the licensed band base station apparatus 3 can notify each terminal apparatus 1 of information on transmission rules of a pilot signal and a data packet length of each terminal apparatus 1 using the UC communication initiation signal.

Moreover, as a method for realizing multi-user concurrent transmission in downlinks, there are also three possible methods, including a method for dividing links in a frequency domain by OFDMA and allocating the divided links to the terminal apparatuses 1, a method for allocating different codes for links to the terminal apparatuses 1 by the code division multiplexing technique, and a method for concurrently transmitting signals at the same frequency while suppressing interference of the signals to each terminal apparatus 1 by the spatial signal processing using the spatial multiplexing technique.

Any of Scenarios 1 to 4 can be expected to improve the throughput of UC for a specific terminal apparatus 1 by solving the hidden terminal problem.

In Scenario 1, it is possible to prevent the terminal apparatuses 1 from having a hidden terminal relationship to cause packet collision when access right is acquired by uplink communication.

In Scenarios 2 to 4, the terminal apparatuses 1 can be selected so as to prevent the terminal apparatuses 1 from having a hidden terminal relationship that causes packet collision, and the terminal apparatuses 1 trigger the multi-user concurrent communication, and thus it is possible to prevent collision with a packet of a terminal apparatus 1 using UC which is hidden from the shared frequency band base station apparatus 2.

The UC transmission signal modulating unit 107 modulates the signal input from the terminal control unit 111 and outputs the modulated signal to the UC transceiving unit 106. The signal input from the terminal control unit 111 to the UC transmission signal modulating unit 107 is a control signal, a user data signal, or the like.

If a transmission stop is not instructed by the random access control circuit 110, the UC transceiving unit 106 performs conversion into an analog signal and up-conversion to a carrier frequency on the signal input from the UC transmission signal modulating unit 107, then amplifies the resultant signal, and transmits the amplified signal through the UC antennas 105.

If a reception level of a signal received by the UC transceiving unit 106 is higher than or equal to a predetermined threshold value, the random access control circuit 110 instructs the UC transceiving unit 106 to stop transmission. Moreover, if the signal decoded by the UC reception signal decoding unit 108 includes a signal instructing virtual carrier sensing, such as setting of a Network Allocation Vector (NAV) for inhibiting transmission for a predetermined time, the random access control circuit 110 instructs the UC transceiving unit 106 to stop transmission in accordance with a condition indicated by the signal.

When the stop of transmission by the random access control circuit 110 is released, the UC transceiving unit 106 transmits the signal input from the UC transmission signal modulating unit 107 in accordance with predetermined rules of a random access scheme.

When the terminal apparatus performs reception, the UC transceiving unit 106 performs down-conversion and analog-digital conversion on the received signal acquired from the UC antennas 105 and then outputs the digital signal to the UC reception signal decoding unit 108, whereby the terminal control unit 111 can acquire decoded information.

In the conventional wireless system, when a user data signal to be transmitted is generated by the terminal control unit 111, the user data signal is transmitted in accordance with rules of the random access scheme, data to be received is transmitted from the shared frequency band base station apparatus 2, and the terminal apparatus waits until the data is received.

The scheme of the present invention is different from the conventional one in that the LC-UC cooperation control apparatus 5 determines an apparatus acquiring access right in advance. When this access right acquiring apparatus is designated to be the (wireless) apparatus 1 itself, the terminal apparatus 1 acquires access right by transmitting the user data signal and either the uplink transmission request signal or the downlink transmission request signal not only when transmission is performed but also when reception is performed.

When the access right acquiring apparatus is the shared frequency band base station apparatus 2, which is a communication partner, even if there is data to be transmitted in the terminal apparatus 1, the terminal apparatus 1 waits until a signal instructing transmission is received from the shared frequency band base station apparatus 2 acquiring access right, whereby it is possible to efficiently use UC to decrease packet collision.

Moreover, when a signal from the shared frequency band base station apparatus 2 is received in accordance with the downlink transmission request signal, the terminal apparatus 1 needs to see whether a user data signal to be received is on standby in the shared frequency band base station apparatus 2 in advance, and this notification function can be provided by the UC communication initiation signal using the LC link.

When the UC communication in the first embodiment is performed and a predetermined condition of UC communication is satisfied, the terminal control unit 111 can generate UC communication report information indicating a communication (transmission) result by the UC transceiving unit 106 and can output the generated UC communication report information to the LC transmission signal modulating unit 103.

Similarly to the identification information of the shared frequency band base station apparatus 2 and the other terminal apparatus 1, the UC communication report information is subjected to modulation by the LC transmission signal modulating unit 103 and D/A conversion, up-conversion, and amplification by the LC transceiving unit 102 and is transmitted to the licensed band base station apparatus 3.

The transmission result included in the UC communication report information is, for example, information indicating whether all the user data signals to be transmitted have been transmitted completely.

It is to be noted that if the UC communication initiation signal is not received from the licensed band base station apparatus 3, the terminal apparatus 1 may perform wireless communication with the shared frequency band base station apparatus 2 in accordance with rules of a known random access scheme, such as wireless LAN communication. Alternatively, the terminal apparatus 1 can perform communication in a shared frequency band using access based on the access right acquisition control in accordance with the present invention along with the rules of the known random access scheme.

Moreover, in the terminal apparatus 1, a UC communication request signal for requesting to perform wireless communication using UC in response to reception of a user's operation or requesting to perform wireless communication using UC based on the access right control in accordance with the present invention may be generated by the terminal control unit 111, and the UC communication request signal may be transmitted to the LC-UC cooperation control apparatus 5 by a transmission process in the LC transmission signal modulating unit 103 and the LC transceiving unit 102 or a transmission process in the UC transmission signal modulating unit 107 and the UC transceiving unit 106.

The LC-UC cooperation control apparatus 5 may cause the UC communication initiation signal to be transmitted from the licensed band base station apparatus 3 to the terminal apparatus 1 in response to a request from the terminal apparatus 1.

Figure 3:
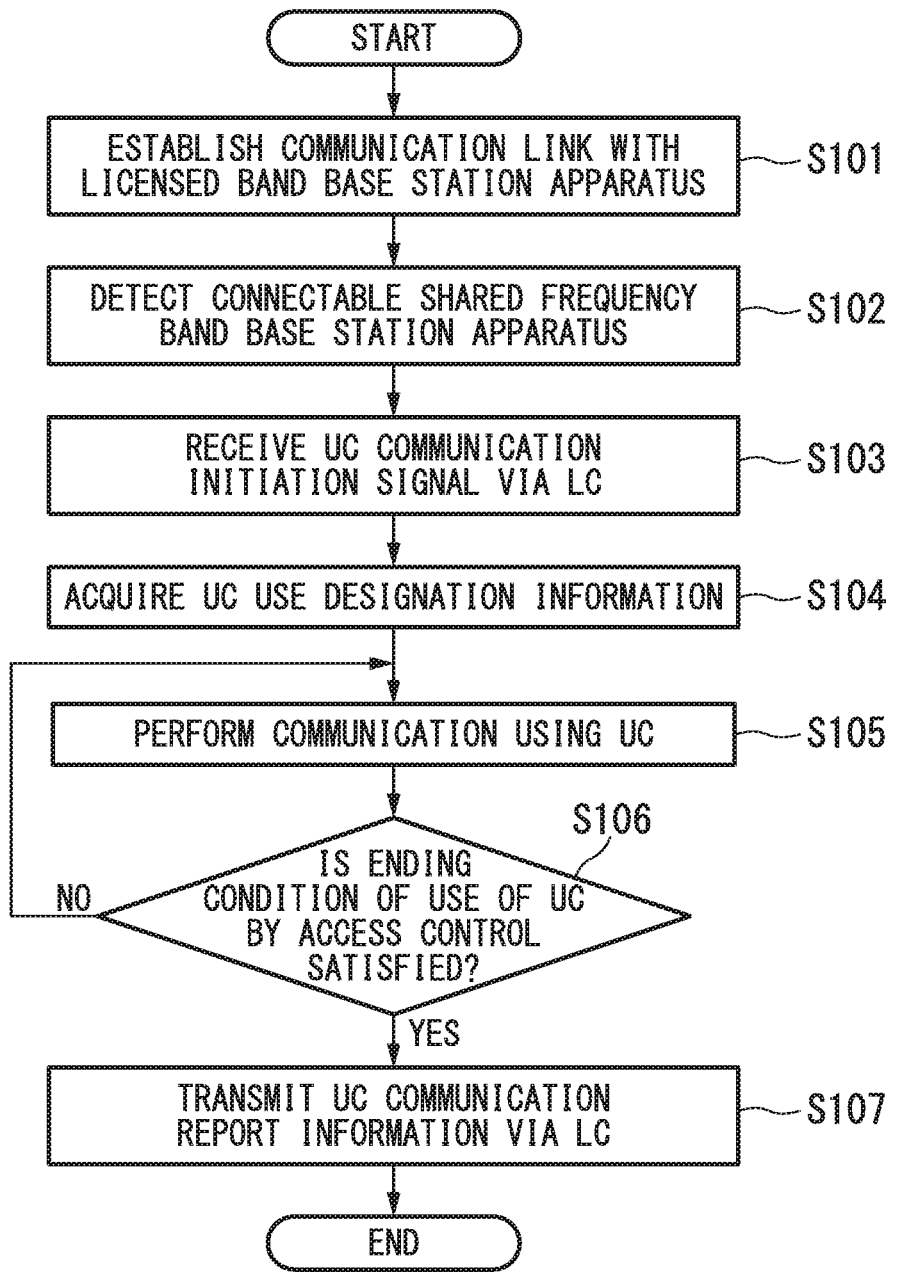
FIG. 3 is a flowchart illustrating a terminal communication process which is performed by the terminal apparatus 1 in the first embodiment.

FIG. 3 is a flowchart illustrating a terminal communication process which is performed by a terminal apparatus 1 in the first embodiment.

When the terminal communication process is initiated in the terminal apparatus 1, the terminal control unit 111 performs transmission, reception, and recording of the identification information of the terminal apparatus and the licensed band base station apparatus 3 through the signal processing by the LC transceiving unit 102, the LC transmission signal modulating unit 103, and the LC reception signal decoding unit 104 with the licensed band base station apparatus 3, whereby a communication link is established (step S101).

When the communication link in the licensed band is established, the UC transceiving unit 106 and the UC reception signal decoding unit 108 detect a shared frequency band base station apparatus 2 to which the terminal apparatus 1 can connect (step S102). The identification information of the shared frequency band base station apparatus 2 detected in step S102 is sent to the LC-UC cooperation control apparatus 5 via the licensed band base station apparatus 3.

It is to be noted that the terminal apparatus 1 may send the identification information of the shared frequency band base station apparatus 2 detected in step S102 or information indicating whether predetermined identification information is detected to the LC-UC cooperation control apparatus 5 via the shared frequency band base station apparatus 2.

When the LC-UC cooperation control apparatus 5 determines that the terminal apparatus 1 uses UC in accordance with the first embodiment, a UC communication initiation signal is transmitted from the licensed band base station apparatus 3 and the LC transceiving unit 102 receives the UC communication initiation signal (step S103).

The received UC communication initiation signal is subjected to a receiving process in the LC transceiving unit 102 and the LC reception signal decoding unit 104 and is then input to the terminal control unit 111. The terminal control unit 111 acquires UC use designation information included in the UC communication initiation signal (step S104).

The terminal control unit 111, the UC transmission signal modulating unit 107, and the UC transceiving unit 106 generate a transmission signal in a designated format based on the UC use designation information. Regarding the above-mentioned four scenarios, the transmission signal in the designated format is a user data signal of an uplink in Scenario 1, an uplink transmission request signal in Scenario 2, and a downlink transmission request signal in Scenarios 3 and 4.

The UC transceiving unit 106 performs transmission using UC in accordance with the control of the random access control circuit 110 (step S105).

The terminal control unit 111 determines whether an ending condition for ending use of UC, which is included in the UC use designation information, is satisfied (step S106), and advances the processing to step S107 if the condition is satisfied (YES in step S106). If the condition is not satisfied (NO in step S106), the terminal control unit 111 returns the processing to step S105 to continue to perform the transmission using UC.

If the ending condition is satisfied, the terminal control unit 111 acquires the result of the transmission using UC from the UC transceiving unit 106 and generates UC communication report information including the acquired transmission result. The UC communication report information is subjected to a transmission process by the LC transmission signal modulating unit 103 and the LC transceiving unit 102, and is transmitted to the LC-UC cooperation control apparatus 5 via the licensed band base station apparatus 3 (step S107).

After the UC communication report information is transmitted to the licensed band base station apparatus 3, the terminal control unit 111 ends the terminal communication process.

In the terminal communication process illustrated in FIG. 3, step S107 may be skipped. That is, the terminal apparatus 1 does not transmit the UC communication report information to the LC-UC cooperation control apparatus 5, but the shared frequency band base station apparatus 2 may output the UC communication report information directly to the LC-UC cooperation control apparatus 5 or may output the UC communication report information to the LC-UC cooperation control apparatus 5 via the licensed band base station apparatus 3.

Figure 4:
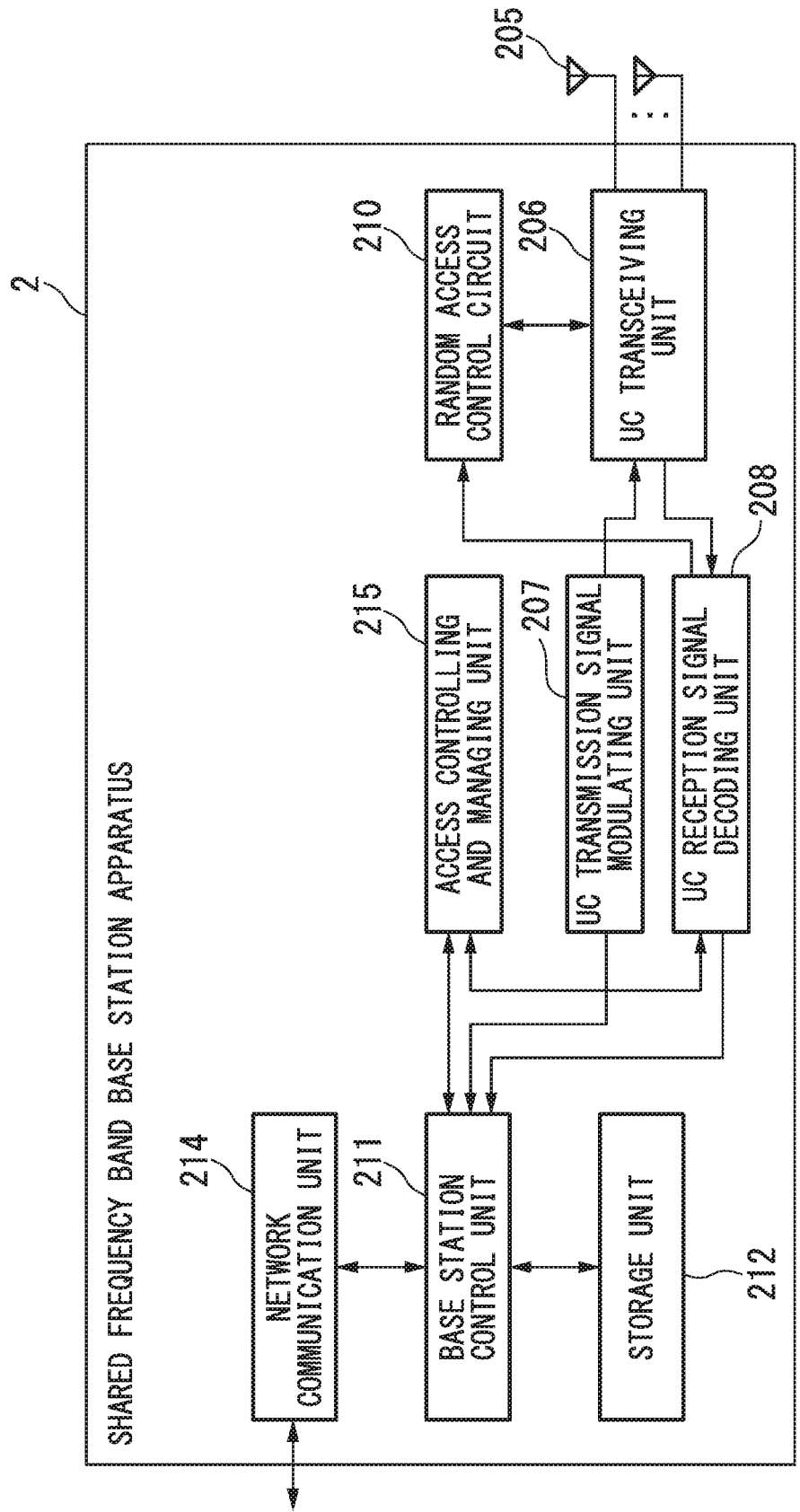
FIG. 4 is a block diagram illustrating a configuration of a shared frequency band base station apparatus 2 in the first embodiment.

FIG. 4 is a block diagram illustrating the configuration of the shared frequency band base station apparatus 2 in the first embodiment.

As illustrated in the drawing, the shared frequency band base station apparatus 2 includes UC antennas 205, a UC transceiving unit 206, a UC transmission signal modulating unit 207, a UC reception signal decoding unit 208, a random access control circuit 210, a base station control unit 211, a storage unit 212, a network communication unit 214, and an access controlling and managing unit 215.

The shared frequency band base station apparatus 2 provides a notification by means of periodic transmission of a beacon signal including identification information of the shared frequency band base station apparatus in order to notify neighboring terminal apparatuses 1 of the identification information.

The base station control unit 211 generates beacon information including the identification information of the shared frequency band base station apparatus and information on the functions of the shared frequency band base station apparatus.

The UC transmission signal modulating unit 207 receives the beacon information generated by the base station control unit 211 and modulates the beacon information. The UC transmission signal modulating unit 207 adds a pilot signal to the signal obtained by modulating the beacon information and outputs the resultant signal to the UC transceiving unit 206.

The UC transceiving unit 206 performs D/A conversion, up-conversion to a carrier frequency, amplification, and the like on the signal input from the UC transmission signal modulating unit 207 and transmits the resultant signal through the UC antennas 205. The transmission of a signal by the UC transceiving unit 206 is transmission based on Carrier Sense Multiple Access with Collision Avoidance (CSMA/CA).

The random access control circuit 210 controls a transmission timing of the UC transceiving unit 206. Similarly to the random access control circuit 110 of the terminal apparatus 1, if the reception level of a signal received by the UC transceiving unit 206 is higher than or equal to a predetermined threshold value or if a signal instructing virtual carrier sensing, such as setting of NAV, is received, the random access control circuit 210 instructs the UC transceiving unit 206 to stop transmission.

The UC transceiving unit 206 transmits a signal in a period in which a transmission stop instruction is not received from the random access control circuit 210. It is to be noted that when the shared frequency band base station apparatus 2 does not perform transmission based on the CSMA/CA, the shared frequency band base station apparatus 2 may not include the random access control circuit 210.

The UC transceiving unit 206 receives a signal transmitted from a terminal apparatus 1 via the UC antennas 205. The UC transceiving unit 206 outputs a signal obtained by performing amplification, down-conversion, and A/D conversion, and the like on the received signal to the UC reception signal decoding unit 208.

The UC reception signal decoding unit 208 decodes the signal input from the UC transceiving unit 206 and outputs information obtained through the decoding to the base station control unit 211.

The base station control unit 211 stores the identification information of the terminal apparatus 1 obtained by the receiving process in the storage unit 212. The base station control unit 211 may delete the identification information of the terminal apparatus 1 stored in the storage unit 212 after a predetermined time passes from when the storage has been performed. Moreover, the base station control unit 211 may transmit the identification information of the terminal apparatus 1 stored in the storage unit 212 to the LC-UC cooperation control apparatus 5 via the network communication unit 214.

In the first embodiment, when the LC-UC cooperation control apparatus 5 determines that UC is to be used for communication, the shared frequency band base station apparatus 2 and the terminal apparatuses 1 perform wireless communication via UC in accordance with the above-mentioned four scenarios.

In Scenarios 1 and 2, user data from the terminal apparatuses 1 is received via the uplinks. In this case, the shared frequency band base station apparatus 2 may not receive the signal from the LC-UC cooperation control apparatus 5, may not include the access controlling and managing unit 215, and may receive the signals from the terminal apparatuses 1 by reception based on a normal random access scheme.

Alternatively, the shared frequency band base station apparatus 2 may receive the UC use designation information from the LC-UC cooperation control apparatus 5 via the network communication unit 214. The UC use designation information in Scenarios 1 and 2 can include information of the terminal apparatuses 1 performing the uplinks, information of user data waiting for transmission and stored in the terminal apparatuses 1, and an ending condition of UC communication. The access controlling and managing unit 215 acquires the UC use designation information via the base station control unit 211.

In Scenarios 3 and 4, user data to the terminal apparatuses 1 is transmitted via the downlinks.

The shared frequency band base station apparatus 2 receives the UC use designation information from the LC-UC cooperation control apparatus 5 via the network communication unit 214. The UC use designation information in Scenarios 1 and 2 can include information of the terminal apparatuses 1 performing the uplinks, information of user data transmitted to user terminal, and an ending condition of UC communication. The access controlling and managing unit 215 acquires the UC use designation information via the base station control unit 211.

Furthermore, the network communication unit 214 receives the user data addressed to the terminal apparatuses 1 from the external network 6 via the gateway 4. The base station control unit 211 stores the user data received by the network communication unit 214 in the storage unit 212.

The access controlling and managing unit 215 waits until the downlink transmission request signal from the terminal apparatus 1 indicated by the identification information included in the UC use designation information is received.

Alternatively, when user data is transmitted to the designated terminal apparatus 1, it is possible to designate, in the UC use designation information, whether the shared frequency band base station apparatus 2 does not acquire access right (a transmission opportunity) at all, or whether the shared frequency band base station apparatus 2 also acquires access right (a transmission opportunity), the terminal apparatus 1 also acquires access right (a reception opportunity), and transmission of the user data is performed.

When both the shared frequency band base station apparatus 2 and the terminal apparatus 1 acquire access right and transmission of the user data in the downlink is performed, rather than waiting until the downlink transmission request signal from the terminal apparatus 1 indicated by the identification information included in the UC use designation information is received, the access controlling and managing unit 215 can transmit the user data waiting for transmission stored in the storage unit 212 by acquiring access right (a transmission opportunity) while waiting for the downlink transmission request signal.

Moreover, in Scenarios 2, 3, and 4, when the uplink transmission request signal or the downlink transmission request signal from a terminal apparatus 1 which is a destination of the user data is detected, the UC reception signal decoding unit 208 outputs the signal to the access controlling and managing unit 215.

In Scenario 2, the access controlling and managing unit 215 detects that uplink transmission by a plurality of terminal apparatuses 1 is performed from the uplink transmission request signal and performs preparation necessary for decoding. The necessary preparation is, for example, preparation for decoding of multi-user concurrent communication and examples thereof include initiation of necessary analog-to-digital conversion ports, preparation for signal processing necessary for user separation, changing of a frequency bandwidth, and preparation for decoding pilot signals of a plurality of different terminal apparatuses 1.

Also in Scenario 4, transmission to a plurality of terminal apparatuses 1 is required, and thus the access controlling and managing unit 215 performs preparation necessary for the multi-user concurrent communication. Examples of the necessary preparation include allocation of bands to the terminal apparatuses 1, and preparation of corresponding modulation and bandwidths in the case of the multi-user concurrent transmission in accordance with the OFDMA, preparation for notification of codes in the case of the multi-user multiplexing based on coding, and generation of request signals for acquiring channel information for a plurality of terminal apparatuses and calculation of transmission weights using channel information estimated for the plurality of terminal apparatuses 1 in the case of the multi-user concurrent transmission based on the spatial multiplexing.

In Scenario 3 or 4, when the downlink transmission request is input to the shared frequency band base station apparatus 2, the base station control unit 211 reads user data addressed to at least one terminal apparatus 1 designated as a transmission destination of the downlink transmission request from the storage unit 212.

The base station control unit 211 outputs the read user data to the UC transmission signal modulating unit 207. The user data is subjected to modulation and addition of a pilot signal by the UC transmission signal modulating unit 207. Here, since acquisition of access right and setting of NAV are performed by the terminal apparatus 1 as a communication partner, the shared frequency band base station apparatus 2 can transmit a user data signal immediately after a predetermined time, such as a Short Inter Frame Space (SIFS), passes without performing determination and preparation for the random access scheme.

The UC transmission signal modulating unit 207 outputs the user data signal to the UC transceiving unit 206, and the UC transceiving unit 206 performs D/A conversion, up-conversion, amplification, and the like on the user data signal and transmits the resultant signal via the UC antennas 205. Here, in only Scenario 1, similarly to the conventional wireless system, the signals from the terminal apparatuses 1 can be received and decoded. However, as described above, it is possible to decrease a probability of packet collision between the terminal apparatuses 1.

In Scenarios 1 and 2, information of the user data received by the UC transceiving unit 206 is acquired by the UC reception signal decoding unit 208.

In Scenarios 3 and 4, when it is detected that transmission bits are included in a signal obtained by decoding ACK or Block-ACK from a terminal apparatus 1 after the UC transceiving unit 206 transmits the user data to the terminal apparatus 1, the UC reception signal decoding unit 208 acquires the transmission bits. The UC reception signal decoding unit 208 outputs the acquired transmission bits to the base station control unit 211.

The base station control unit 211 may determine whether retransmission is necessary based on the transmission bits input from the UC reception signal decoding unit 208 and output the user data to the UC transmission signal modulating unit 207 again if retransmission is necessary.

When the shared frequency band base station apparatus 2 determines the ending condition for ending use of UC, which is included in the UC use designation information, the access controlling and managing unit 215 collects information relating to the ending condition.

For example, when the ending condition is determined as an amount of information of user data which is decoded successfully by the terminal apparatus 1 or the shared frequency band base station apparatus 2, the UC reception signal decoding unit 208 can output information on the amount of the user data which is transmitted or received successfully to the access controlling and managing unit 215, and the access controlling and managing unit 215 can determine whether UC is continuously used in the downlink to the terminal apparatus 1 based on this information and the acquired transmission bits.

It is to be noted that when the multi-user concurrent transmission based on the OFDMA or the spatial division multiplexing scheme is performed in wireless communication using UC (Scenario 4), the UC transceiving unit 206 concurrently transmits user data addressed to the plurality of terminal apparatuses 1. When the user data addressed to different terminal apparatuses 1 is concurrently transmitted in this way, the access controlling and managing unit 215 selects a combination of the destination terminal apparatuses 1.

For example, the terminal apparatuses 1 having high-accuracy channel information are combined, the terminal apparatuses 1 having the same access category (the type of transmission data) are combined, the terminal apparatuses 1 having larger data amounts of user data to be transmitted are combined, or the terminal apparatuses 1 between which the difference in data amount of user data to be transmitted is small are combined.

The access controlling and managing unit 215 outputs the identification information of the selected terminal apparatuses 1 to the base station control unit 211.

At the time of reading user data addressed to a terminal apparatus 1 from the storage unit 212, if there is no user data which has not been transmitted, the base station control unit 211 may add residual data information indicating that there is no amount of user data remaining in the downlink to the user data and output the user data and the residual data information to the UC transmission signal modulating unit 207. In this way, by notifying the terminal apparatus 1 that there is no user data to be transmitted to the terminal apparatus 1 in the downlink, it is possible to prevent utilization efficiency from decreasing due to unnecessary transmission of the downlink transmission request from the terminal apparatus 1.

The terminal apparatus 1 can notify the LC-UC cooperation control apparatus 5 that the wireless communication in UC in accordance with the present invention ends via the licensed band base station apparatus 3 through the communication using LC.

The shared frequency band base station apparatus 2 in the first embodiment may perform wireless communication with the terminal apparatuses 1 based on a conventional wireless system (e.g., a wireless LAN standard) using a random access scheme in a shared frequency band. Accordingly, in accordance with the configuration of the present invention, when UC is used in one or both of the uplinks and the downlinks in which the access right acquiring apparatus is designated, the communication based on the conventional wireless system may be used together.

The access controlling and managing unit 215 can monitor communication quality of the wireless communication using UC. Moreover, the access controlling and managing unit 215 may detect occurrence of an abnormality in the wireless communication using UC. At this time, the communication quality can be associated with a terminal apparatus 1 acquiring access right. That is, information relating to the throughput is evaluated for communication in which the shared frequency band base station apparatus 2 acquires access right and communication in which the terminal apparatus 1 acquires access right. The information relating to the throughput includes an MCS index, such as a modulation scheme, a coding rate, and a spatial multiplexing order, a frequency bandwidth, and a packet error rate.

For example, the abnormality detecting method detects, as an abnormality, a deviation between the information relating to the throughput of the communication in which the shared frequency band base station apparatus 2 acquires access right and information relating to the throughput of the communication in which the terminal apparatus 1 acquires access right, packet collision when a plurality of terminal apparatuses 1 that are communication partners in the uplinks are in the hidden terminal state, or packet collision with a signal which is transmitted from another terminal apparatus 1 which is in the hidden terminal state from the shared frequency band base station apparatus 2 in the downlink.

If there is a large deviation between the communication in which the shared frequency band base station apparatus 2 acquires access right and the communication in which the terminal apparatus 1 acquires access right, it can be estimated that packet collision due to the hidden terminal problem is occurring.

If the throughput is low when the shared frequency band base station apparatus 2 acquires access right, it is considered that communications by a wireless apparatus which is in a hidden terminal state from the shared frequency band base station apparatus 2 cause packet collision in the shared frequency band base station apparatus 2.

Moreover, if packet collision is occurring in a terminal apparatus 1 and the throughput is low when the terminal apparatus 1 acquires access right, it is considered that communication by a wireless apparatus which is in a hidden terminal state from the terminal apparatus cause packet collision in the shared frequency band base station apparatus 2.

The deviation between the throughputs of the different access right acquiring apparatuses can be determined, for example, by setting a in advance and detecting that the ratio of the throughput in the case in which the shared frequency band base station apparatus 2 acquires access right to the throughput in the case in which the terminal apparatus 1 acquires access right is greater than or equal to a or less than or equal to Va. In this way, it is possible to detect an access right acquiring apparatus in which packet collision is likely to occur or the throughput is low.

The LC-UC cooperation control apparatus 5 can determine the access right acquiring apparatus to be designated in the present invention by collecting information of an abnormality due to the difference between the access right acquiring apparatuses.

Moreover, the access controlling and managing unit 215 may output a communication abnormality in association with time, a day of the week, date, surrounding event information, and the like to the LC-UC cooperation control apparatus 5.

Furthermore, the access controlling and managing unit 215 evaluates packet collision or failure in packet decoding in association with the access right acquiring apparatus, and determines that a communication abnormality is occurring in the access right acquiring apparatus if a contention window size (the number of slots waiting for transmission) of the access right acquiring apparatus increases and a decrease in an acquisition rate of the transmission opportunity and/or a decrease in Medium Access Control (MAC) efficiency is determined.

The access controlling and managing unit 215 notifies the LC-UC cooperation control apparatus 5 of the identification information of the access right acquiring apparatus (i.e., the shared frequency band base station apparatus 2 or the terminal apparatus 1 that is a communication partner) which is determined to be an abnormality.

Moreover, the access controlling and managing unit 215 may detect packet collision between terminal apparatuses 1 that are communication partners and detect terminal apparatuses 1 that are incapable of detecting signals mutually by detecting the packet collision in the uplink of UC. The access controlling and managing unit 215 notifies the LC-UC cooperation control apparatus 5 of a combination of pieces of identification information of these terminal apparatuses 1 as a combination of the terminal apparatuses 1 that are incapable of detecting signals mutually.

Moreover, if the rate at which a corresponding signal, such as ACK or Block-ACK, is not replied after the shared frequency band base station apparatus 2 acquires access right and performs transmission is greater than a predetermined value, the access controlling and managing unit 215 can determine that an abnormality is occurring in the communication in which the shared frequency band base station apparatus 2 has acquired access right.

Furthermore, if Request To Send (RTS) is transmitted to the terminal apparatus 1 but Clear To Send (CTS) is not replied in communication in which RTS/CTS are exchanged or if communication failure is attributed to the packet collision in the terminal apparatus 1, the access controlling and managing unit 215 can determine that an abnormality in the downlink is occurring.

Furthermore, the access controlling and managing unit 215 may determine that there is a high possibility of occurrence of an abnormality in the downlink by comparing the identification information of other terminal apparatuses 1 using the same frequency channel in the shared frequency band which can be detected by the shared frequency band base station apparatus and the terminal apparatus 1. Specifically, if a group of terminal apparatuses 1 performing significant communication among other terminal apparatuses 1 indicated by the identification information detected by the shared frequency band base station apparatus 2 is included in a group of other terminal apparatuses 1 indicated by the identification information detected by the terminal apparatus 1, the access controlling and managing unit 215 determines that there is a high possibility of the occurrence of an abnormality in the downlink.

When an abnormality is occurring or there is a high possibility of occurrence of abnormality as a result of the above determination about to the abnormality, it is possible to improve the throughput in the shared frequency band by designating the access right acquiring apparatus in accordance with the present invention. Specifically, the access controlling and managing unit 215 can perform communication in accordance with the present invention which designates the access right acquirer by generating an LC assist request signal and transmitting the LC assist request signal to the LC-UC cooperation control apparatus 5 via the network communication unit 214.

For example, if the wireless communication in which the shared frequency band base station apparatus 2 acquires access right has an abnormality, it is possible to expect improvement in the throughput by allowing the terminal apparatus 1 to acquire access right and to perform communication. If the wireless communication in which the terminal apparatus 1 acquires access right has an abnormality, the wireless communication in which the shared frequency band base station apparatus 2 acquires access right can be performed.

Furthermore, in order to determine whether to output the LC assist request signal, information indicating whether the terminal apparatus 1 has a communication link using LC or whether the terminal apparatus 1 has a control function as the access right acquiring apparatus in accordance with the present invention may be acquired from the terminal apparatus 1 in advance.

Figure 5:
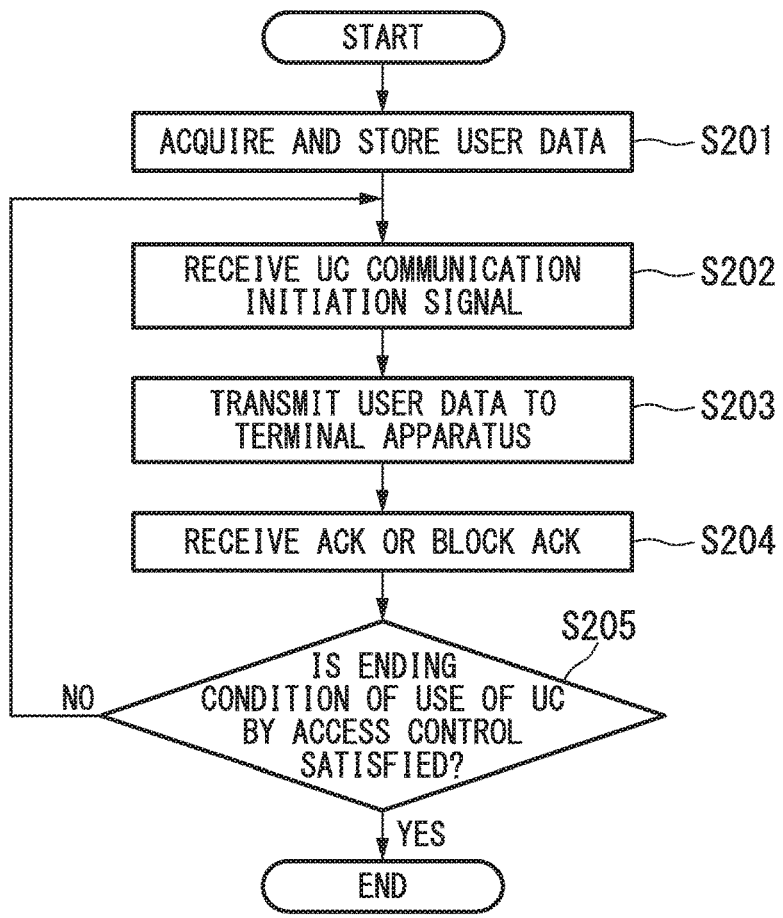
FIG. 5 is a flowchart illustrating a downlink communication process which is performed by the shared frequency band base station apparatus 2 in Scenario 3 and Scenario 4 in the first embodiment.

FIG. 5 is a flowchart illustrating a downlink communication process which is performed by the shared frequency band base station apparatus 2 in Scenarios 3 and 4 in accordance with the first embodiment.

The LC-UC cooperation control apparatus 5 determines that the shared frequency band base station apparatus 2 performs downlink communication using the terminal apparatus 1 as the access right acquiring apparatus, and the network communication unit 214 receives user data addressed to the terminal apparatus 1 from the licensed band base station apparatus 3. The base station control unit 211 stores the user data received by the network communication unit 214 in the storage unit 212 (step S201).

After the user data is acquired successfully, the base station control unit 211 may notify the LC-UC cooperation control apparatus 5 or the licensed band base station apparatus 3 that the user data is acquired successfully.

When the UC reception signal decoding unit 208 receives a downlink transmission request signal and detects a downlink transmission request (step S202), the user data corresponding to the identification information of the terminal apparatus 1 having transmitted the downlink transmission request signal or the identification information of at least one terminal apparatus 1 designated by the downlink transmission request signal is read from the storage unit 212 by the base station control unit 211 and is subjected to the signal processing by the UC transmission signal modulating unit 207 and the UC transceiving unit 206, and the resultant signal is then transmitted (step S203).

In step S203, the shared frequency band base station apparatus 2 may collect channel information corresponding to the corresponding terminal apparatus 1 before transmitting the user data to the terminal apparatus 1.

When the UC reception signal decoding unit 208 detects ACK or Block-ACK from the terminal apparatus 1 that is the destination of the user data from the received signal (step S204), the base station control unit 211 determines whether an ending condition for ending use of UC is satisfied (step S205).

If the ending condition for ending use of UC is satisfied (YES in step S205), the base station control unit 211 ends the downlink communication process. In contrast, if the ending condition for ending use of UC is not satisfied (NO in step S205), the base station control unit 211 returns the processing to step S202 and repeats the processes of step S202 and the steps subsequent thereto.

It is to be noted that after step S205 ends, the base station control unit 211 may notify the LC-UC cooperation control apparatus 5 that the communication in accordance with the present invention has ended successfully.

Figure 6:
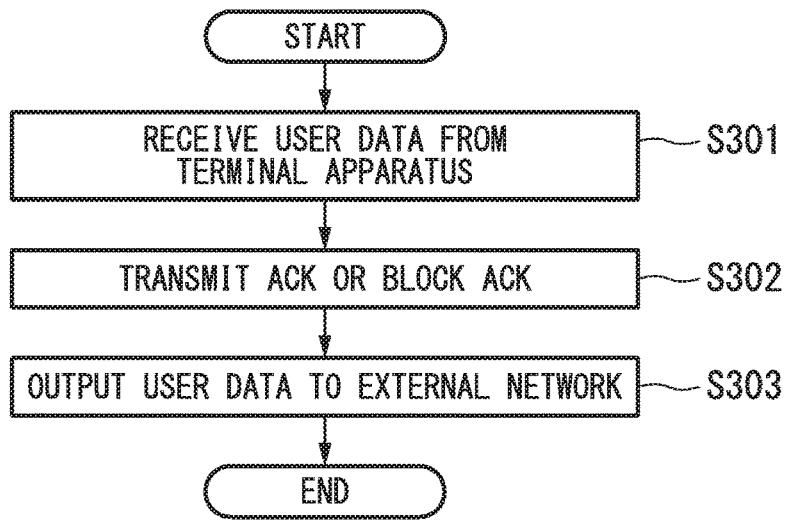
FIG. 6 is a flowchart illustrating an uplink communication process which is performed by the shared frequency band base station apparatus 2 in Scenario 1 and Scenario 2 in the first embodiment.

FIG. 6 is a flowchart illustrating an uplink communication process which is performed by the shared frequency band base station apparatus 2 in Scenarios 1 and 2 in accordance with the first embodiment.

When the LC-UC cooperation control apparatus 5 determines that the shared frequency band base station apparatus 2 performs uplink communication using the terminal apparatuses 1 as the access right acquiring apparatuses, the UC reception signal decoding unit 208 detects user data from the terminal apparatuses 1 from the signal received by the UC transceiving unit 206 (step S301).

In step S301, in the case of Scenario 2, the pattern of multi-user concurrent reception and the identification information of the corresponding terminal information can be acquired by receiving an uplink transmission request signal.

The base station control unit 211 generates ACK or Block-ACK and transmits ACK or Block-ACK to the corresponding terminal apparatuses 1 via the UC transmission signal modulating unit 207 and the UC transceiving unit 206 (step S302).

The base station control unit 211 transmits the user data detected by the UC reception signal decoding unit 208 to the external network 6 via the network communication unit 214 (step S303) and ends the uplink communication process.

Figure 7:
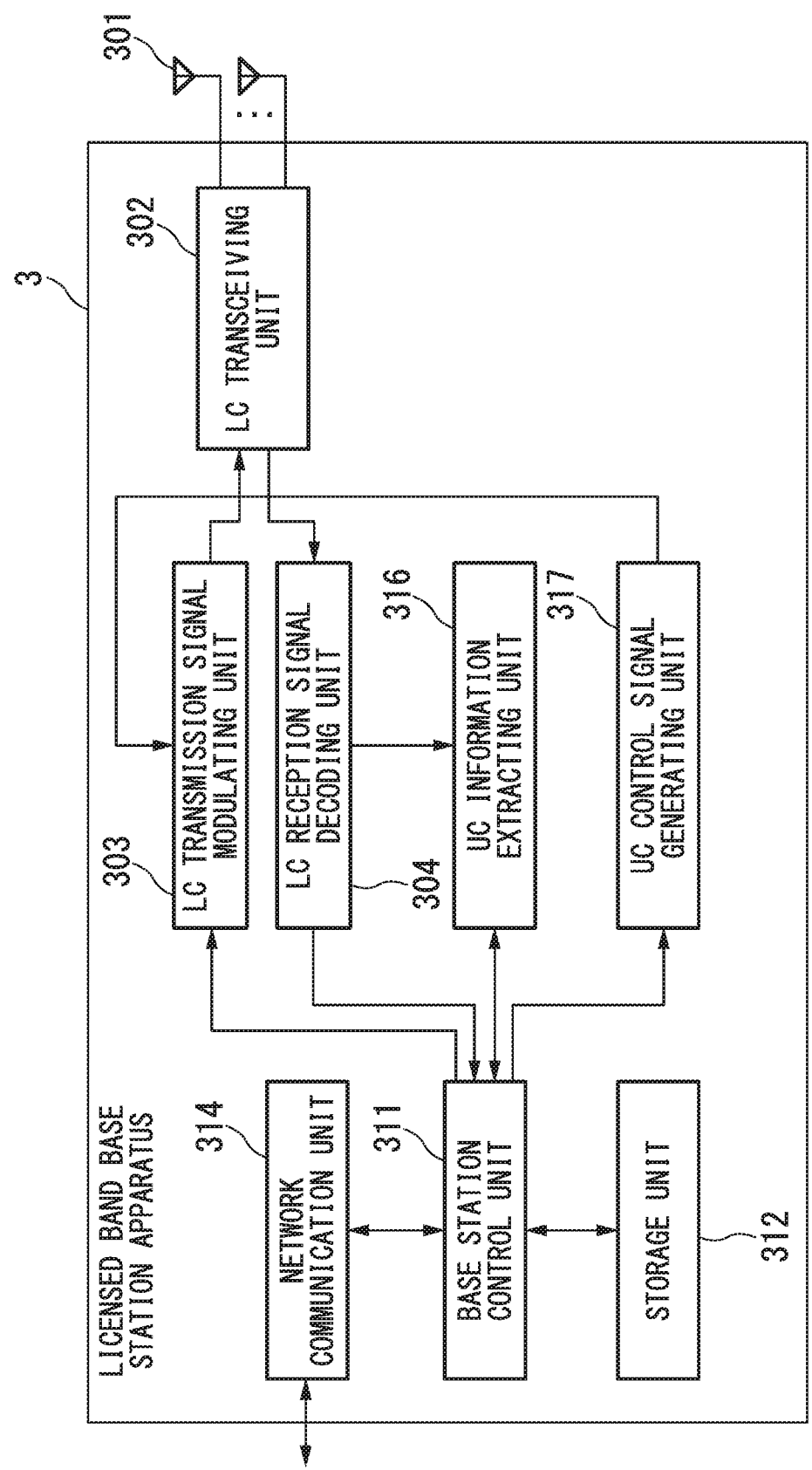
FIG. 7 is a block diagram illustrating a configuration of a licensed band base station apparatus 3 in the first embodiment.

FIG. 7 is a diagram illustrating the configuration of the licensed band base station apparatus 3 in the first embodiment.

As illustrated in the drawing, the licensed band base station apparatus 3 includes LC antennas 301, an LC transceiving unit 302, an LC transmission signal modulating unit 303, an LC reception signal decoding unit 304, a base station control unit 311, a storage unit 312, a network communication unit 314, a UC information extracting unit 316, and a UC control signal generating unit 317.

The licensed band base station apparatus 3 establishes a link with a terminal apparatus 1 in LC and transmits and receives a control signal for controlling communication between the shared frequency band base station apparatus 2 and the terminal apparatus 1 which belong to the same communication cell. The control signal is, for example, a UC communication initiation signal.

When a signal transmitted from the terminal apparatus 1 is received by the LC antennas 301, the received signal is input to the LC transceiving unit 302. The LC transceiving unit 302 performs down-conversion and A/D conversion on the input signal and outputs the obtained signal to the LC reception signal decoding unit 304. The LC reception signal decoding unit 304 decodes the signal input from the LC transceiving unit 302 and outputs information acquired by the decoding to the base station control unit 311. The base station control unit 311 may perform authentication, authorization, and accounting (AAA) based on the identification information of the terminal apparatus 1 included in the information input from the LC reception signal decoding unit 304. The base station control unit 311 may acquire information necessary for the AAA via the network communication unit 314.

When a link using LC is established between the licensed band base station apparatus 3 and the terminal apparatus 1, the LC reception signal decoding unit 304 or the base station control unit 311 evaluates the communication quality in the link. LC communication quality which is communication quality in LC is evaluated based on a channel gain between the licensed band base station apparatus 3 and the terminal apparatus 1, mobility, and a communication function of the terminal apparatus 1.

For each terminal apparatus having established the link, the base station control unit 311 stores the LC communication quality in the storage unit 312 in association with the identification information of each terminal apparatus 1 having established the link.

The base station control unit 311 outputs the identification information of the terminal apparatus 1 having established the link and the LC communication quality to the LC-UC cooperation control apparatus 5. The base station control unit 311 outputs information to be used for control at the time of performing the AAA on the terminal apparatus 1 and the identification information of the licensed band base station apparatus to the LC transmission signal modulating unit 303.

The LC transmission signal modulating unit 303 modulates the information input from the base station control unit 311 and outputs a signal obtained through the modulation to the LC transceiving unit 302. The LC transceiving unit 302 performs D/A conversion, up-conversion to a carrier frequency, and amplification on the signal input from the LC transmission signal modulating unit 303 and transmits the resultant signal through the LC antennas 301.

Moreover, the licensed band base station apparatus 3 may transmit a UC information request signal as a control signal to a terminal apparatus 1. Accordingly, the licensed band base station apparatus 3 can acquire UC information including the identification information of the shared frequency band base station apparatus 2 and other terminal apparatuses 1 located near each terminal apparatus 1 and link use information on use of the wireless communication in UC.

In the licensed band base station apparatus 3, the signal received by the LC antennas 301 is input to the LC transceiving unit 302. The LC transceiving unit 302 performs down-conversion and A/D conversion on the signal input from the LC antennas 301 and outputs the resultant signal to the LC reception signal decoding unit 304.

The LC reception signal decoding unit 304 outputs information acquired by decoding the signal input from the LC transceiving unit 302 to the UC information extracting unit 316 and the base station control unit 311.

The UC information extracting unit 316 transmits information on UC among the information input from the LC reception signal decoding unit 304 to the LC-UC cooperation control apparatus 5 via the network communication unit 314.

Then, the LC-UC cooperation control apparatus 5 selects at least one terminal apparatus 1 that performs wireless communication with the shared frequency band base station apparatus 2 and notifies the licensed band base station apparatus 3 of the selection result.

The network communication unit 314 can acquire the identification information of the selected terminal apparatus 1 and the identification information of the terminal apparatus 1 from the LC-UC cooperation control apparatus 5 or acquire a UC use condition of the terminal apparatus 1 from the LC-UC cooperation control apparatus 5. Moreover, the network communication unit 314 may acquire the identification information of the shared frequency band base station apparatus 2, which is a communication partner of the terminal apparatus 1.

In Scenarios 1 and 2, information of user data waiting for transmission, information of an application used for uplink communication, and throughput information required for the uplinks in the terminal apparatuses 1 are acquired by communication using LC. The acquired information on the uplinks of the terminal apparatuses 1 is output to the LC-UC cooperation control apparatus 5 via the network communication unit 314.

When the LC-UC cooperation control apparatus 5 determines that uplinks of UC are initiated using the terminal apparatuses 1 as the access right acquiring apparatuses, the UC control signal generating unit 317 acquires the identification information of the terminal apparatuses 1 as described above, and generates a UC communication initiation signal for notifying the terminal apparatuses 1 having the designated identification information that the uplink communication in which the terminal apparatuses 1 acquire access right in UC is performed. The UC communication initiation signal includes UC use designation information indicating at least one of the identification information of the terminal apparatuses 1 and the shared frequency band base station apparatus 2 performing wireless communication using UC, an access method, an access timing, an access time band, the number of communication bits, and an ending condition for ending use of UC.

The UC control signal generating unit 317 outputs the generated UC communication initiation signal to the LC transmission signal modulating unit 303. The UC communication initiation signal output to the LC transmission signal modulating unit 303 is transmitted from the LC transceiving unit 302 to the terminal apparatus 1.

It is to be noted that the LC-UC cooperation control apparatus 5 may output information on the uplinks of the terminal apparatuses 1 determined as the access right acquiring apparatuses along with the identification information of the terminal apparatuses 1 to the UC control signal generating unit 317. Moreover, the UC control signal generating unit 317 may not generate the UC communication initiation signal, but the LC-UC cooperation control apparatus 5 may generate the UC communication initiation signal and output the generated UC communication initiation signal to the licensed band base station apparatus 3.

When multi-user concurrent communication is performed in uplinks in accordance with Scenario 2, one of the terminal apparatuses 1 acquires access right and then the other terminal apparatuses 1 also performs transmission concurrently. Accordingly, the UC communication initiation signal may include one of frequency allocation of the OFDMA, a transmission timing after the access right is acquired, code allocation information, synchronization deviation compensation information, and the identification information of the terminal apparatuses 1 designated to concurrently perform transmission.

In Scenarios 3 and 4, the base station control unit 311 presumes that preparation for transmission of user data is completed in the shared frequency band base station apparatus 2 and then transmits the UC communication initiation signal to the terminal apparatuses 1. If user data addressed to the selected terminal apparatuses 1 is stored in the storage unit 312, the user data is output to the shared frequency band base station apparatus 2 via the network communication unit 314.

The UC control signal generating unit 317 generating a signal for controlling use of UC in which the access right acquiring apparatuses are designated generates a control signal indicating that downlink communication in which the terminal apparatuses 1 acquire access right is initiated. The UC control signal generating unit 317 outputs the generated control signal to the LC transmission signal modulating unit 303.

The control signal output to the LC transmission signal modulating unit 303 is transmitted as the UC communication initiation signal from the LC transceiving unit 302 to the terminal apparatuses 1.

The LC transmission signal modulating unit 303 modulates information input from the UC control signal generating unit 317 or the base station control unit 311 and outputs the modulated information to the LC transceiving unit 302. The signal output to the LC transceiving unit 302 is transmitted to the terminal apparatuses 1 via the LC antennas 301.

When UC communication report information indicating that wireless communication between the shared frequency band base station apparatus 2 and the terminal apparatuses 1 using UC ends successfully or ends abnormally is received, the licensed band base station apparatus 3 can transmit the received UC communication report information to the LC-UC cooperation control apparatus 5.

Figure 8:
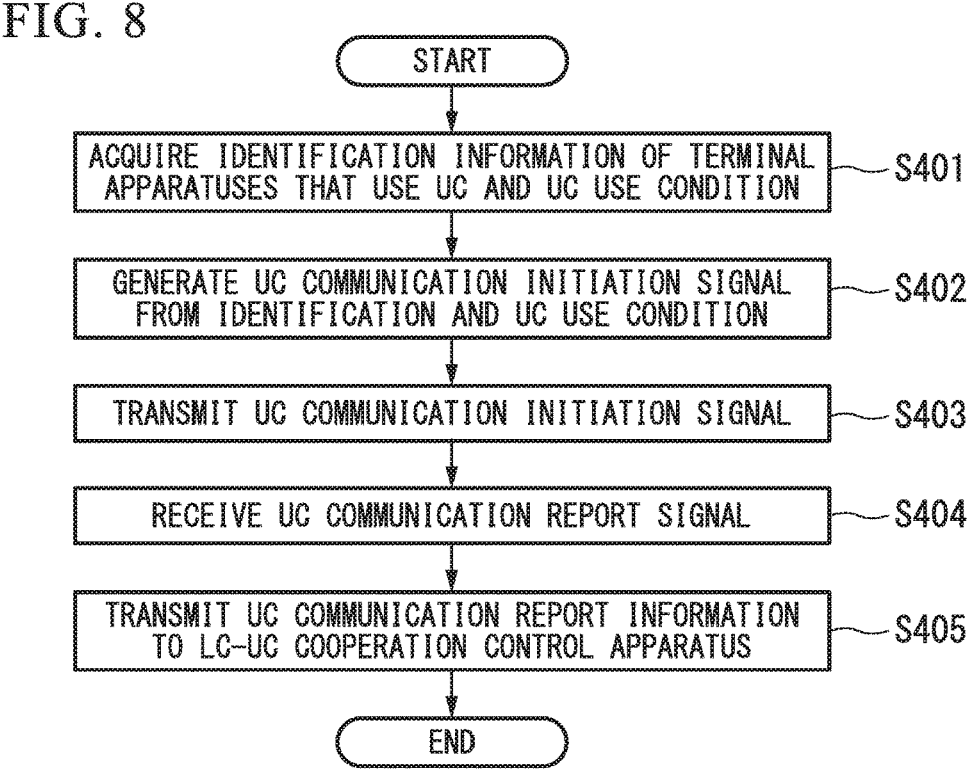
FIG. 8 is a flowchart illustrating a control process which is performed by the licensed band base station apparatus 3 in Scenario 3 and Scenario 4 in the first embodiment.

FIG. 8 is a flowchart illustrating a control process which is performed by the licensed band base station apparatus 3 in Scenarios 3 and 4 in accordance with the first embodiment.

When terminal apparatuses 1 controlling access right and performing UC communication among the terminal apparatuses 1 belonging to a communication cell of the licensed band base station apparatus 3 are determined by the LC-UC cooperation control apparatus 5, the network communication unit 314 of the licensed band base station apparatus 3 acquires the identification information and UC use condition of the terminal apparatuses 1 which use UC from the LC-UC cooperation control apparatus 5 (step S401).

The network communication unit 314 may acquire the identification information of the shared frequency band base station apparatus 2 with which the terminal apparatuses 1 communicates using UC along with the identification information of the terminal apparatuses 1.

The UC control signal generating unit 317 generates a UC communication initiation signal for notifying the terminal apparatuses 1 which are designated by the identification information received by the network communication unit 314 of the UC communication in accordance with the present invention (step S402).

The LC transmission signal modulating unit 303 modulates the UC communication initiation signal generated by the UC control signal generating unit 317 and outputs the modulated signal to the LC transceiving unit 302. The LC transceiving unit 302 performs D/A conversion, up-conversion, and amplification on the modulated control signal and transmits the resultant signal to the terminal apparatuses 1 via the LC antennas 301 (step S403).

Here, the UC communication initiation signal may be transmitted as a notification signal notifying the overall communication cell of the licensed band base station apparatus 3 or may be individually transmitted to the corresponding terminal apparatus 1.

When an end of the communication in accordance with the present invention is determined by a terminal apparatus 1, UC communication report information transmitted from the terminal apparatus 1 when the ending condition for ending use of UC in accordance with the present invention is satisfied may be received by the licensed band base station apparatus 3 via LC. That is, in the licensed band base station apparatus 3, when the UC communication report information from the terminal apparatus 1 is detected from the information input from the LC reception signal decoding unit 304 (step S404), the UC information extracting unit 316 transmits the detected UC communication report information to the LC-UC cooperation control apparatus 5 via the network communication unit 314 (step S405) and ends the control process.

Figure 9:
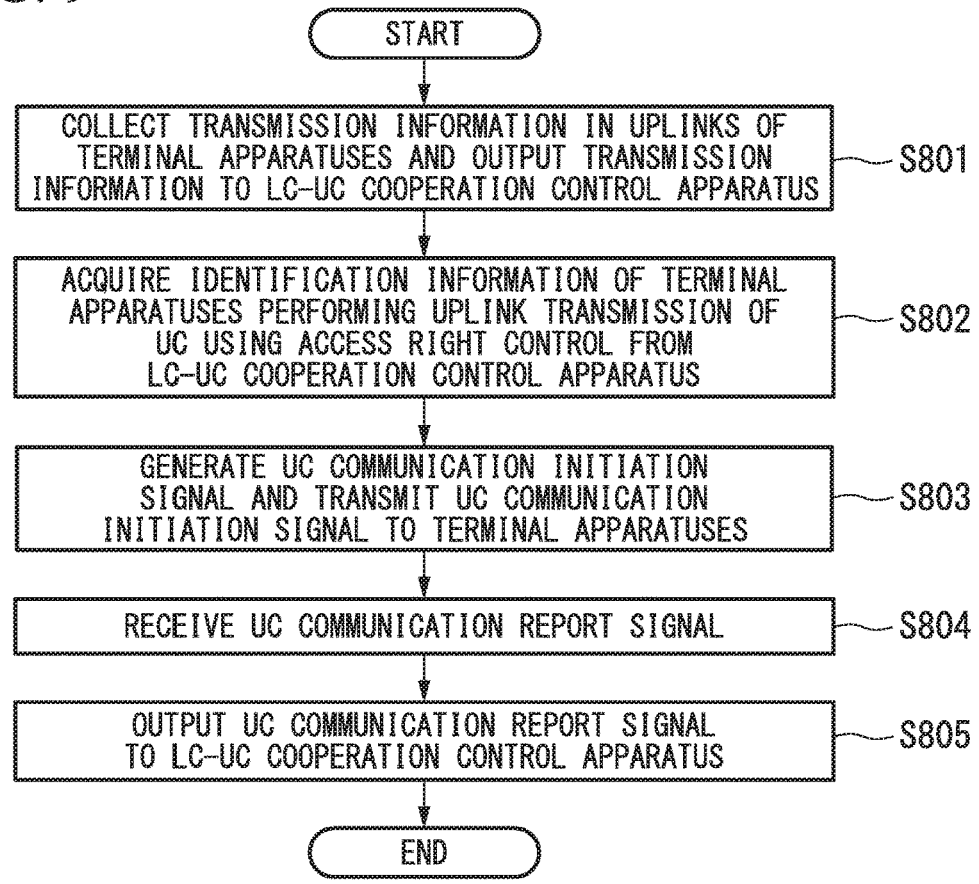
FIG. 9 is a flowchart illustrating a control process which is performed by the licensed band base station apparatus 3 in Scenario 1 and Scenario 2 in the first embodiment.

FIG. 9 is a flowchart illustrating a control process which is performed by the licensed band base station apparatus 3 in Scenarios 1 and 2 in accordance with the first embodiment.

The licensed band base station apparatus 3 collects transmission information of uplink communication, such as information on user data waiting for transmission, application information used in the uplinks, throughput achievement information of the uplinks continuously measured up to now, and throughput information which is requested for the uplinks from the terminal apparatuses 1 within the communication cell and outputs the collected information to the LC-UC cooperation control apparatus 5 (S801).

When a determination is made that the terminal apparatuses 1 acquire access right to perform uplink communication, the LC-UC cooperation control apparatus 5 outputs the identification information of the terminal apparatuses 1 to the licensed band base station apparatus 3 and the licensed band base station apparatus 3 acquires the identification information from the network communication unit 314 (S802).

The UC control signal generating unit 317 generates a UC communication initiation signal and notifies the designated terminal apparatuses 1 to acquire access right in UC and to transmit uplink communication (S803).

When a terminal apparatus 1 determines that the UC communication ends, the licensed band base station apparatus 3 receives a UC communication report signal transmitted from the terminal apparatus 1, acquires report information on the UC communication (S804), and outputs the acquired report information to the LC-UC cooperation control apparatus 5 (S805).

Before the control flows illustrated in FIGS. 8 and 9 are performed, the licensed band base station apparatus 3 may cause the terminal apparatuses 1 to detect radio environment information of a shared frequency band, information of the shared frequency band base station apparatus 2, and the identification information of the surrounding terminal apparatuses 1 and may collect the information.

In Scenarios 3 and 4 in accordance with the first embodiment, it is possible to increase the number of access right acquiring apparatuses in the downlinks by causing the terminal apparatus 1 to acquire access right. By causing a plurality of terminal apparatuses 1 to acquire access right of the downlinks, it can be expected to improve a radio resource acquisition rate in the wireless system using the random access scheme.

Second Embodiment

Similarly to the wireless communication system in the first embodiment, a wireless communication system in the second embodiment includes a plurality of terminal apparatuses 1, a shared frequency band base station apparatus 2, a licensed band base station apparatus 3, a gateway 4, and an LC-UC cooperation control apparatus 5. Moreover, the elements of the apparatuses are the same.

The second embodiment aims at improving the throughput in random access of a shared frequency band by causing the shared frequency band base station apparatus 2 to acquire access right and to perform uplink or downlink communication. The four scenarios can be considered also in the second embodiment, similarly to the first embodiment. (However, the access right acquiring apparatus is the shared frequency band base station apparatus 2).
[Scenario 1]

Access right is acquired and terminal apparatuses 1 are caused to perform uplink single-user transmission in a UC.
[Scenario 2]

Access right is acquired and a plurality of terminal apparatuses 1 are caused to perform uplink multi-user concurrent transmission in the UC.
[Scenario 3]

Access right is acquired and downlink single-user transmission in UC is performed.
[Scenario 4]

Access right is acquired and downlink multi-user concurrent transmission in UC is performed.

A UC communication initiation signal can designate one of the above-mentioned scenarios, and can include UC use designation information indicating identification information of the terminal apparatuses 1 and the shared frequency band base station apparatus 2 performing wireless communication using UC, an access method, an access timing, an access time band, the number of communication bits, and an ending condition for ending use of UC.

In Scenarios 1 and 2 in accordance with the second embodiment, similarly to Scenarios 1 and 2 in accordance with the first embodiment, the LC-UC cooperation control apparatus 5 collects whether data to be transmitted in the uplinks is present in the terminal apparatuses 1 from the licensed band base station apparatus 3 via LC.

The shared frequency band base station apparatus 2 can avoid packet collision by requesting the terminal apparatuses 1 to perform uplink transmission using an uplink transmission request signal, such as a polling signal.

In uplink multi-user concurrent communication in Scenario 2 in accordance with the second embodiment, information of user data waiting for transmission in the uplinks of the terminal apparatuses 1 and information of the throughput which is requested for the uplinks can be acquired without using UC, and thus it is possible to efficiently reduce an overhead of multi-user concurrent communication and to efficiently communicate using UC.

Scenarios 3 and 4 constitute a conventional wireless system based on a random access scheme in which the shared frequency band base station apparatus 2 acquires access right and performs transmission.

A control flow of a terminal apparatus 1 in accordance with the second embodiment will be described below with reference to FIG. 3 which illustrates the control flow of the first embodiment.

In communication using UC in step S105 corresponding to FIG. 3, communication in which the shared frequency band base station apparatus 2 acquires access right is performed. In this case, reception of the UC communication initiation signal via LC in step S103 can be skipped, and the shared frequency band base station apparatus 2 may acquire the corresponding signal via the network communication unit 214. The UC communication report information in step S107 may not be transmitted from the terminal apparatus 1, but it may be determined by the shared frequency band base station apparatus 2 and it may be output from the network communication unit 214 to the LC-UC cooperation control apparatus 5, whereby step S107 can be skipped.

Figure 10:
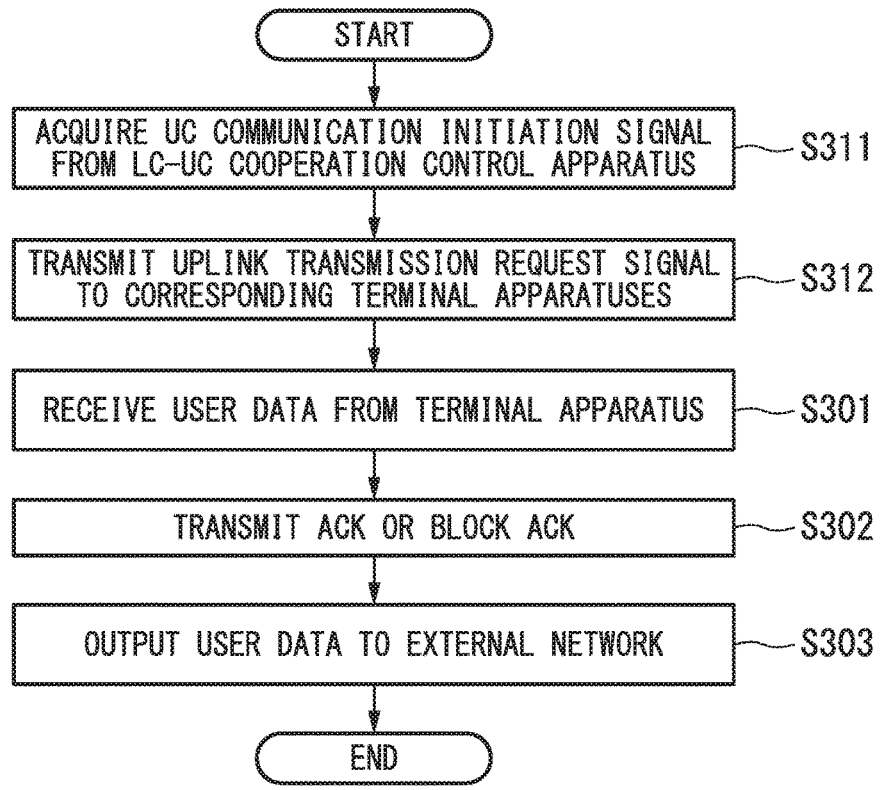
FIG. 10 is a flowchart illustrating an uplink communication process which is performed by the shared frequency band base station apparatus 2 in Scenario 1 and Scenario 2 in a second embodiment.

FIG. 10 is a flowchart illustrating an uplink communication process which is performed by the shared frequency band base station apparatus 2 in Scenarios 1 and 2 in accordance with the second embodiment.

Scenarios 1 and 2 in the second embodiment correspond to FIG. 6 in the first embodiment and there are additional steps prior to step S301.

First, the shared frequency band base station apparatus 2 acquires a UC communication initiation signal from the LC-UC cooperation control apparatus 5 and is notified that access right of UC should be acquired and then uplink communication should be performed (S311). Then, the shared frequency band base station apparatus 2 transmits an uplink transmission request signal, such as a polling signal, to acquire the access right of the uplinks (S312).

The shared frequency band base station apparatus 2 requests the terminal apparatus 1 to transmit user data using the uplink transmission request signal, the user data is transmitted from the terminal apparatus 1, and the shared frequency band base station apparatus 2 decodes the user data from the received signal (S301). Then, the shared frequency band base station apparatus 2 transmits ACK or Block-ACK (S302) and outputs the user data to the external network 6 (S303).

The shared frequency band base station apparatus 2 can output a UC communication report signal for reporting communication quality in UC in addition to the user data to the LC-UC cooperation control apparatus 5.

Scenarios 3 and 4 in the second embodiment correspond to the flow illustrated in FIG. 5 of the first embodiment, but do not need reception of the UC communication initiation signal (step S202) and thus are not greatly different from normal downlink communication in UC.

The control flow of the licensed band base station apparatus 3 in Scenarios 1 and 2 of the second embodiment can be explained to correspond to the flowchart (FIG. 9) of the first embodiment.

The licensed band base station apparatus 3 collects transmission information of uplink communication, such as information on user data waiting for transmission, application information used in the uplinks, throughput achievement information of the uplinks continuously measured up to now, and throughput information which is requested for the uplinks, from the terminal apparatuses 1 within the communication cell and outputs the collected information to the LC-UC cooperation control apparatus 5 (S801).

The LC-UC cooperation control apparatus 5 determines that the shared frequency band base station apparatus 2 acquires access right and performs uplink communication, and outputs the identification information of the terminal apparatuses 1 to the licensed band base station apparatus 3. Accordingly, the network communication unit 314 of the licensed band base station apparatus 3 acquires the identification information (S802).

The UC control signal generating unit 317 generates a UC communication initiation signal and notifies the designated terminal apparatuses 1 to wait for reception of an uplink transmission request signal from the shared frequency band base station apparatus 2 as a communication partner without acquiring the access right in UC (S803).

When a terminal apparatus 1 determines that the UC communication ends, the licensed band base station apparatus 3 receives a UC communication report signal transmitted from the terminal apparatus 1, acquires report information on the UC communication (S804), and outputs the acquired report information to the LC-UC cooperation control apparatus 5 (step S805).

It is to be noted that when the shared frequency band base station apparatus 2 outputs the UC communication report signal to the LC-UC cooperation control apparatus 5, S804 and S805 can be skipped.

In Scenarios 3 and 4 of the second embodiment, the shared frequency band base station apparatus 2 acquires access right and transmits user data, and thus the licensed band base station apparatus 3 is not required to perform any particular control flow.

In the wireless communication system in the second embodiment, improvement in utilization efficiency of a shared frequency band can be expected in two cases of a case in which packet collision due a hidden terminal problem decreases the throughput in communication in which terminal apparatuses 1 acquire access right and perform transmission (which relates to Scenarios 1 and 2) and a case in which the shared frequency band base station apparatus 2 has an uplink multi-user concurrent communication function (which relates to Scenario 2).

Figure 11:
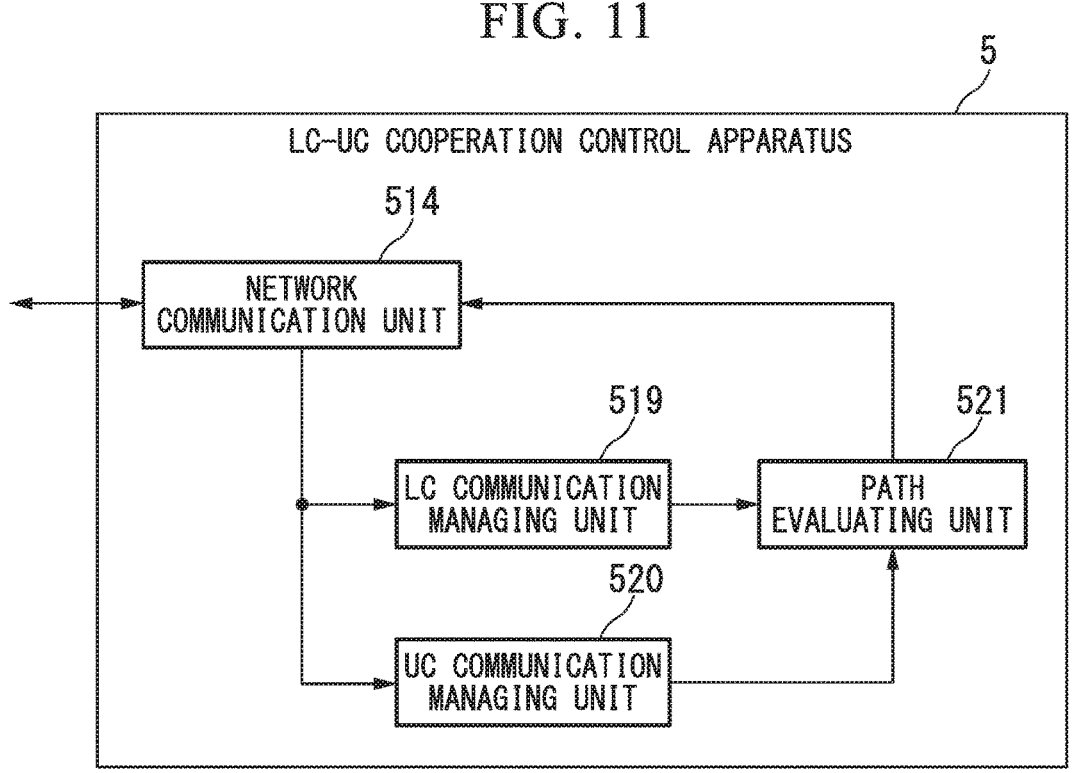
FIG. 11 is a block diagram illustrating a configuration of an LC-UC cooperation control apparatus 5 in the first and second embodiments.

FIG. 11 is a block diagram illustrating the configuration of the LC-UC cooperation control apparatus 5 in the first and second embodiments. As illustrated in the drawing, the LC-UC cooperation control apparatus 5 includes an LC communication managing unit 519, a UC communication managing unit 520, a path evaluating unit 521, and a network communication unit 514. However, the LC communication managing unit 519 can be omitted.

The LC communication managing unit 519 acquires identification information of terminal apparatuses 1 connecting to the licensed band base station apparatus 3, communication quality of LC of the terminal apparatuses 1, a backhaul capacity of the licensed band base station apparatus 3, and tightened information of a radio link capacity of LC. The LC communication managing unit 519 may store the acquired identification information of the terminal apparatuses 1 and the acquired communication quality in association with each other.

The network communication unit 514 transmits and receives information to and from external apparatuses, such as the shared frequency band base station apparatus 2, the licensed band base station apparatus 3, and the gateway 4.

The UC communication managing unit 520 acquires identification information of the terminal apparatuses 1 that can communicate with the shared frequency band base station apparatus 2 and information on communication quality of UC between the terminal apparatuses 1 and the shared frequency band base station apparatus 2. The UC communication managing unit 520 stores the acquired identification information of the terminal apparatuses 1 and radio environment information around the terminal apparatuses 1 including the communication quality or the like in association with each other. For example, the UC communication managing unit 520 can store abnormality determination conditions in communication using UC between the terminal apparatuses 1 and the shared frequency band base station apparatus 2 for a case in which a terminal apparatus 1 acquires access right and a case in which the shared frequency band base station apparatus 2 acquires access right.

The path evaluating unit 521 determines whether to perform UC communication in which access right is designated in order to increase a communication capacity in the wireless communication system. Here, the path evaluating unit 521 may determine whether the terminal apparatuses 1 are capable of detecting each other and designate only a combination of the terminal apparatuses 1 capable of detecting each other as the terminal apparatuses 1 performing the UC communication in accordance with the first embodiment.

The communication in which a terminal apparatus 1 acquires access right in the first embodiment is particularly effective for solving the hidden terminal problem in which a radio signal in UC which can be received and detected by the selected terminal apparatus 1 cannot be detected by the shared frequency band base station apparatus 2 as a communication partner. Accordingly, the UC communication managing unit 520 can evaluate whether a wireless apparatus functioning as a terminal hidden from the shared frequency band base station apparatus 2 causes a problem, such as packet collision in the terminal apparatuses 1.

It is not necessary to strictly determine whether the hidden terminal problem is occurring at that instant, and the UC communication use in accordance with the present invention can be used based on experience, such as a high possibility of causing a high throughput when the terminal apparatus 1 acquires access right.

Empirically, in a method for using the UC communication in accordance with the present invention, information on the throughput evaluated depending on the access right acquiring apparatus in the UC communication (such as a packet error rate or a data rate of a physical layer including a modulation scheme or the like) may be stored in association with information such as time, date, a day of the week, and an event, and the access right acquiring apparatus in which a high throughput for the terminal apparatuses 1 can be expected in uplinks, downlinks, or both uplinks and downlinks at the present time may be determined based on an information group collected as big data using an algorithm such as machine learning.

The communication information of LC evaluated by the LC communication managing unit 519 can be used to determine what terminal apparatus 1 performs communication using the UC or how many terminal apparatuses 1 perform communication using UC. If it can be determined that a backhaul link (a relay link) of the licensed band base station apparatus 3 and/or radio resources are tightened or if it can be determined that the wireless communication quality in LC is low based on the positions and/or functions of the terminal apparatuses 1, it can be determined to use the UC communication.

As the method for determining use of UC, the LC communication managing unit may also store a contract type of the terminal apparatuses 1 and determine use of UC based on the contract type, or execution of the UC communication may be determined by receiving a UC communication request signal transmitted from the terminal apparatus 1 and received via the licensed band base station apparatus 3.

The network communication unit 514 transmits and receives information to and from external apparatuses, such as the shared frequency band base station apparatus 2, the licensed band base station apparatus 3, and the gateway 4.

When the shared frequency band base station apparatus 2 has an uplink multi-user concurrent communication function, the shared frequency band base station apparatus 2 can notify the LC-UC cooperation control apparatus 5 of information indicating that fact in advance and thus the LC-UC cooperation control apparatus 5 can utilize the function to select a path.

When the terminal apparatuses 1 uses UC in order to perform uplink multi-user concurrent communication, the LC-UC cooperation control apparatus 5 may determine a combination of the terminal apparatuses 1 in which improvement in throughput can be expected by the multi-user concurrent communication based on the category of an application of user data, positions of the terminal apparatuses 1, and a propagation loss level between the terminal apparatuses 1 and the shared frequency band base station apparatus 2 in UC.

Figure 12:
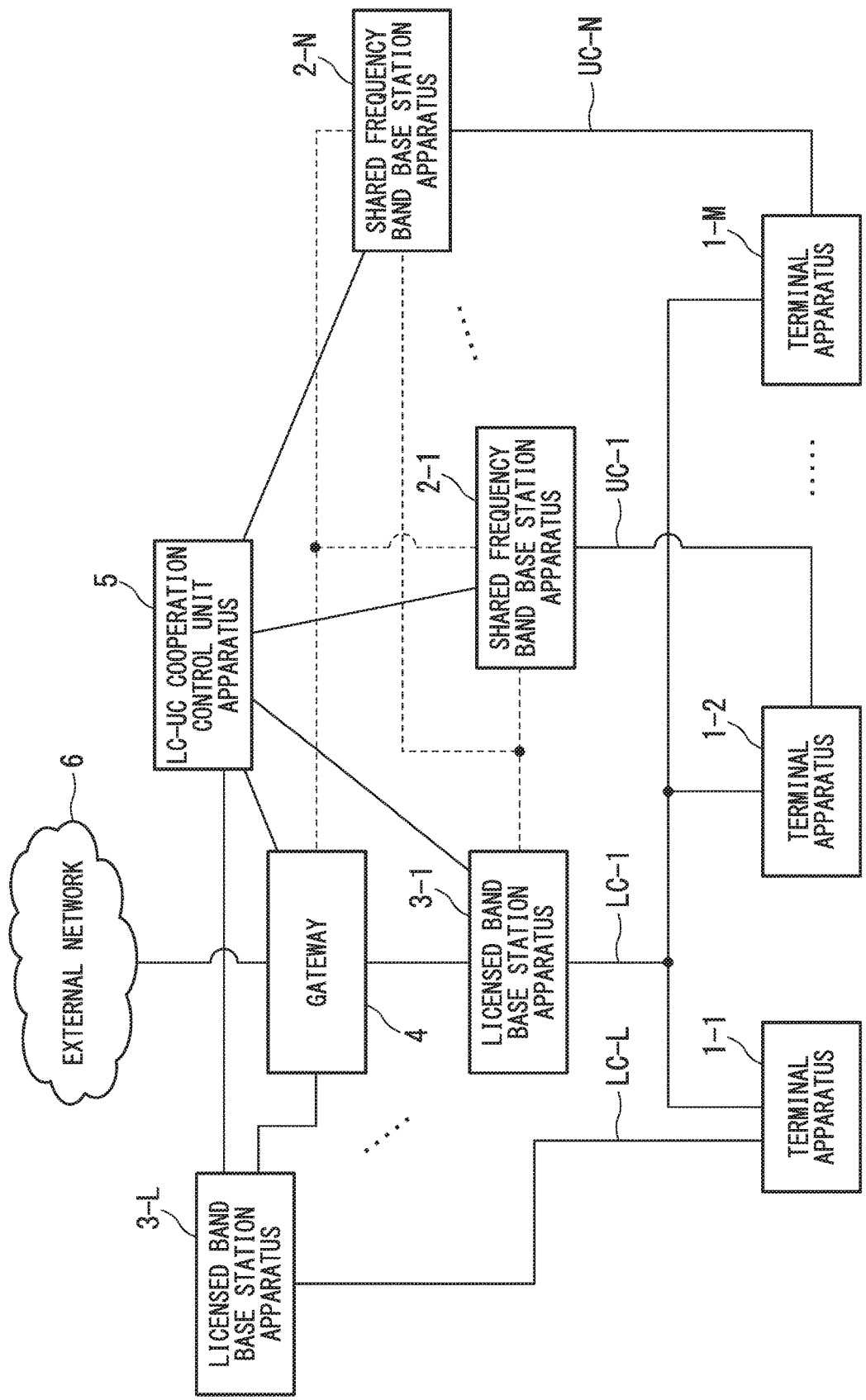
FIG. 12 is a block diagram illustrating an example of a configuration of the wireless communication system in accordance with the first and second embodiments.

Next, the operation of the LC-UC cooperation control apparatus 5 will be described. FIG. 12 is a block diagram illustrating an example of a configuration of the wireless communication system in accordance with the first and second embodiments.

In the configuration example illustrated in the drawing, one or more terminal apparatuses 1-1 to 1-M, one or more shared frequency band base station apparatus 2-1 to 2-N, and one or more licensed band base station apparatus 3-1 to 3-L exist. That is, in the drawing, the number of terminal apparatuses 1, the number of shared frequency band base station apparatuses 2, and the number of licensed band base station apparatuses 3 are M, N, and L, respectively. M, N, and L are integers greater than or equal to 1.

The LC-UC cooperation control apparatus 5 collects identification information of the terminal apparatuses 1-1 to 1-M under control and LC communication quality from the licensed band base station apparatuses 3. The LC-UC cooperation control apparatus 5 collects UC communication quality of the terminal apparatuses 1-1 to 1-M and identification information of the shared frequency band base station apparatuses 2 as communication partners of the terminal apparatuses 1-1 to 1-M.

The LC-UC cooperation control apparatus 5 may acquire the UC communication quality and the identification information of the shared frequency band base station apparatuses 2 as communication partners from the terminal apparatuses 1 via the licensed band base station apparatuses 3 or may cause the shared frequency band base station apparatuses 2-1 to 2-N to estimate them and acquire them from the shared frequency band base station apparatuses 2-1 to 2-N.

The LC-UC cooperation control apparatus 5 may cause the terminal apparatuses 1-1 to 1-M to inspect use situations of the shared frequency band and collect the inspection results via the licensed band base station apparatuses 3 or the shared frequency band base station apparatuses 2.

Moreover, the terminal apparatuses 1-1 to 1-M may generate UC terminal mutual relationship information indicating whether a signal transmitted from another terminal apparatus 1 in the shared frequency band can be received. This is because in use of UC, prevention of packet collision when the terminal apparatuses 1 acquire access right of a transmission opportunity (TXOP) or a reception opportunity (RXOP) greatly contributes to an increase in system capacity.

The UC terminal mutual relationship information may be generated based on the positions of the terminal apparatuses 1 acquired by positioning using a GPS or the like, positions of the terminal apparatuses 1 estimated from signal levels from a plurality of shared frequency band base station apparatuses 2, or signal levels between the terminal apparatuses 1.

When the UC terminal mutual relationship information is generated based on the positions of the terminal apparatuses 1, for example, the LC-UC cooperation control apparatus 5 acquires position information of the terminal apparatuses 1 from the terminal apparatuses 1-1 to 1-M and generates the UC terminal mutual relationship information. In this case, an allowable distance between the terminal apparatuses 1 is defined in advance for a frequency of UC to be used from now on, and terminal apparatuses 1 located within the defined distance are considered to be able to receive UC signals mutually. That is, the LC-UC cooperation control apparatus 5 collects position information of the terminal apparatuses 1 obtained by positioning using a GPS or the like and estimates a combination of terminal apparatuses 1 capable of detecting signals mutually and a combination of terminal apparatuses 1 not capable of detecting signals mutually based on the collected position information of the terminal apparatuses 1.

It is to be noted that the LC-UC cooperation control apparatus 5 may calculate the relative positions between the terminal apparatuses 1 based on channel information of LC or UC between the terminal apparatuses 1 and may estimate the combination of the terminal apparatuses 1 capable of detecting signals mutually and the combination of the terminal apparatuses not capable of detecting signals mutually.

Moreover, the terminal apparatuses 1-1 to 1-M may generate the UC terminal mutual relationship information by measuring radio signals in UC and decoding the received signals in UC to acquire the identification information of transmission sources.

Moreover, the LC-UC cooperation control apparatus 5 may designate a plurality of terminal apparatuses 1 and cause the terminal apparatuses 1 to generate the UC terminal mutual relationship information based on the results obtained by causing the plurality of designated terminal apparatuses 1 to perform communication using UC.

Moreover, a shared frequency band base station apparatus 2 may determine that another terminal apparatus 1 (a hidden terminal) not capable of detecting a signal of a terminal apparatus 1 performing wireless communication using UC with the shared frequency band base station apparatuses exists based on the number of occurrences of packet collision occurring in an uplink of the terminal apparatus 1. In this case, the shared frequency band base station apparatus 2 may notify the LC-UC cooperation control apparatus 5 of the combination of the terminal apparatuses 1 not capable of detecting signals mutually.

The LC-UC cooperation control apparatus 5 may determine the combination of the terminal apparatuses 1 performing wireless communication using UC with the shared frequency band base station apparatus 2 based on the acquired UC terminal mutual relationship information. At this time, the LC-UC cooperation control apparatus 5 excludes the combination of the terminal apparatuses 1 not capable of detecting signals mutually. Accordingly, it is possible to reduce occurrence of packet collision when access right is acquired and to improve utilization efficiency of wireless communication in the shared frequency band.

Figure 13:
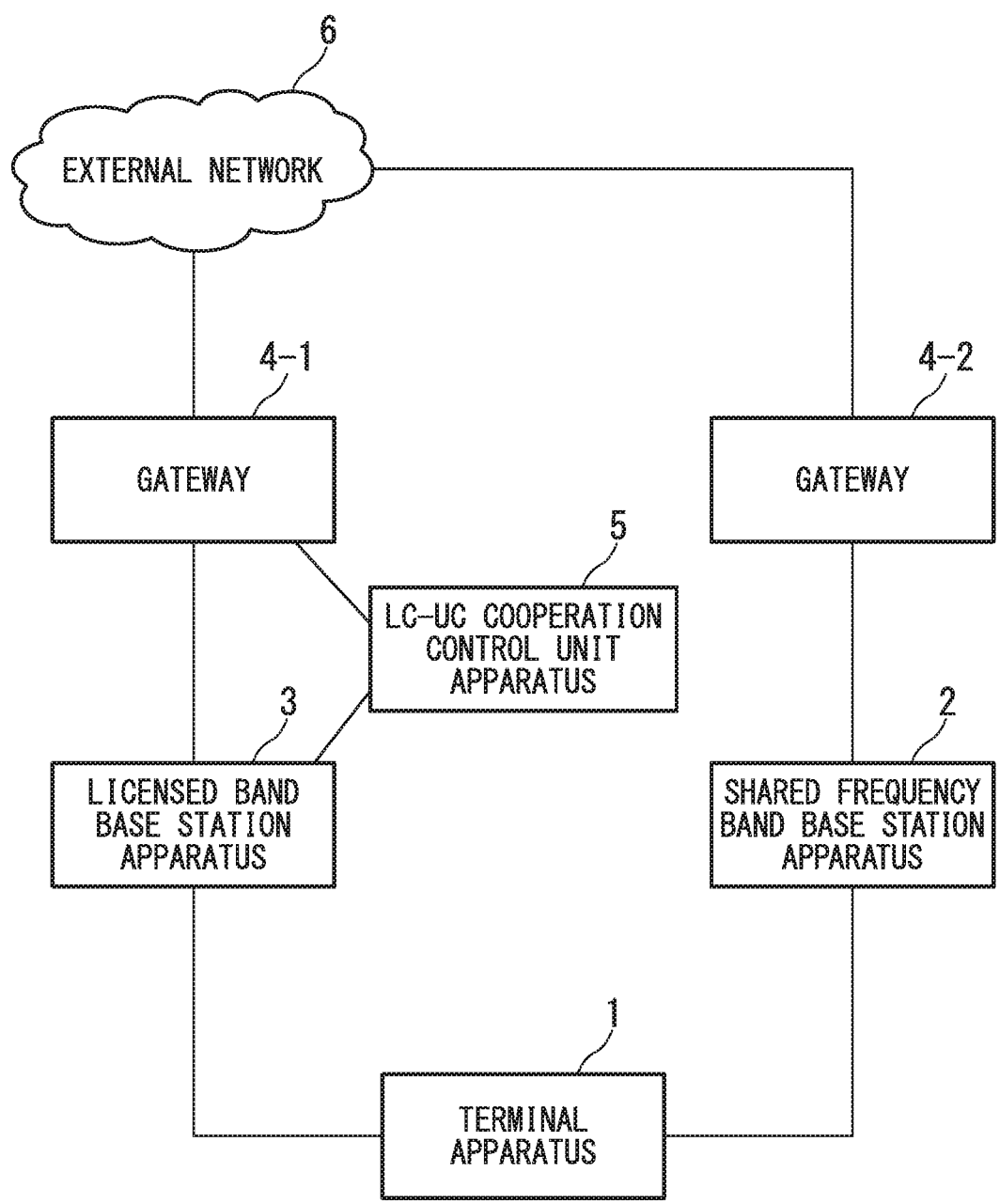
FIG. 13 is a block diagram illustrating another example of the configuration of the wireless communication system in the first and second embodiments.

FIG. 13 is a diagram illustrating another example of the configuration of the wireless communication system in the first and second embodiments. The example illustrated in the drawing has a configuration in which the licensed band base station apparatus 3 and the shared frequency band base station apparatus 2 are connected to different gateways 4. Even in such a configuration, it is possible to control use of UC using LC.

That is, in the configuration example illustrated in FIG. 13, the wireless communication system includes gateways 4-1 and 4-2, the licensed band base station apparatus 3, the LC-UC cooperation control apparatus 5, the shared frequency band base station apparatus 2, and the terminal apparatus 1. The licensed band base station apparatus 3 and the LC-UC cooperation control apparatus 5 are connected to the gateway 4-1. On the other hand, the shared frequency band base station apparatus 2 is connected to the gateway 4-2. The gateway 4-1 and the gateway 4-2 can communicate with each other via an external network 6.

Information on UC of the terminal apparatus 1 is transmitted to the LC-UC cooperation control apparatus 5 via the licensed band base station apparatus 3. Unlike the configuration examples illustrated in FIGS. 1 and 12, in the configuration illustrated in FIG. 13, there may a difference in a response speed between the connection from the external network 6 to the licensed band base station apparatus 3 and the connection from the external network 6 to the shared frequency band base station apparatus 2 and a large control delay may occur. Accordingly, cooperation of access control can be easily applied to transmission of user data for which there are no severe constraints on delay. In this case, the LC-UC cooperation control apparatus 5 can determine use of UC in accordance with the present invention for transmission of user data for which there are no requirements on a delay time or requirements on a delay time are loose.

Referring back to FIG. 11, in the LC-UC cooperation control apparatus 5, the LC communication managing unit 519 acquires the identification information of the terminal apparatuses 1 and the LC communication quality via the network communication unit 514. The LC communication quality acquired by the LC communication managing unit 519 is the communication quality of the terminal apparatuses 1 connecting to the licensed band base station apparatus 3 via LC.

At this time, the LC communication managing unit 519 may acquire information on traffic amounts of the uplinks and the downlinks from the licensed band base station apparatus 3 or the gateway 4. Moreover, the LC communication managing unit 519 may use traffic amounts of backhauls of the uplinks and the downlinks and/or the degree of utilization of radio resources. Furthermore, the LC communication managing unit 519 may estimate a traffic amount of LC, the number of active terminal apparatuses 1 in LC, mobility of the terminal apparatuses 1, and applications of the terminal apparatuses 1 based on regularity with respect to a day in the week, time band, and the like, as statistical information.

The UC communication managing unit 520 collects and stores the identification information of the terminal apparatuses 1 capable of communicating with the shared frequency band base station apparatus 2 and the communication quality of the terminal apparatuses 1. The UC communication managing unit 520 acquires the identification information and the communication quality of the terminal apparatuses 1 from the licensed band base station apparatus 3 or the shared frequency band base station apparatus 2 via the network communication unit 514.

If the UC communication managing unit 520 acquires the identification information and the communication quality of the terminal apparatuses 1 from the licensed band base station apparatus 3, UC information collected from the terminal apparatuses 1 using the communication of LC is extracted by the UC information extracting unit 316 in the licensed band base station apparatus 3. The UC information extracted by the UC information extracting unit 316 is transmitted to the LC-UC cooperation control apparatus 5 via the network communication unit 314.

On the other hand, if the UC communication managing unit 520 acquires the identification information and the communication quality of the terminal apparatuses 1 from the shared frequency band base station apparatus 2, the UC communication managing unit 520 acquires the UC information generated by the terminal apparatuses 1 via the shared frequency band base station apparatus 2, or acquires base station UC information which includes the identification information of the terminal apparatuses 1 acquired by the shared frequency band base station apparatus 2 and the communication quality of the terminal apparatuses 1 estimated by the shared frequency band base station apparatus 2, or acquires both pieces of information on UC.

Moreover, the UC communication managing unit 520 may estimate a traffic amount of UC, the number of active terminal apparatuses 1 in UC, mobility of the terminal apparatuses 1, and applications of the terminal apparatuses 1 from regularity with respect to a day in the week, time band, and the like in the collected information on the radio environment of UC.

Moreover, the UC communication managing unit 520 may acquire the UC terminal mutual relationship information indicating whether the terminal apparatuses 1 can detect signals mutually in UC and the UC communication report information indicating a result of communication performed in UC. The UC communication managing unit 520 may determine whether the number of occurrences of a failure in transmission of user data in the wireless communication using UC is greater than a predetermined number of occurrences based on the UC communication report information for each terminal apparatus 1.

Here, when a packet loss is associated with an access right acquiring apparatus, if the number of failures in transmission of user data is greater than a predetermined number of occurrences, the UC communication managing unit 520 considers that an abnormality is occurring in communication in which the apparatus acquires access right, and determines an access right acquiring apparatus such that the access right acquiring apparatus in which failure in transmission of user data is occurring does not acquire access right (for next communication).

When communication in which access right is acquired is determined as abnormal for both the shared frequency band base station apparatus 2 and the terminal apparatus 1, the UC communication managing unit 520 may determine that use of UC should be stopped and transmit a control signal which provides notification of stop of the use of UC to the terminal apparatus 1 in which the failure in transmission of user data is occurring.

Moreover, when an LC assist request signal for requesting for switching of transmission of user data from LC to UC is acquired from the shared frequency band base station apparatus 2 or a UC communication request signal is acquired from the licensed band base station apparatus 3, the UC communication managing unit 520 outputs the acquired LC assist request signal or the acquired UC communication request signal to the path evaluating unit 521.

The path evaluating unit 521 may determine the terminal apparatus 1 of which user data is transmitted using UC and the UC use condition in order to increase the system capacity of the wireless communication system. The path evaluating unit 521 can determine that UC in which access right is designated for transmission of user data should be used in the cases 1. to 7. described below.

When it is determined that acquisition of access right is designated and UC is used for transmission of user data, the path evaluating unit 521 generates a UC communication initiation signal for notifying the terminal apparatuses 1 that transmission or reception in which access right is acquired using UC is performed or transmission or reception is performed without acquiring access right.

The path evaluating unit 521 transmits the generated UC communication initiation signal to the licensed band base station apparatus 3 via the network communication unit 514. When the UC communication initiation signal is received from the LC-UC cooperation control apparatus 5, the licensed band base station apparatus 3 performs processes such as modulation and frequency conversion thereon and transmits the resultant signal to the terminal apparatuses 1. The UC communication initiation signal can include the identification information of the terminal apparatuses 1 using UC and the identification information of the shared frequency band base station apparatuses 2 performing wireless communication using UC with the terminal apparatuses 1.

1. Case in which LC communication quality and UC communication quality for which access right is designated are compared with each other for each terminal apparatus 1, and a terminal apparatus 1 capable of increasing the throughput by using UC exists 2. Case in which there is a possibility that a delay or a decrease in throughput occurs in transmission of user data in LC because a backhaul or a radio section link used for the transmission in LC becomes a bottleneck 3. Case in which an LC assist request signal is acquired from the shared frequency band base station apparatus 2

4. Case in which a UC communication request signal is acquired from a terminal apparatus 1

5. Case in which it is determined that advantageous effect of multi-user concurrent communication increases by designating access right and selecting a terminal apparatus 1 performing the UC communication 6. Case in which it is determined that improvement in throughput can be expected by designating access right for a terminal apparatus 1 that used UC based on the conventional random access scheme 7. Case in which the number of access right acquiring apparatuses in downlinks is increased by causing terminal apparatuses 1 to acquire access right and it is expected that an increase in a traffic amount transmitted from the shared frequency band base station apparatus 2

In Cases 1 and 2, the path evaluating unit 521 determines a combination of the terminal apparatuses 1 that use UC and conditions thereof.

Moreover, in Cases 3 and 4, the path evaluating unit 521 determines whether to permit the designated terminal apparatus 1 to use UC. This determination can be performed by determining whether there is an access right acquiring apparatus for which an abnormality and a low throughput are not reported in the uplink or downlink communication in which the shared frequency band base station apparatus 2 or the terminal apparatus 1 acquires access right.

In this case, the path evaluating unit 521 may determine whether the throughput increases if the shared frequency band base station apparatus 2 transmitting the LC assist request signal and the terminal apparatus 1 not performing wireless communication using UC among the terminal apparatuses 1 capable of performing wireless communication using UC perform wireless communication using UC. The path evaluating unit 521 may permit use of UC if the throughput increases and may not permit use of UC if the throughput does not increase.

Moreover, in Case 4, based on information on quality of communication corresponding to the access right acquiring apparatus between the terminal apparatus 1 transmitting the UC communication request signal and the target shared frequency band base station apparatus 2, the path evaluating unit 521 designates an appropriate access right acquiring apparatus with reference to information in which an abnormality and/or a low throughput is reported in the communication when the terminal apparatus 1 or the shared frequency band base station apparatus 2 acquires access right using UC, and causes the terminal apparatus 1 to use UC.

Regarding the communication quality information based on the access right acquiring apparatus, it may be possible to enhance accuracy for the determination of an abnormality in the communication quality of the access right acquiring apparatus using specific information such as a day in the week, date, and time when the determination is made, as well as the type of the terminal apparatus 1, and a predicted user's behavior.

Moreover, when there are a plurality of target shared frequency band base station apparatuses 2, the path evaluating unit 521 may designate a shared frequency band base station apparatus 2 as a communication partner and an access right acquiring apparatus using information on the communication quality for the access right acquiring apparatus for each of the plurality of shared frequency band base station apparatuses 2.

Furthermore, the shared frequency band base station apparatus 2 performing wireless communication using UC with the terminal apparatus 1 having transmitted the UC communication request signal may perform the determination based on the UC information collected from another terminal apparatus 1 already performing wireless communication using UC in which the access right acquiring apparatus is designated.

For example, if the terminal apparatus 1 having transmitted the UC communication request signal is not included in the group of terminal apparatuses 1 of which signals can be detected by another terminal apparatus 1, there is a high possibility of occurrence of packet collision due to the hidden terminal problem and thus the path evaluating unit 521 may not permit use of UC. In contrast, if the terminal apparatus 1 having transmitted the UC communication request signal is included in the group of terminal apparatuses 1 of which signals can be detected by the other terminal apparatus 1, there is a low possibility of occurrence of packet collision due to the hidden terminal problem and thus the path evaluating unit 521 may permit use of UC.

Moreover, in Case 6, communication with the shared frequency band base station apparatus 2 is continuously performed using the conventional random access scheme, information on the communication quality of the access right acquiring apparatus is also measured, and if it is determined that the throughput can be improved by designating access right in accordance with the present invention, the path evaluating unit 521 may designate the access right acquiring apparatus in accordance with the present invention to initiate the UC communication.

Moreover, in Case 7, the access right acquiring apparatus is normally only one shared frequency band base station apparatus 2 in downlinks, but the path evaluating unit 521 causes a plurality of terminal apparatuses 1 communicating with the shared frequency band base station apparatus 2 to acquire access right of the downlinks (transmission of downlink transmission request signals). Accordingly, it is possible to increase the number of access right acquiring apparatuses and to increase a probability that radio resources can be secured for other wireless apparatuses (which may be a base station or a terminal apparatus) sharing the same UC.

Moreover, the path evaluating unit 521 may evaluate the throughput of the terminal apparatuses 1 based on a gain of the multi-user concurrent transmission using spatial multiplexing of the uplinks of UC and a gain of the multi-user concurrent transmission using spatial multiplexing of the downlinks of UC and select a combination of terminal apparatuses 1 performing wireless communication using UC.

Furthermore, the path evaluating unit 521 may determine the access right acquiring apparatus for communication of each terminal apparatus 1.

For example, assuming that there are three terminal apparatuses 1 communicating with the licensed band base station apparatus 3 and they are terminal apparatuses 1-1, 1-2, and 1-3, it is possible to perform control such that the terminal apparatus 1-1 acquires access right for both an uplink and a downlink in the UC communication of the terminal apparatus 1-1, the terminal apparatus which desires to perform transmission using the conventional random access scheme acquires access right (the terminal apparatus which desires to perform transmission performs the transmission) in the UC communication of the terminal apparatus 1-2, and the shared frequency band base station apparatus 2 acquires access right for both an uplink and a downlink in the UC communication of the terminal apparatus 1-3.

By designating the access right acquiring apparatus for each terminal apparatus 1 in this way, it is possible to use UC while preventing a decrease in throughput due to the hidden terminal problem. In addition, as another advantageous effect, it is possible to increase the number of access right acquiring apparatuses in the downlink communication and to increase an amount of traffic transmitted from the shared frequency band base station apparatus 2.

Figure 14:
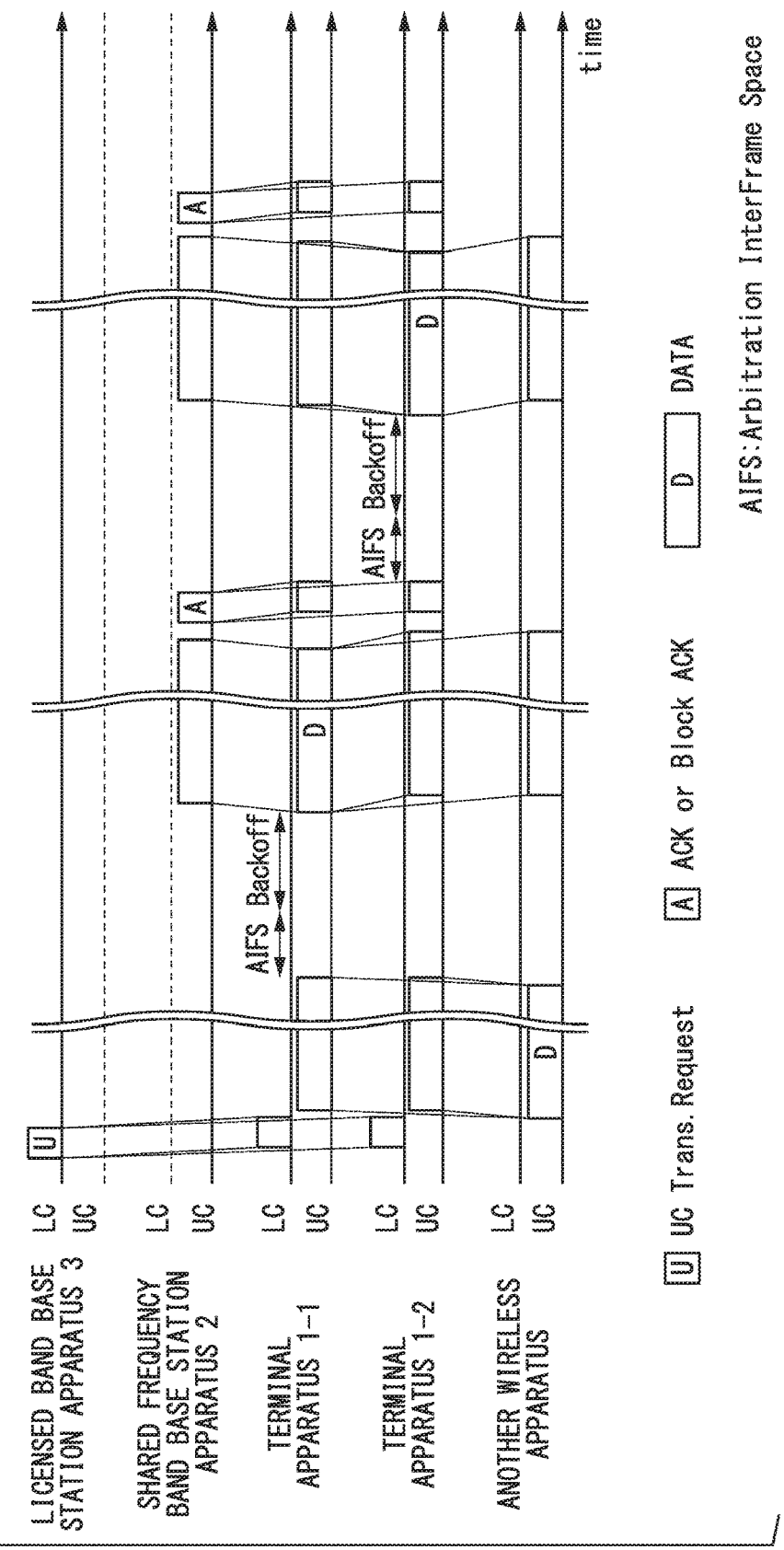
FIG. 14 is a diagram illustrating an example of an uplink MAC sequence in Scenario 1 of the first embodiment.

FIG. 14 is a diagram illustrating an example of an uplink MAC sequence in Scenario 1 of the first embodiment.

The licensed band base station apparatus 3 transmits a UC communication notification signal (U) for requesting for transmission using UC in uplinks to the terminal apparatuses 1-1 and 1-2 using LC. The UC communication initiation signal (U) is a signal based on request information received from the LC-UC cooperation control apparatus 5.

When the terminal apparatuses 1-1 and 1-2 receive the UC communication initiation signal (U) in LC, another wireless apparatus (which may be a base station or a terminal apparatus) is performing communication in UC and thus the terminal apparatuses wait.

When the communication of the other wireless apparatus ends, the terminal apparatuses 1-1 and 1-2 transmit user data in accordance with the random access scheme. For example, the terminal apparatus 1-1 waits for a time corresponding to Arbitration Inter Frame Space (AIFS; transmission interval of frames) and acquires a transmission opportunity after a random time (Backoff) elapses based on the CSMA/CA of a wireless LAN system.

When the terminal apparatus 1-1 ends transmission and the shared frequency band base station apparatus 2 transmits ACK, the terminal apparatus 1-2 also performs uplink communication using UC.

Since the LC-UC cooperation control apparatus 5 selects terminal apparatuses 1 performing uplink communication using UC, it is possible to limit the number of terminal apparatuses 1 performing communication using UC with the shared frequency band base station apparatus 2 and to prevent an increase in a contention window size due to packet collision in the random access scheme and a decrease in MAC efficiency due thereto.

Moreover, when a plurality of terminal apparatuses 1 performing uplink communication using UC are selected, the LC-UC cooperation control apparatus 5 selects terminal apparatuses 1 capable of detecting signals mutually. Accordingly, it is possible to prevent the plurality of selected terminal apparatuses 1 from becoming hidden terminals and to reduce packet collision when the shared frequency band base station apparatus 2 receives user data.

Figure 15:
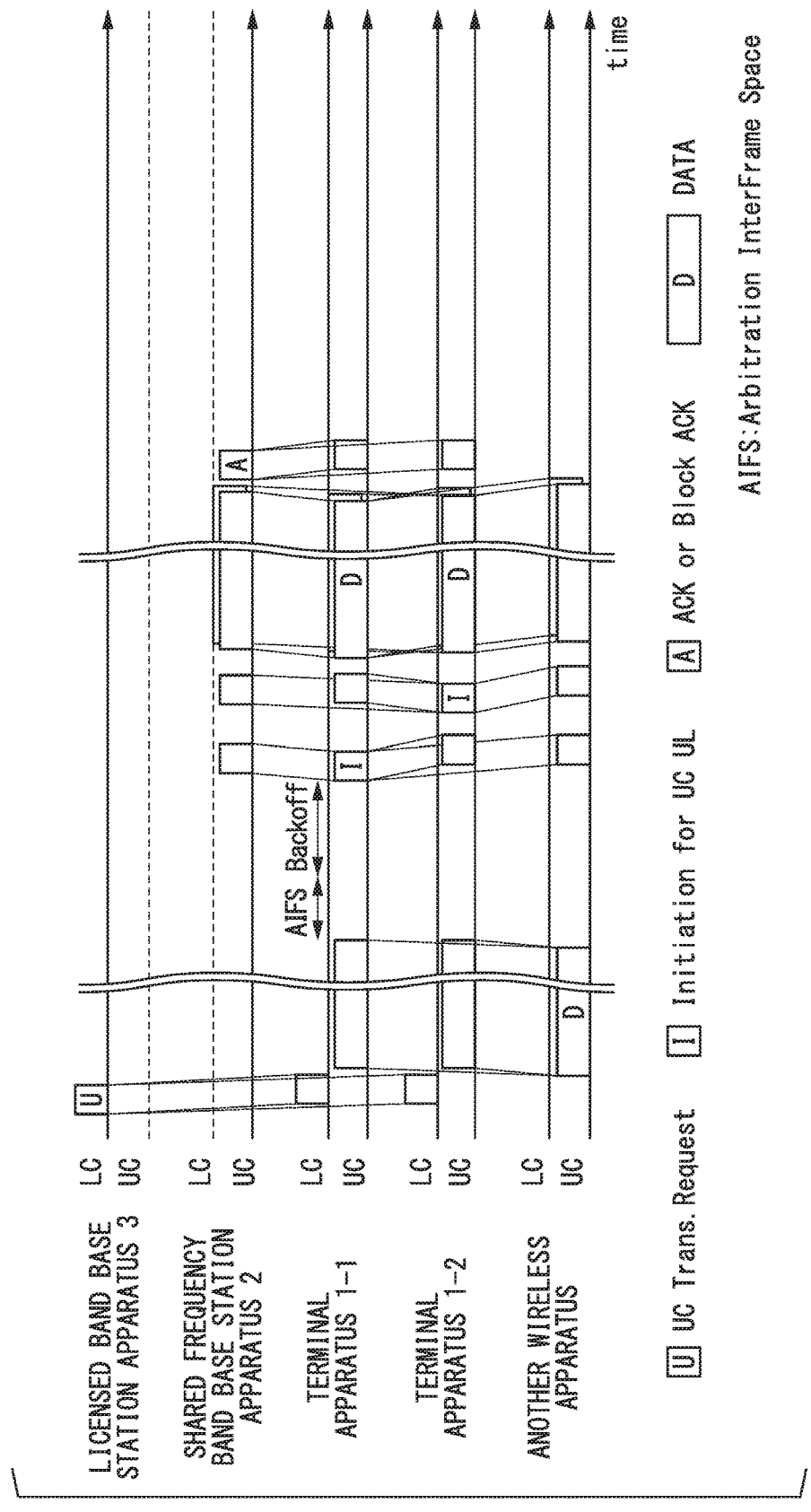
FIG. 15 is a diagram illustrating an example of a MAC sequence of a multi-user uplink in Scenario 2 of the first embodiment.

FIG. 15 is a diagram illustrating an example of a multi-user uplink MAC sequence in Scenario 2 of the first embodiment.

The licensed band base station apparatus 3 transmits the UC communication initiation signal (U) to the terminal apparatuses 1-1 and 1-2 using LC. The UC communication initiation signal may include identification information of the terminal apparatuses 1-1 and 1-2 performing multi-user communication in uplinks using UC and synchronization information when the multi-user communication is performed in the uplinks.

It is to be noted that when the shared frequency band base station apparatus 2 can separate and decode asynchronous reception signals from a plurality of terminal apparatuses, additional information for uplinks of these apparatuses can be omitted. In this case, the LC-UC cooperation control apparatus 5 may combine the terminal apparatuses 1 not capable of detecting signals mutually and cause the combined terminal apparatuses 1 to transmit user data using UC. By combining the terminal apparatuses 1 in this way, it is possible to cause the terminal apparatuses 1 to perform transmission without recognizing the multi-user communication in the uplinks.

In the example illustrated in FIG. 15, when the UC communication initiation signal (U) is received, the terminal apparatuses 1-1 and 1-2 wait because another wireless apparatus is performing communication in UC. When the communication of the other wireless apparatus ends, the terminal apparatuses 1-1 and 1-2 transmit user data in accordance with the random access scheme.

In the multi-user transmission, the terminal apparatuses 1-1 and 1-2 need to transmit signals in synchronization with each other, and thus the terminal apparatuses 1-1 and 1-2 transmit uplink transmission request signals (I) in UC. Specifically, the terminal apparatus 1-1 waits for a time corresponding to AIFS and transmits the uplink transmission request signal (I) using UC after a random time (Backoff) elapses. The uplink transmission request signal transmitted from the terminal apparatus 1-1 may include the identification information of the other terminal apparatus 1-2 which is notified using the UC communication initiation signal (U). By including the identification information of the other terminal apparatus 1, it is possible to designate the order in which the terminal apparatuses 1 performing the multi-user transmission transmit the uplink transmission request signals (I).

The terminal apparatus 1-2 transmits the uplink transmission request signal (I) at the timing at which the uplink transmission request signal (I) transmitted from the terminal apparatus 1-1 is detected or at the timing at which the uplink transmission request signal is to be transmitted which is included in the received uplink transmission request signal (I).

It is to be noted that the terminal apparatus 1-2 may skip the transmission of the uplink transmission request signal (I) and may transmit user data in the uplink to match the timing at which the terminal apparatus 1-1 transmits the user data based on the uplink transmission request signal (I) transmitted from the terminal apparatus 1-1.

Moreover, the terminal apparatuses 1-1 and 1-2 may perform one or both of timing synchronization and frequency synchronization to synchronize the timings at which user data is transmitted in the uplinks, based on CTS replied from the shared frequency band base station apparatus 2 in response to the uplink transmission request signal (I) transmitted from the terminal apparatus 1-1.

When the terminal apparatuses 1-1 and 1-2 initiate transmission of user data (D) in synchronization with each other and transmission by the terminal apparatuses 1-1 and 1-2 is completed, the shared frequency band base station apparatus 2 transmits ACK or Block-ACK (A) to the terminal apparatuses 1-1 and 1-2.

The LC-UC cooperation control apparatus 5 can designate the terminal apparatus 1 acquiring a transmission opportunity using the UC communication initiation signal (U). By operating the terminal apparatuses 1-1 and 1-2 to independently acquire transmission opportunities in accordance with the random access scheme, it is possible to increase the probability of acquisition of the transmission opportunities.

Moreover, the LC-UC cooperation control apparatus 5 may select terminal apparatuses 1 that transmit user data in the uplinks using UC and may consider a gain obtained by performing the multi-user communication. In multi-user MIMO transmission based on spatial multiplexing, an increase in throughput proportional to the number of terminal apparatuses 1 performing concurrent transmission can be expected and thus it is possible to achieve an increase in system capacity by applying the multi-user MIMO to the uplinks of UC.

Figure 16:
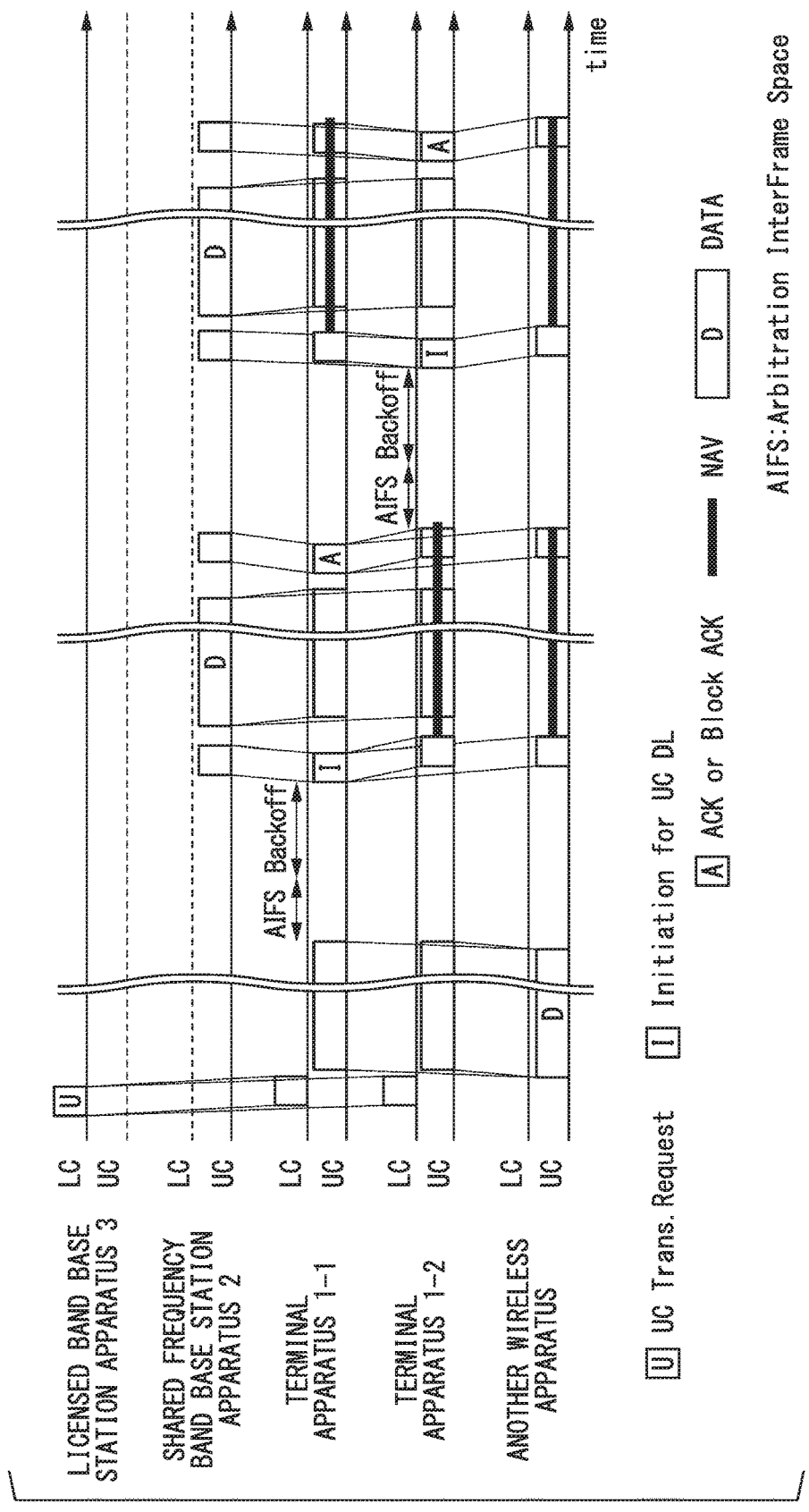
FIG. 16 is a diagram illustrating an example of a downlink MAC sequence in Scenario 3 of the first embodiment.

FIG. 16 is a diagram illustrating an example of a downlink MAC sequence in Scenario 3 of the first embodiment.

The licensed band base station apparatus 3 transmits a UC communication initiation signal (U) for requesting for reception using UC in the downlinks to the terminal apparatuses 1-1 and 1-2 using LC. The UC communication initiation signal (U) is a signal based on request information received from the LC-UC cooperation control apparatus 5.

When the UC communication initiation signal (U) is received in LC, the terminal apparatuses 1-1 and 1-2 wait because another wireless apparatus is performing communication in UC.

When the communication of the other wireless apparatus is completed, the terminal apparatus 1-1 transmits a downlink transmission request signal (I) for requesting for a reception opportunity of the downlink in accordance with rules of the random access scheme. The downlink transmission request signal (I) includes information for requesting surrounding wireless apparatuses having received the signal to set NAV and functions to cause the terminal apparatus 1 having transmitted the signal to acquire a reception opportunity.

Here, the terminal apparatus 1-1 waits for a time corresponding to AIFS based on CSMA/CA of a wireless LAN system and transmits the downlink transmission request signal (I) after a random time (Backoff) elapses, thereby acquiring a reception opportunity.

It is to be noted that NAV (a transmission-inhibited period) included in the downlink transmission request signal (I) may be calculated by the LC-UC cooperation control apparatus 5 and may be transmitted from the LC-UC cooperation control apparatus 5 to the terminal apparatuses 1-1 and 1-2 using the UC communication initiation signal (U).

When the duration of NAV is calculated by the LC-UC cooperation control apparatus 5, the path evaluating unit 521 calculates the communication time required for transmitting user data based on an amount of data of the user data transmitted for the terminal apparatuses 1-1 and 1-2 and the UC communication quality between the shared frequency band base station apparatus 2 and the terminal apparatuses 1-1 and 1-2. The path evaluating unit 521 may include information indicating the transmission-inhibited period based on the calculated communication time in the UC use designation information and may transmit the resultant information to the licensed band base station apparatus 3. Notification of NAV (the transmission-inhibited period) included in the UC use designation information is transmitted to the terminal apparatuses 1.

When the downlink transmission request signal (I) transmitted from the terminal apparatus 1-1 is received, the shared frequency band base station apparatus 2 transmits user data (D) addressed to the terminal apparatus 1-1. When the user data addressed to the terminal apparatus 1-1 is successfully received from the shared frequency band base station apparatus 2, the terminal apparatus 1-1 transmits ACK or Block ACK (A) to the shared frequency band base station apparatus 2.

When it is detected that transmission to the terminal apparatus 1-1 in UC is completed by means of ACK or Block ACK (A), the terminal apparatus 1-2 transmits the downlink transmission request signal (I) and acquires a reception opportunity.

When the downlink transmission request signal (I) transmitted from the terminal apparatus 1-2 is received, the shared frequency band base station apparatus 2 transmits user data (D) addressed to the terminal apparatus 1-2. When the user data addressed to the terminal apparatus 1-2 is successfully received from the shared frequency band base station apparatus 2, the terminal apparatus 1-2 transmits ACK or Block ACK (A) to the shared frequency band base station apparatus 2.

If a condition for ending the UC communication which is included in the UC communication condition is not satisfied, the terminal apparatuses 1-1 and 1-2 transmit the downlink transmission request signals (I) again and acquire reception opportunities in accordance with the rules of the random access scheme.

Since the terminal apparatuses 1 having received the UC communication initiation signal (U) using LC set the NAV sections, it is possible to improve utilization efficiency of wireless communication in a shared frequency band in comparison with a case in which the shared frequency band base station apparatus 2 acquires a transmission opportunity using RTS/CTS.

In general communication using the RTS/CTS, when there are many wireless apparatuses which are hidden from the transmission side, there is a possibility that a probability of successfully replying the CTS at timing at which the RTS is received will decrease remarkably. It is to be noted that in the wireless communication system in accordance with the first embodiment, in an environment in which a terminal apparatus 1 can detect more other wireless apparatuses than the shared frequency band base station apparatus 2, it is possible to prevent a decrease in throughput due to hidden terminals.

Furthermore, similarly to the uplinks, the LC-UC cooperation control apparatus 5 selects terminal apparatuses 1 that transmit the downlink transmission request signals (I), and thus it is possible to limit the terminal apparatuses 1 communicating with the shared frequency band base station apparatus 2 using UC and to prevent an increase in a contention window size due to packet collision in the random access and a decrease in MAC efficiency due thereto.

Furthermore, since the LC-UC cooperation control apparatus 5 combines the terminal apparatuses 1 capable of detecting signals mutually to perform communication using UC, it is possible to prevent the terminal apparatuses 1 from becoming hidden terminals in the uplinks to cause packet collision in the shared frequency band base station apparatus 2.

Figure 17:
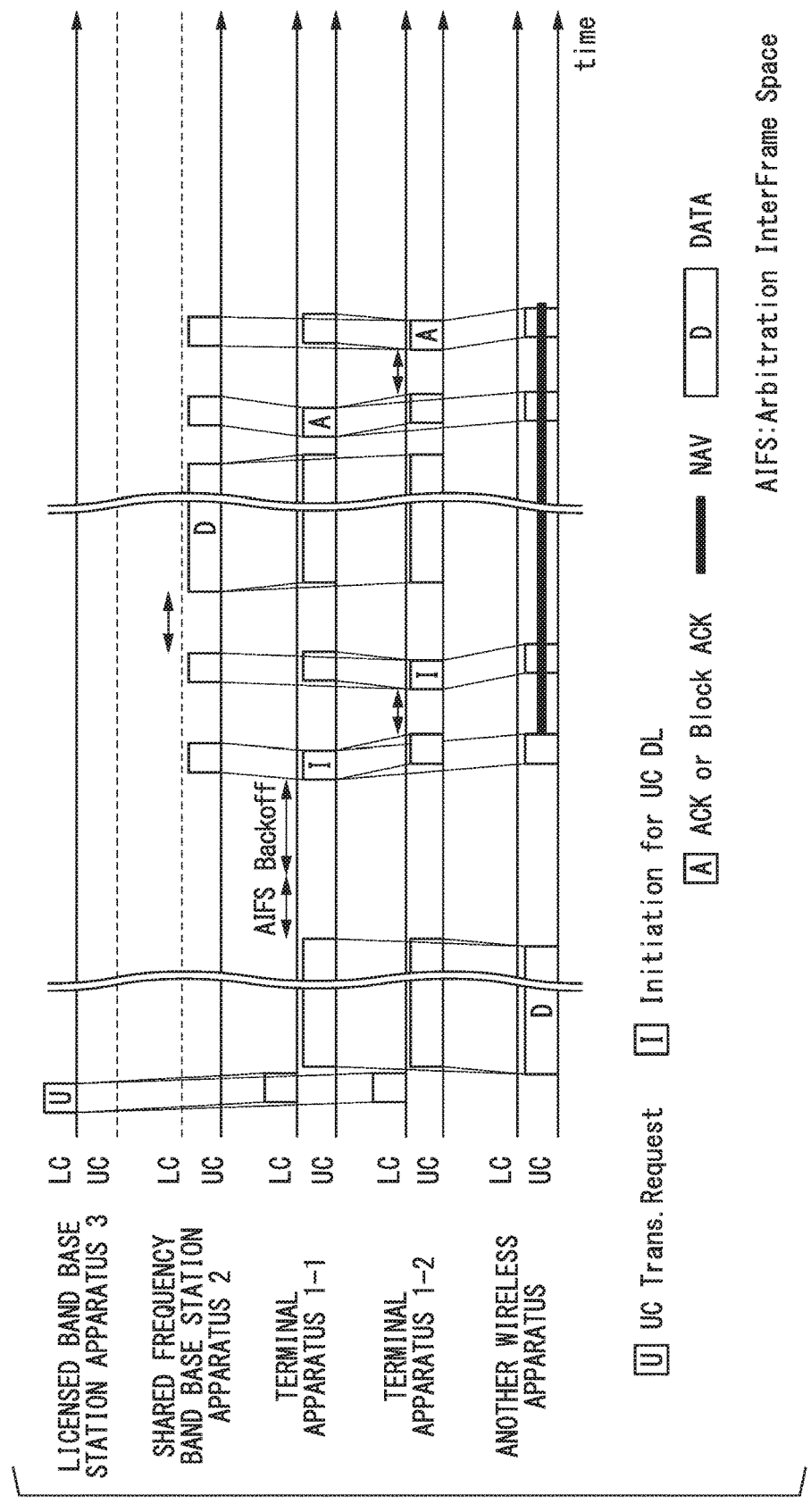
FIG. 17 is a diagram illustrating an example of a MAC sequence of a multi-user downlink in Scenario 4 of the first embodiment.

FIG. 17 is a diagram illustrating an example of a multi-user downlink MAC sequence in Scenario 4 of the first embodiment.

The licensed band base station apparatus 3 transmits the UC communication initiation signal (U) to the terminal apparatuses 1-1 and 1-2 using LC. The downlink transmission request signal includes identification information of the terminal apparatuses 1-1 and 1-2 performing multi-user communication in downlinks using UC and synchronization information when the multi-user communication is performed in the downlinks.

In the example illustrated in FIG. 17, when the UC communication initiation signal (U) is received, the terminal apparatuses 1-1 and 1-2 wait because another wireless apparatus is performing communication in UC.

When the communication of the other wireless apparatus ends, the terminal apparatuses 1-1 and 1-2 try to transmit the downlink transmission request signals (I) in accordance with the rules of the random access scheme. Here, the terminal apparatus 1-1 acquires a reception opportunity and transmits the downlink transmission request signal (I).

When the multi-user communication based on spatial multiplexing is performed in the downlinks, it is important to acquire channel information between the terminal apparatuses 1 having transmitted the downlink transmission request signals (I) and the shared frequency band base station apparatus 2 from the downlink transmission request signals (I). The shared frequency band base station apparatus 2 can acquire the channel information of the uplinks by calibrating the channel information acquired from the downlink transmission request signals to the channel information of the uplinks using symmetry of the uplinks and the downlinks in a Time Division Duplex (TDD) system.

That is, when the multi-user communication based on spatial multiplexing is performed in a downlink, it is possible to enhance accuracy of the channel information by causing all the terminal apparatuses 1 to be subjected to the multi-user communication to transmit downlink transmission request signals (I) or frames for channel estimation.

In the example illustrated in FIG. 17, with the downlink transmission request signal (I) transmitted from the terminal apparatus 1-1 as a trigger, the terminal apparatus 1-2 also transmits the downlink transmission request signal (I) after a predetermined time elapses. This can be realized by including, in the UC communication initiation signal (U), an instruction to transmit the downlink transmission request signal after the predetermined time elapses from when the downlink transmission request signal transmitted from another terminal apparatus 1 is received.

Moreover, it may be realized by causing the terminal apparatus 1-1 to include the identification information of the terminal apparatus 1-2 transmitting a downlink transmission request signal in the next time in the downlink transmission request signal and transmit the resultant signal, or causing the terminal apparatuses 1 to transmit the downlink transmission request signals based on the order in which the downlink transmission request signals are transmitted, the order being designated by the UC communication initiation signal (U).

Moreover, channel information corresponding to the shared frequency band base station apparatus 2 may be transmitted from the terminal apparatuses 1 to the licensed band base station apparatus 3 by means of communication using LC, and the channel information may be output from the licensed band base station apparatus 3 to the shared frequency band base station apparatus 2.

Furthermore, if a time elapsed after the shared frequency band base station apparatus 2 acquires the channel information with the terminal apparatuses 1 is less than or equal to a predetermined time, the transmission of the downlink transmission request signal may be skipped.

Moreover, after the downlink transmission request signal is received from the terminal apparatus 1-1, the shared frequency band base station apparatus 2 may transmit a signal for requesting transmission of the downlink transmission request signal to the terminal apparatus 1-2 and cause the terminal apparatus 1-2 to transmit the downlink transmission request signal.

In order to transmit the downlink transmission request signals or the frames for channel estimation from the terminal apparatuses 1 before performing the downlink multi-user concurrent transmission, it may be possible to perform designation so that the other terminal apparatuses 1 included in the multi-user concurrent transmission do not set NAV during NAV set by the downlink transmission request signal transmitted from the first terminal apparatus 1.

Alternatively, by updating the setting of NAV set in the downlink transmission request signal (I) using a signal newly transmitted from the shared frequency band base station apparatus 2, it is possible to perform setting so that the terminal apparatuses other than the terminal apparatus having first transmitted the downlink transmission request signal (I) can also transmit signals.

When user data is transmitted to a plurality of terminal apparatuses 1 using the frequency division multiplexing or the code division multiplexing, the shared frequency band base station apparatus 2 may perform transmission to the plurality of terminal apparatuses 1 indicated by the downlink transmission request signal at a timing at which the downlink transmission request signal of one terminal apparatus 1 (the terminal apparatus 1-1 in FIG. 17) representative of the plurality of terminal apparatuses 1 is received. In this case, the transmission of the downlink transmission request signal from the terminal apparatus 1-2 in FIG. 17 is skipped.

Moreover, with the configuration in which the LC-UC cooperation control apparatus 5 selects terminal apparatuses 1 that use the downlinks of UC, it is possible to designate the terminal apparatuses 1 acquiring reception opportunities and to increase a probability of acquisition of the reception opportunities by causing the terminal apparatuses 1-1 and 1-2 to independently acquire the reception opportunities using the random access.

For example, when a single shared frequency band base station apparatus 2 and a plurality of terminal apparatuses 1 are present and a great number of other wireless apparatuses performing wireless communication in UC are present, a possibility of failure of trial of the shared frequency band base station apparatus 2 to acquire a transmission opportunity increases. However, the wireless communication system in accordance with the present embodiment employs a configuration in which a terminal apparatus 1 acquires a reception opportunity and a plurality of terminal apparatuses 1 performing reception in downlinks try to acquire reception opportunities, it is possible to decrease the possibility of failure in acquisition of the reception opportunities and to increase the possibility of success in communication in UC. However, if the number of terminal apparatuses 1 acquiring reception opportunities increases, packet collision may occur and/or the terminal apparatuses 1 not capable of detecting signals mutually may be combined to generate a hidden terminal. Accordingly, the LC-UC cooperation control apparatus 5 needs to select an appropriate number of terminal apparatuses 1.

Furthermore, the terminal apparatuses 1 that use UC may be selected based on an application category of user data, the throughput of a physical layer, and a frame length obtained as the number of bits per frame so as to maximize a gain of the multi-user communication.

In particular, in the multi-user MIMO transmission based on the spatial multiplexing, an increase in throughput proportional to the number of terminal apparatuses 1 performing concurrent transmission can be expected and thus it is possible to achieve an increase in system capacity by successfully achieving the multi-user MIMO downlinks.

Figure 18:
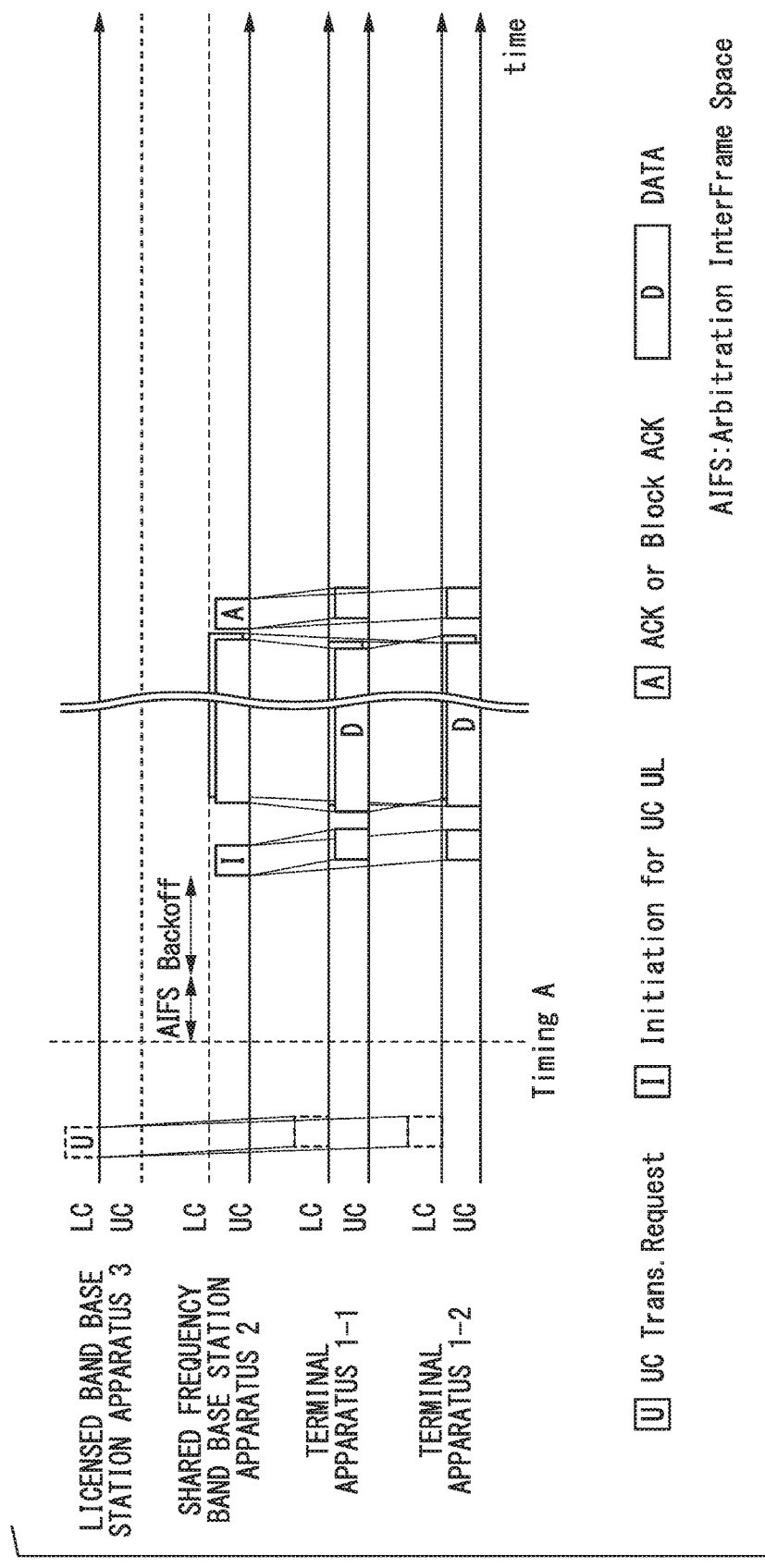
FIG. 18 is a diagram illustrating an example of a MAC sequence of multi-user communication in an uplink in Scenario 2 of the second embodiment.

FIG. 18 is a diagram illustrating an example of a MAC sequence of uplink multi-user communication in Scenario 2 of the second embodiment.

The licensed band base station apparatus 3 transmits a UC communication initiation signal (U) for notifying that base station triggered UC uplink communication is performed to the terminal apparatuses 1-1 and 1-2 using LC. The UC communication initiation signal may indicate that the shared frequency band base station apparatus 2 acquires access right, may indicate that a terminal apparatus itself performs designation so as not to acquire access right, or may include the identification information of terminal apparatuses 1 performing multi-user communication from now on in the uplinks.

In the example illustrated in FIG. 18, the UC communication initiation signal (U) includes information for notifying that the shared frequency band base station apparatus 2 acquires access right, and the terminal apparatuses 1-1 and 1-2 wait until an uplink transmission request signal is received from the shared frequency band base station apparatus 2 when the UC communication initiation signal is received.

On the other hand, the shared frequency band base station apparatus 2 receives notification indicating that the terminal apparatuses 1 are suspending uplink transmission in UC from the LC-UC cooperation control apparatus 5 by means of the UC communication initiation signal using backhaul communication. When the notification from the LC-UC cooperation control apparatus 5 is received, the shared frequency band base station apparatus 2 initiates acquisition of access right in the shared frequency band (Timing A in FIG. 18).

FIG. 18 illustrates communication based on the CSMA/CA, but access right may be acquired without performing Listen Before Talk in the CSMA/CA.

When access right is acquired, the shared frequency band base station apparatus 2 transmits the uplink transmission request signal (I) to the terminal apparatuses 1-1 and 1-2. When the uplink transmission request signal (I) is received from the shared frequency band base station apparatus 2, the terminal apparatuses 1-1 and 1-2 transmit user data (D) to the shared frequency band base station apparatus 2 using UC.

In this way, the shared frequency band base station apparatus 2 can acquire information on whether data on standby is present in the terminal apparatuses 1 and information on the terminal apparatuses 1 in which the data on standby is present without performing communication using UC and can efficiently perform uplink communication using UC.

Moreover, in FIG. 18, information on the uplinks (such as an amount of user data waiting for transmission) is transmitted from the terminal apparatuses 1 to the licensed band base station apparatus 3 using LC and the LC-UC cooperation control apparatus 5 determines that the uplink communication in accordance with the present invention is performed before the licensed band base station apparatus 3 transmits the UC communication initiation signal (U), and thus it is possible to efficiently realize uplink multi-user concurrent transmission in UC.

Figure 19:
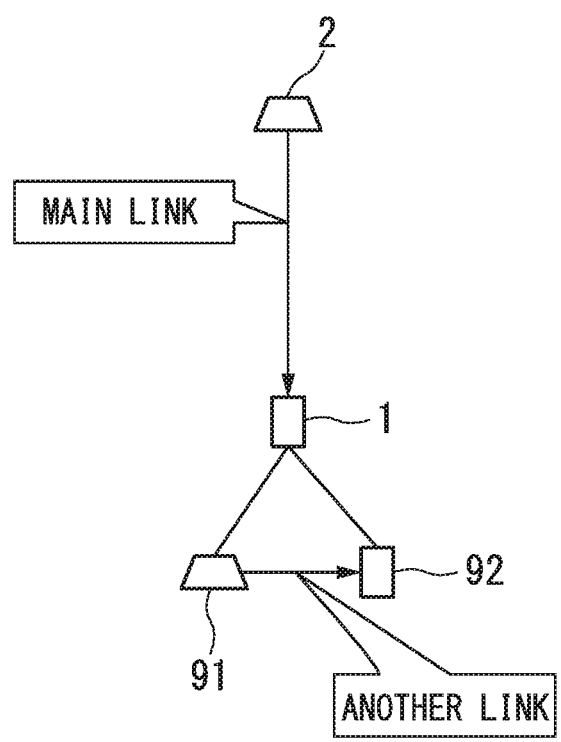
FIG. 19 is a diagram illustrating a model of a wireless communication system to be simulated.

In order to demonstrate the advantageous effects of the wireless communication system in the present embodiment, simulation was carried out using a computer (the example of Scenario 3 in the first embodiment). FIG. 19 is a diagram illustrating a model of a wireless communication system subjected to the simulation.

As illustrated in the drawing, a downlink from the shared frequency band base station apparatus 2 to a terminal apparatus 1 (hereinafter referred to as a main link) is evaluated and wireless apparatuses 91 and 92 performing wireless communication that cannot be detected by the shared frequency band base station apparatus 2 are located near the terminal apparatus 1. The wireless apparatus 91 continues to perform transmission to the wireless apparatus 92 using UC.

The communication from the wireless apparatus 91 to the wireless apparatus 92 is referred to as another link. In the simulation, the throughput of a physical link is set to 130 [Mbit/s]. This corresponds to a case in which the spatial multiplexing order is 2, the modulation scheme is 64 QAM, the coding rate is 5/6, and a guard interval (a time inserted to prevent interference between adjacent pieces of data) is 800 [μs].

FIG. 20 is a diagram illustrating three MAC sequences subjected to the simulation. The first MAC sequence is frame transmission that does not use the RTS/CTS as a first comparative example. The second MAC sequence is frame transmission using the RTS/CTS as a second comparative example. The third MAC sequence is frame transmission in accordance with the present embodiment, in which a terminal apparatus 1 acquires a reception opportunity and then the shared frequency band base station apparatus 2 performs frame transmission.

In each of the three MAC sequences, a data symbol length $T_D$ is set to 1.520 [ms]. When the duration required for transmitting one frame is denoted as $T_f$, $T_D/T_f$ in the first comparative example, the second comparative example, and the present embodiment are 0.889, 0.846, and 0.867, respectively.

Figure 21:
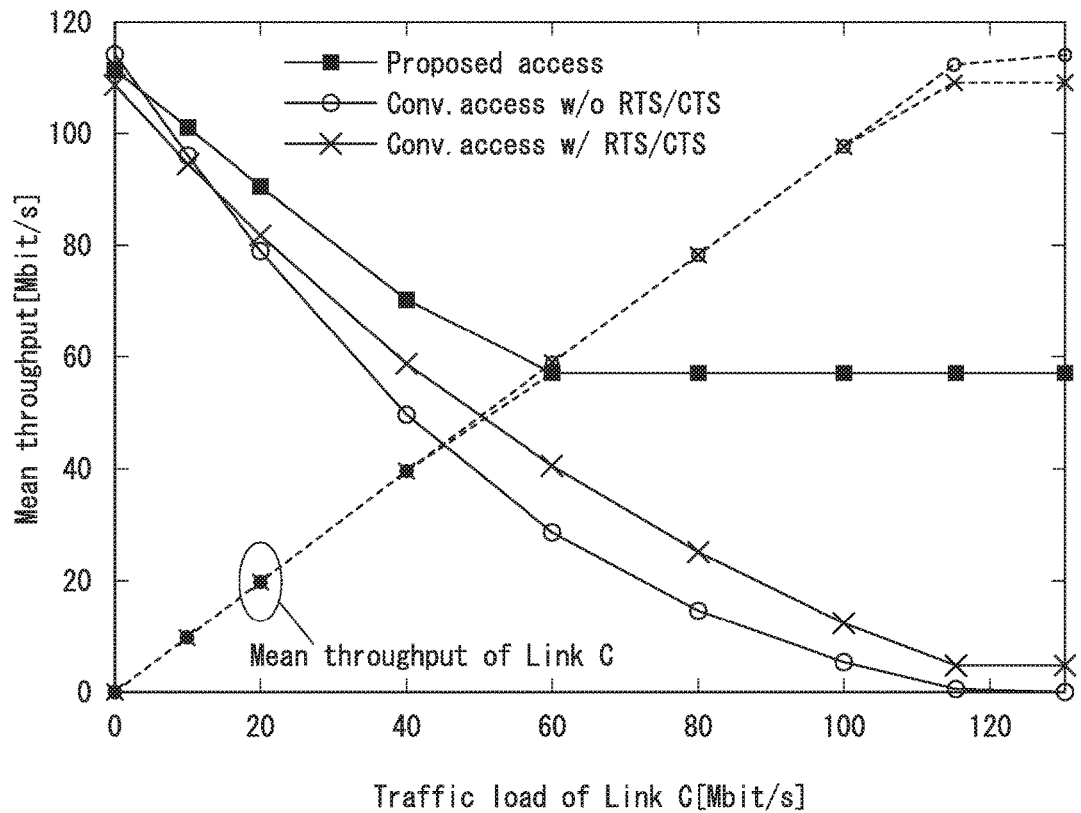
FIG. 21 is a graph illustrating a simulation result for the model illustrated in FIG. 19.

FIG. 21 is a graph illustrating a simulation result in the model illustrated in FIG. 19.

The simulation result illustrated in FIG. 21 is a graph indicating the throughput of the main link, which is a downlink from the shared frequency band base station apparatus 2 to the terminal apparatus 1 using UC, when the traffic of the main link (Link A) is set to 130 [Mbit/s] and the traffic of the wireless communication (another link: Link C) from the wireless apparatus 91 to the wireless apparatus 92 is changed from 0 [Mbit/s] to 130 [Mbit/s].

In the graph illustrated in FIG. 21, the horizontal axis represents the traffic in the wireless communication from the wireless apparatus 91 to the wireless apparatus 92 and the vertical axis represents the throughputs of the main link (solid lines) and the other link (dotted lines). It is to be noted that in traffic from 0 to 40, there is no difference in throughput in the other link among the three MAC sequences (×, white circles, and black rectangles overlap in the graph).

In the first and second comparative examples, with an increase in traffic between the wireless apparatus 91 and the wireless apparatus 92, the throughput in the main link decreases. When the traffic between the wireless apparatus 91 and the wireless apparatus 92 reaches 130 [Mbit/s], the throughput cannot be obtained in the method of the first comparative example (Cony. Access w/o RTS/CTS), and almost no throughput can be obtained also in the method of the second comparative example (Cony. Access w/RTS/CTS) and is about 6.5 [Mbit/s].

In contrast, in the method (Proposed access) of the present embodiment, since the terminal apparatus 1 acquires access right, a hidden terminal problem does not occur. Accordingly, when the traffic of the other link is greater than about 60 [Mbit/s], the throughputs of the other link and the main link are equal to each other and they converge. This means that the other link and the main link share radio resources almost equally.

In a tightened wireless communication environment in which the traffic of the other link is 130 [Mbit/s], the throughput of the main link in the method of the present embodiment is 8.8 times the throughput of the main link in the second comparative example.

In order to demonstrate the advantageous effects of the wireless communication system in accordance with the present embodiment, different simulation was additionally carried out using a computer. The advantageous effects obtained by setting the access right acquiring apparatus for each terminal apparatus 1 using the first embodiment and the second embodiment together will be shown.

Figure 22:
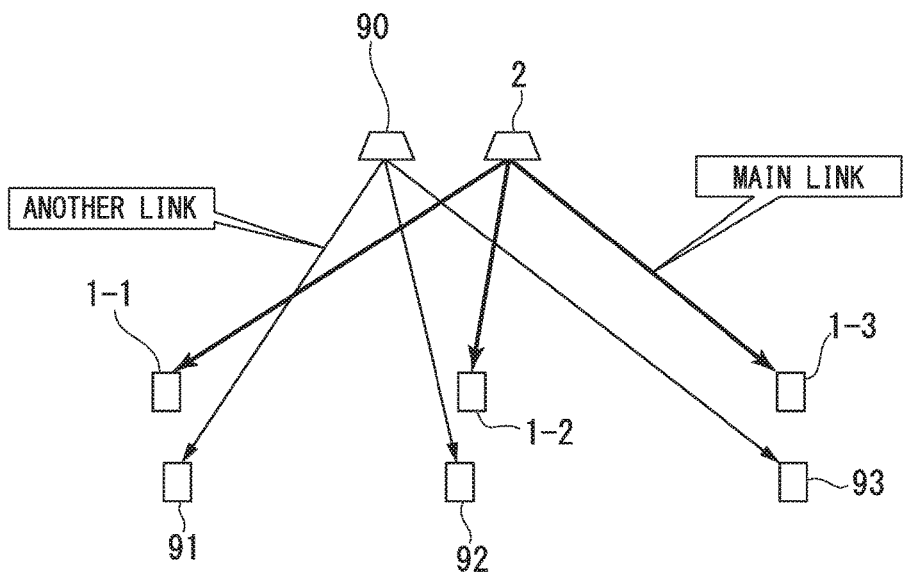
FIG. 22 is a diagram illustrating a model of a wireless communication system to be simulated.

FIG. 22 is a diagram illustrating a model of the wireless communication system subjected to the simulation. As illustrated in the drawing, downlinks (hereinafter referred to as main links) from a shared frequency band base station apparatus 2 to a terminal apparatus 1-1, a terminal apparatus 1-2, and a terminal apparatus 1-3 are evaluated.

Moreover, it is assumed that a wireless apparatus 90, a wireless apparatus 91, a wireless apparatus 92, and a wireless apparatus 93, which are located at almost the same positions as the shared frequency band base station apparatus 2, the terminal apparatus 1-1, the terminal apparatus 1-2, and the terminal apparatus 1-3 are provided, and the wireless apparatus 90 performs downlink transmission to the wireless apparatus 91, the wireless apparatus 92, and the wireless apparatus 93, similarly to the shared frequency band base station apparatus 2.

It is assumed that eight wireless apparatuses can detect signals of all the other wireless apparatuses with exceptions. The exceptions are two conditions that the terminal apparatus 1-1 and the wireless apparatus 91 cannot detect communication of the terminal apparatus 1-3 and the wireless apparatus 93 and that the terminal apparatus 1-3 and the wireless apparatus 93 cannot detect communication of the terminal apparatus 1-1 and the wireless apparatus 91.

The configuration illustrated in FIG. 22 has a condition that the wireless apparatuses at both ends cannot hear communication mutually. In this simulation, the throughput of a physical layer is set to 130 [Mbit/s]. This corresponds to a case in which the spatial multiplexing order is 2, the modulation scheme is 64 QAM, the coding rate is ⅚, and the guard interval is 800 [μs].

Figure 23:
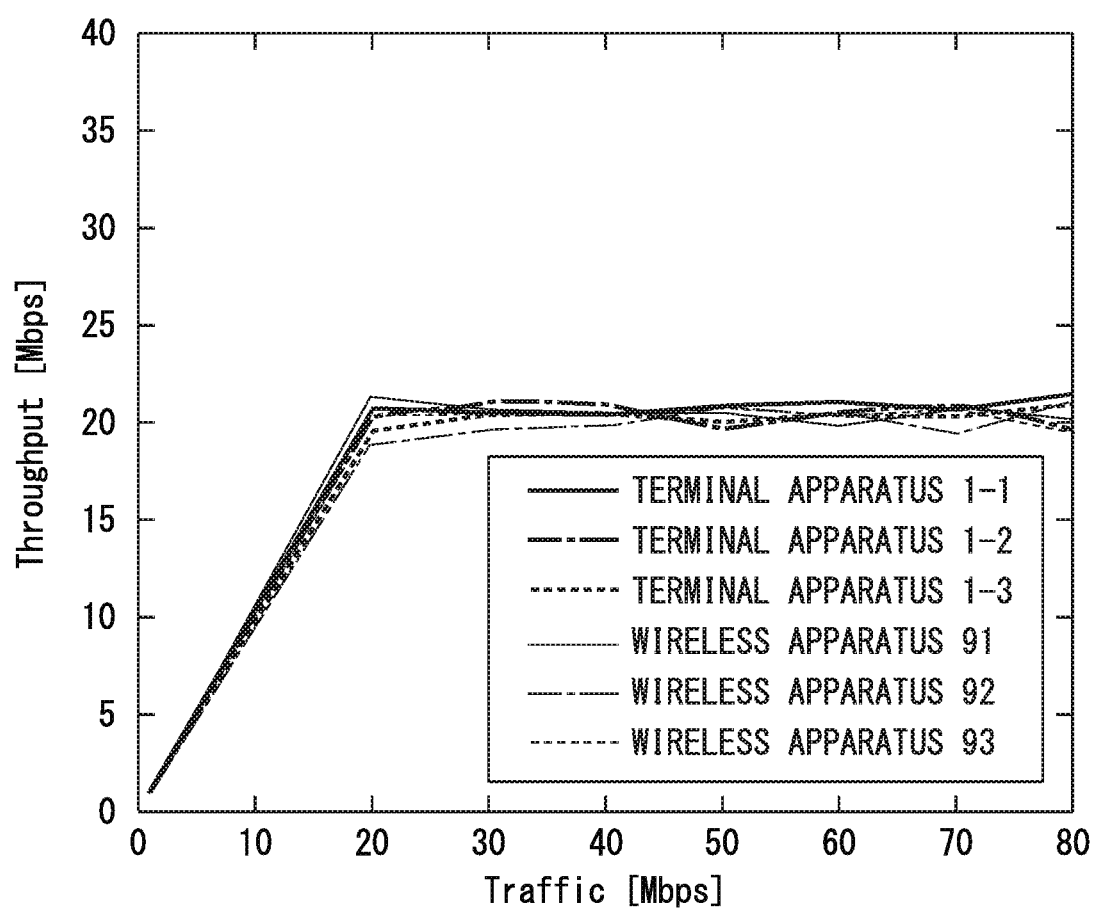
FIG. 23 is a graph illustrating a simulation result when a conventional random access scheme is used in the model illustrated in FIG. 22.

FIG. 23 is a graph illustrating a simulation result when a conventional random access scheme is used in the model illustrated in FIG. 22.

The result illustrated in FIG. 23 indicates the result of throughputs obtained at destinations when the wireless apparatus 90 and the shared frequency band base station apparatus 2 acquire access right and perform downlink transmission using the conventional random access scheme and amounts of traffic given to the wireless apparatus 90, the shared frequency band base station apparatus 2, and three communication partners of each of the wireless apparatus 90 and the shared frequency band base station apparatus 2 are increased. It can be confirmed that in the conventional random access scheme, when radio resources are tightened with the increase in traffic amount, all the terminal apparatuses 1 equally acquire the throughputs.

FIG. 24 is a graph illustrating a simulation result of the operations of the wireless communication systems in accordance with the first and second embodiments in the model illustrated in FIG. 22.

In the simulation result illustrated in FIG. 24, the access right acquiring apparatuses in the downlink communication from the shared frequency band base station apparatus 2 to the terminal apparatus 1-1 and the terminal apparatus 1-2 are set to the terminal apparatus 1-1 and the terminal apparatus 1-2, and the access right acquiring apparatus in the downlink communication from the shared frequency band base station apparatus 2 to the terminal apparatus 1-3 is set to the shared frequency band base station apparatus 2.

In the communication of the wireless apparatuses 90 to 93, which are the other wireless systems, the access right acquiring apparatus is only the wireless apparatus 90. In contrast, in the wireless communication system performing the operation of the present invention, three of the terminal apparatus 1-1, the terminal apparatus 1-2, and the shared frequency band base station apparatus 2 acquire access right and it can be confirmed that a higher throughput than those in the other wireless systems can be obtained.

Here, the reason why the access right acquiring apparatus is set to the shared frequency band base station apparatus 2 for only the terminal apparatus 1-3 is because the terminal apparatus 1-1 and the terminal apparatus 1-3 satisfy the hidden terminal condition each other and a decrease in throughput due to packet collision may be caused when both apparatuses acquire access right.

In this way, by causing the terminal apparatuses 1 to acquire access right to increase the number of access right acquiring apparatuses and/or to perform control so that the terminal apparatuses 1 satisfying the hidden terminal condition are not selected at the same time, it is possible to achieve a high throughput.

As described above, in the wireless communication system in accordance with the above-described embodiments, the communication in UC of the first frequency band is controlled through the backhaul link connecting the shared frequency band base station apparatus 2 as the first base station apparatus and the licensed band base station apparatus 3 as the second base station apparatus and LC of the second frequency band between the licensed band base station apparatus 3 and the terminal apparatus 1, and thus it is possible to improve utilization efficiency of wireless communication in the shared frequency band without interfering with communication in UC.

It is to be noted that in the wireless communication system in accordance with the above-mentioned embodiments, a description is given in which the LC-UC cooperation control apparatus 5 is configured as an independent apparatus, but the licensed band base station apparatus 3 may be configured to include the LC-UC cooperation control apparatus 5. In this configuration, the network communication unit 514 of the LC-UC cooperation control apparatus 5 may be omitted. When the network communication unit 514 is omitted, the LC communication managing unit 519, the UC communication managing unit 520, and the path evaluating unit 521 perform communication via the network communication unit 314 of the licensed band base station apparatus 3.

The terminal apparatuses 1, the shared frequency band base station apparatuses 2, the licensed band base station apparatuses 3, and the LC-UC cooperation control apparatus 5 in the above-described embodiments may be embodied by a computer.

In this case, the elements of the apparatuses may be realized by recording a program for realizing the elements of the apparatuses on a computer-readable recording medium and causing a computer system to read and execute the program recorded on the recording medium. It is to be noted that the "computer system" mentioned herein includes an operating system (OS) and hardware such as peripheral devices.

Moreover, examples of the "computer-readable recording medium" include a portable medium, such as a flexible disk, a magneto-optical disk, a ROM, or a CD-ROM, and a storage apparatus, such as a hard disk built in the computer system.

Furthermore, the "computer-readable recording medium" may include a medium that dynamically holds a program for a short time like a communication line when a program is transmitted via a network, such as the Internet, or a communication circuit, such as a telephone circuit, or a medium that holds a program for a predetermined time like a volatile memory inside a computer system serving as a server or a client in that case.

Moreover, the program may serve to realize part of the above-mentioned elements, may realize the above-mentioned elements in combination with a program already stored in the computer system, or may be realized using hardware such as a programmable logic device (PLD) or a field programmable gate array (FPGA).

While embodiments of the present invention have been described above with reference to the drawings, specific configurations thereof are not limited to the embodiments and include any design or the like not departing from the gist of the present invention.

INDUSTRIAL APPLICABILITY

The present invention can be suitably applied to applications which are indispensable to suppress an influence of a wireless apparatus which functions as a hidden terminal for the shared frequency band base station apparatus 2 and to improve utilization efficiency of wireless communication using a shared frequency band by instructing the terminal apparatus 1 to acquire access right (a transmission opportunity or a reception opportunity) in a first frequency band using a second frequency band.

DESCRIPTION OF REFERENCE SIGNS 1, 1-1, 1-2, 1-3, 1-M Terminal apparatus
2, 2-1, 2-N Shared frequency band base station apparatus
3, 3-1, 3-L Licensed band base station apparatus
4, 4-1, 4-2 Gateway
5 LC-UC Cooperation control apparatus
6 External network
101, 301 LC antenna
102, 302 LC transceiving unit
103, 303 LC transmission signal modulating unit
104, 304 LC reception signal decoding unit
105, 205 UC antenna
106, 206 UC transceiving unit
107, 207 UC transmission signal modulating unit
108, 208 UC reception signal decoding unit
109 UC control signal acquiring unit
110, 210 Random access control circuit
111 Terminal control unit
112, 212, 312 Storage unit
211, 311 Base station control unit
214, 314, 514 Network communication unit
215 Access controlling and managing unit
316 UC information extracting unit
317 UC control signal generating unit
519 LC communication managing unit
520 UC communication managing unit
521 Path evaluating unit
90, 91, 92, 93 Wireless apparatus

The invention claimed is:
1. A wireless communication system comprising:
a plurality of terminal apparatuses that perform wireless communication using a first frequency band in which wireless communication based on a random access scheme is performed and a second frequency band which is different from the first frequency band;
a first base station apparatus that performs wireless communication with the terminal apparatuses using the first frequency band;
a second base station apparatus that performs wireless communication with the terminal apparatuses using the second frequency band; and
a cooperation control apparatus that selects a terminal apparatus that transmits user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses and selects which of the first base station apparatus and the selected terminal apparatus acquires access right for transmission of the user data,
wherein the cooperation control apparatus
determines a communication condition in the first frequency band including at least designation of an access right acquiring apparatus from information input from one or both of the first base station apparatus and the second base station apparatus,
generates an unlicensed channel (UC) communication initiation signal for notifying one or both of the first base station apparatus and the second base station apparatus of the communication condition, and outputs the UC communication initiation signal to the first base station apparatus and the second base station apparatus, the first base station apparatus waits until the user data or a UC transmission request signal is received without performing transmission to the selected terminal apparatus if the selected terminal apparatus is designated as the access right acquiring apparatus, and performs transmission of the user data to the selected terminal apparatus or transmission of the UC transmission request signal for causing the selected terminal apparatus to perform transmission using the first frequency band to the selected terminal apparatus based on information provided by the UC communication initiation signal if the selected terminal apparatus is not designated as the access right acquiring apparatus, the second base station apparatus collects information on user data waiting for transmission in the selected terminal apparatus and transmits the UC communication initiation signal to the selected terminal apparatus, the selected terminal apparatus, based on the UC communication initiation signal received from the second base station apparatus, transmits the user data or the UC transmission request signal for causing the first base station apparatus to perform transmission to the first base station apparatus if the selected terminal apparatus is designated as the access right acquiring apparatus, and waits until the user data or the UC transmission request signal is received without performing transmission to the first base station if the selected terminal apparatus is not designated as the access right acquiring apparatus, and the cooperation control apparatus controls acquisition of the access right in the first frequency band using communication in the second frequency band.

2. The wireless communication system according to claim 1, wherein the terminal apparatus generates a UC communication request signal for requesting the cooperation control apparatus to perform transmission of the user data which is performed with the access right acquiring apparatus designated to the first base station and transmit the generated UC communication request signal to the second base station apparatus, the second base station apparatus outputs the UC transmission request signal received from the terminal apparatus to the cooperation control apparatus, and the cooperation control apparatus determines whether to permit a request by the UC communication request signal based on a signal received using the first frequency band by another terminal apparatus already wirelessly communicating with the first base station apparatus using the first frequency band when the UC communication request signal is received from the second base station apparatus.

3. The wireless communication system according to claim 1, wherein the first base station apparatus generates a licensed channel (LC) assist request signal for requesting that communication with a specific terminal apparatus that is performing communication using the first frequency band be changed to communication which is performed with the access right acquiring apparatus designated and outputs the generated LC assist request signal to the cooperation control apparatus, and when the LC assist request signal is received from the first base station apparatus, the cooperation control apparatus determines whether to permit the communication which is performed between the specific terminal apparatus and the first base station apparatus with the access right acquiring apparatus designated, and determines that one of the specific terminal apparatus and the first base station apparatus is the access right acquiring apparatus if it is determined to permit the communication.

4. The wireless communication system according to claim 1, wherein the cooperation control apparatus causes terminal apparatuses that are incapable of detecting signals mutually not to perform wireless communication when the first base station apparatus and the plurality of terminal apparatuses perform the wireless communication using the first frequency band.

5. The wireless communication system according to claim 1, wherein the terminal apparatus transmits communication report information indicating one or both of success or failure of the wireless communication and communication quality thereof to the cooperation control apparatus via the second base station apparatus when the wireless communication with the first base station apparatus using the first frequency band ends, and the cooperation control apparatus stores the communication report information received from the terminal apparatus in association with the access right acquiring apparatus in the wireless communication.

6. The wireless communication system according to claim 1, wherein when transmission from the terminal apparatus to the first base station apparatus is performed using the first base station apparatus as the access right acquiring apparatus or when transmission from the first base station apparatus to the terminal apparatus is performed using the terminal apparatus as the access right acquiring apparatus, the cooperation control apparatus calculates, based on the first communication quality and user data to be transmitted from the first base station apparatus or user data to be transmitted from the terminal apparatus, information on a frame length which is required for transmission of the user data, includes information on the calculated frame length in the UC communication initiation signal, and transmits the UC communication initiation signal to the first base station apparatus or the terminal apparatus, and when the UC communication initiation signal is received, the first base station apparatus or the terminal apparatus transmits a transmission request signal including information for inhibiting transmission using the first frequency band for a time corresponding to the frame length to a communication partner and acquires access right in the first frequency band.

7. The wireless communication system according to claim 1, wherein when transmission from the terminal apparatus to the first base station apparatus is performed using the first base station apparatus as the access right acquiring apparatus or when transmission from the first base station apparatus to the terminal apparatus is performed using the terminal apparatus as the access right acquiring apparatus, the cooperation control apparatus determines an ending condition of the communication in which the access right acquiring apparatus is designated based on user data to be transmitted from the first base station apparatus or user data to be transmitted from the terminal apparatus, includes the determined ending condition in the UC communication initiation signal, and transmits the UC communication initiation signal to the first base station apparatus or the terminal apparatus, and the first base station apparatus or the terminal apparatus continues to perform communication in which only the designated access right acquiring apparatus has the access right until the ending condition indicated by the UC communication initiation signal is satisfied.

8. The wireless communication system according to claim 1, wherein the cooperation control apparatus includes information for designating multi-user concurrent transmission from the first base station apparatus to the plurality of terminal apparatuses or multi-user concurrent transmission from the plurality of terminal apparatuses to the first base station apparatus in the UC communication initiation signal.

9. A wireless communication method in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, a second base station apparatus that performs wireless communication with the terminal apparatuses using the second frequency band, and a cooperation control apparatus that selects a terminal apparatus that transmits user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses, the wireless communication method comprising:

a first step of causing the cooperation control apparatus to select which of the first base station apparatus and the selected terminal apparatus acquires access right for transmission of the user data;

a second step of causing the cooperation control apparatus to generate an unlicensed channel (UC) communication initiation signal indicating a determined access right acquiring apparatus and to output the generated UC communication initiation signal to the first base station apparatus and the second base station apparatus; and a third step of causing the second base station apparatus to transmit the UC communication initiation signal input from the cooperation control apparatus to the selected terminal apparatus, wherein the selected terminal apparatus, based on the UC communication initiation signal received from the second base station apparatus, transmits the user data or the UC transmission request signal for causing the first base station apparatus to perform transmission to the first base station apparatus if the selected terminal apparatus is designated as the access right acquiring apparatus, and waits until the user data or the UC transmission request signal is received without performing transmission to the first base station if the selected terminal apparatus is not designated as the access right acquiring apparatus; and a fourth step of causing the first base station apparatus or the selected terminal apparatus notified as the access right acquiring apparatus to acquire access right in the first frequency band and to transmit the user data via the first base station apparatus using the first frequency band when the UC communication initiation signal is received from the cooperation control apparatus, a fifth step of causing the first base station apparatus to waits until the user data or a UC transmission request signal is received without performing transmission to the selected terminal apparatus if the selected terminal apparatus is designated as the access right acquiring apparatus, and perform transmission of the user data to the selected terminal apparatus or transmission of the UC transmission request signal for causing the selected terminal apparatus to perform transmission using the first frequency band to the selected terminal apparatus based on information provided by the UC communication initiation signal if the selected terminal apparatus is not designated as the access right acquiring apparatus, wherein the cooperation control apparatus controls acquisition of the access right in the first frequency band using communication in the second frequency band.

10. A cooperation control apparatus in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, a second base station apparatus that performs wireless communication with the terminal apparatuses using the second frequency band, and the cooperation control apparatus that controls transmission of user data of the terminal apparatuses, the cooperation control apparatus comprising:

a path evaluating unit that selects a terminal apparatus that transmits the user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses, selects which of the first base station apparatus and the selected terminal apparatus acquires access right for transmission of the user data, and outputs a communication condition in the first frequency band including at least designation of an access right acquiring apparatus to the first base station apparatus and the second base station apparatus, wherein the first base station apparatus waits until the user data or a UC transmission request signal is received without performing transmission to the selected terminal apparatus if the selected terminal apparatus is designated as the access right acquiring apparatus, and performs transmission of the user data to the selected terminal apparatus or transmission of the UC transmission request signal for causing the selected terminal apparatus to perform transmission using the first frequency band to the selected terminal apparatus based on information provided by the UC communication initiation signal if the selected terminal apparatus is not designated as the access right acquiring apparatus, wherein the selected terminal apparatus, based on the UC communication initiation signal received from the second base station apparatus, transmits the user data or the UC transmission request signal for causing the first base station apparatus to perform transmission to the first base station apparatus if the selected terminal apparatus is designated as the access right acquiring apparatus, and waits until the user data or the UC transmission request signal is received without performing transmission to the first base station if the selected terminal apparatus is not designated as the access right acquiring apparatus, wherein the cooperation control apparatus controls acquisition of the access right in the first frequency band using communication in the second frequency band.

11. A terminal apparatus selected in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, a second base station apparatus that performs wireless communication with the terminal apparatuses using the second frequency band, and a cooperation control apparatus that selects the terminal apparatus that transmits user data via the first base station apparatus from among the plurality of terminal apparatuses based on one or both of first communication quality in the wireless communication which is performed between the first base station apparatus and the terminal apparatuses and second communication quality in the wireless communication which is performed between the second base station apparatus and the terminal apparatuses, the terminal apparatus comprising:

a receiving unit that receives an unlicensed channel (UC) communication initiation signal including designation of an access right acquiring apparatus which is determined by the cooperation control apparatus from the second base station apparatus; and a transmitting unit that, based on the UC communication initiation signal received from the second base station apparatus, transmits the user data or a UC transmission request signal for causing the first base station apparatus to perform transmission to the first base station apparatus if the selected terminal apparatus is designated as the access right acquiring apparatus by the UC communication initiation signal, and waits until the user data or the UC transmission request signal is received without performing transmission to the first base station if the selected terminal apparatus is not designated as the access right acquiring apparatus, and wherein acquisition of the access right in the first frequency band is controlled using communication in the second frequency band.

12. A licensed band base station apparatus in a wireless communication system including a plurality of terminal apparatuses that perform wireless communication using a first frequency band in which wireless communication based on a random access scheme is performed and a second frequency band which is different from the first frequency band, a first base station apparatus that performs wireless communication with the terminal apparatuses using the first frequency band, and a cooperation control apparatus that controls transmission of user data of the terminal apparatuses, the licensed band base station apparatus comprising:

a communication unit that performs wireless communication with the terminal apparatuses using the second frequency band;

a collection unit that collects information on the terminal apparatuses via the communication unit; and a generation unit that generates an unlicensed channel (UC) communication initiation signal indicating a communication condition in the first frequency band including at least designation of an access right acquiring apparatus, wherein in a case of transmission of the user data in a downlink to the terminal apparatuses, when information on a terminal apparatus selected to transmit the user data via the first base station apparatus from among the plurality of terminal apparatuses is received from the cooperation control apparatus, the information on the selected terminal apparatus is collected by the collection unit and the UC communication initiation signal is generated by the generation unit based on the collected information, in a case of transmission of the user data in uplinks from the terminal apparatuses, when the information on the terminal apparatuses collected by the collection unit is provided to the cooperation control apparatus and information on a terminal apparatus selected to transmit the user data via the first base station apparatus from among the plurality of terminal apparatuses is received from the cooperation control apparatus, the UC communication initiation signal is generated by the generation unit based on the received information, the generated UC communication initiation signal is transmitted to the selected terminal apparatus via the communication unit, and acquisition of access right in the first frequency band is controlled using communication in the second frequency band, wherein the selected terminal apparatus, based on the UC communication initiation signal received from the licensed band base station apparatus, transmits the user data or the UC transmission request signal for causing the first base station apparatus to perform transmission to the first base station apparatus if the selected terminal apparatus is designated as the access right acquiring apparatus, and waits until the user data or the UC transmission request signal is received without performing transmission to the first base station if the selected terminal apparatus is not designated as the access right acquiring apparatus.

* * * * *